(12) United States Patent
VanHoose et al.

(10) Patent No.: US 12,098,547 B2
(45) Date of Patent: Sep. 24, 2024

(54) METHOD OF FORMING A COMPOSITE WALL STRUCTURE

(71) Applicant: EnviroCast LLC, Loudon, TN (US)

(72) Inventors: Jeff VanHoose, Loudon, TN (US); Don Atkins, Loudon, TN (US)

(73) Assignee: EnviroCast, LLC, Loudon, TN (US)

( * ) Notice: Subject to any disclaimer, the term of this patent is extended or adjusted under 35 U.S.C. 154(b) by 69 days.

(21) Appl. No.: 17/872,422

(22) Filed: Jul. 25, 2022

(65) Prior Publication Data

US 2023/0013122 A1 Jan. 19, 2023

Related U.S. Application Data

(63) Continuation-in-part of application No. 17/567,534, filed on Jan. 3, 2022, which is a continuation-in-part
(Continued)

(51) Int. Cl.
*B28B 1/16* (2006.01)
*B28B 7/00* (2006.01)
(Continued)

(52) U.S. Cl.
CPC ............ *E04C 2/288* (2013.01); *B28B 7/0088* (2013.01); *B28B 7/164* (2013.01); *B28B 19/003* (2013.01);
(Continued)

(58) Field of Classification Search
CPC ........... B28B 1/16; B28B 7/0088; B28B 7/16; B28B 7/164; B28B 7/24; B28B 19/003;
(Continued)

(56) References Cited

U.S. PATENT DOCUMENTS

| 1,718,402 A | 6/1929 | Bitney |
| 1,929,835 A | 10/1933 | Awbrey |

(Continued)

FOREIGN PATENT DOCUMENTS

| DE | 19705202 A1 | 4/2005 |
| EP | 0127359 A1 | 12/1984 |

(Continued)

OTHER PUBLICATIONS

Translation of JP 06136943 A (published on May 17, 1994).*

*Primary Examiner* — Leo B Tentoni
(74) *Attorney, Agent, or Firm* — Blanchard Horton PLLC

(57) ABSTRACT

A precast composite wall structure and method for forming the wall structure are disclosed. The method includes providing a casting bed defining a plurality of shapes corresponding to a three-dimensional outer surface of a wall structure, placing a first layer of uncured concrete to conform to the shapes defined by the lower surface, positioning a forming member in overlying relation above the frame, the forming member defining a plurality of rectangular-shaped channels therebetween, positioning a stud frame within the casting bed along the forming member, placing a second layer of uncured concrete within the casting bed to conform to the rectangular-shaped channels between the rectangular protrusions, and allowing the concrete to cure.

18 Claims, 35 Drawing Sheets

Related U.S. Application Data of application No. 16/728,620, filed on Dec. 27, 2019, now Pat. No. 11,214,963, which is a continuation of application No. PCT/US2018/040014, filed on Jun. 28, 2018, which is a continuation-in-part of application No. 14/610,475, filed on Jan. 30, 2015, now Pat. No. 11,077,583.

(60) Provisional application No. 62/526,101, filed on Jun. 28, 2017, provisional application No. 61/934,405, filed on Jan. 31, 2014.

(51) Int. Cl.
| | | |
|---|---|---|
| *B28B 7/16* | (2006.01) | |
| *B28B 7/24* | (2006.01) | |
| *B28B 19/00* | (2006.01) | |
| *B28B 23/00* | (2006.01) | |
| *B29C 33/42* | (2006.01) | |
| *B29C 33/48* | (2006.01) | |
| *B29C 39/10* | (2006.01) | |
| *B29D 99/00* | (2010.01) | |
| *E04B 2/58* | (2006.01) | |
| *E04C 2/06* | (2006.01) | |
| *E04C 2/288* | (2006.01) | |
| *B29L 31/10* | (2006.01) | |

(52) U.S. Cl.
CPC ...... *B28B 19/0053* (2013.01); *B28B 23/0068* (2013.01); *B29C 33/424* (2013.01); *B29D 99/001* (2013.01); *B29C 2795/007* (2013.01); *B29L 2031/10* (2013.01); *B29L 2031/108* (2013.01)

(58) Field of Classification Search
CPC . B28B 19/0053; B28B 23/0068; B28B 23/02; B29C 33/424; B29C 33/48; B29C 39/10; B29C 2795/007; B29D 99/001; B29L 2031/10; B29L 2031/108; E04B 2/58; E04C 2/06; E04C 2/46
USPC .... 264/129, 275, 277, 279, 279.1, 333, 334; 52/745.09, 745.19
See application file for complete search history.

(56) References Cited

U.S. PATENT DOCUMENTS

| | | | |
|---|---|---|---|
| 2,708,780 A | 5/1955 | Burkhalter | |
| 2,780,936 A | 2/1957 | Bror | |
| 3,287,865 A | 11/1966 | Lockman | |
| 3,750,998 A | 8/1973 | Shoe et al. | |
| 4,131,405 A * | 12/1978 | Moore | B28B 7/02 249/165 |
| 4,280,974 A | 7/1981 | Piazza | |
| 4,416,842 A * | 11/1983 | Nash | B28B 19/003 264/333 X |
| 4,512,126 A | 4/1985 | Walston | |
| 4,782,635 A | 11/1988 | Hegle | |
| 4,841,702 A | 6/1989 | Huettemann | |
| 4,942,707 A | 7/1990 | Huettemann | |
| 4,993,872 A | 2/1991 | Lockwood | |
| 5,095,674 A | 3/1992 | Huettemann | |
| 5,526,623 A | 6/1996 | Bullivant | |
| 5,548,939 A | 8/1996 | Carmical | |
| 5,588,272 A | 12/1996 | Haponski | |
| 5,956,911 A | 9/1999 | Kistner et al. | |
| 5,966,896 A | 10/1999 | Tylman | |
| 6,058,672 A | 5/2000 | McClellan | |
| 6,125,597 A | 10/2000 | Hoffman et al. | |
| 6,427,406 B1 | 8/2002 | Weaver et al. | |
| 6,494,004 B1 | 12/2002 | Zimmerman | |
| 6,688,073 B2 | 2/2004 | Vanderwerf et al. | |
| 7,237,368 B2 | 7/2007 | Richardson et al. | |
| 7,654,057 B2 | 2/2010 | Zambelli et al. | |
| 7,739,844 B2 | 6/2010 | Gharibeh et al. | |
| 7,810,293 B2 | 10/2010 | Gibbar et al. | |
| 7,814,710 B2 | 10/2010 | Foglia | |
| 7,836,660 B2 | 11/2010 | Gharibeh et al. | |
| 8,327,596 B2 | 12/2012 | Drews et al. | |
| 8,491,831 B2 | 7/2013 | Buedel et al. | |
| 8,561,366 B2 | 10/2013 | Gasperi | |
| 8,635,832 B2 | 1/2014 | Heudorfer et al. | |
| 8,734,691 B1 | 5/2014 | Boeshart | |
| 8,844,227 B1 | 9/2014 | Cluperca | |
| 8,966,833 B2 | 3/2015 | Ally | |
| 9,238,155 B2 | 1/2016 | Borchardt | |
| 9,803,354 B1 | 10/2017 | Francies, III | |
| 10,422,133 B2 | 9/2019 | Vanhoose et al. | |
| 11,077,583 B2 | 8/2021 | Vanhoose et al. | |
| 11,214,963 B2 | 1/2022 | Vanhoose et al. | |
| 2003/0115822 A1 | 6/2003 | Lejeune et al. | |
| 2005/0086904 A1 | 4/2005 | Foley | |
| 2007/0039281 A1 | 2/2007 | Zambelli et al. | |
| 2007/0144093 A1 | 6/2007 | Messenger et al. | |
| 2008/0016788 A1 | 1/2008 | Gulati et al. | |
| 2008/0041004 A1 | 2/2008 | Gibbar et al. | |
| 2009/0301023 A1 | 12/2009 | Heerens et al. | |
| 2010/0101175 A1 | 4/2010 | Hohmann | |
| 2010/0307083 A1 | 12/2010 | Buedel et al. | |
| 2011/0138735 A1 | 6/2011 | Foley | |
| 2013/0186698 A1 | 7/2013 | Sarokhan et al. | |
| 2015/0217478 A1 | 8/2015 | Vanhoose et al. | |
| 2017/0121967 A1 | 5/2017 | Daiber et al. | |
| 2022/0220738 A1 | 7/2022 | Vanhoose et al. | |

FOREIGN PATENT DOCUMENTS

| | | | | |
|---|---|---|---|---|
| GB | 2187446 A * | 9/1987 | ............... | E04C 2/06 |
| GB | 2355024 A | 4/2001 | | |
| JP | 06136943 A * | 5/1994 | ............... | E04C 2/30 |
| JP | 2002070298 A | 3/2002 | | |
| WO | WO2010113105 A2 | 10/2010 | | |

* cited by examiner

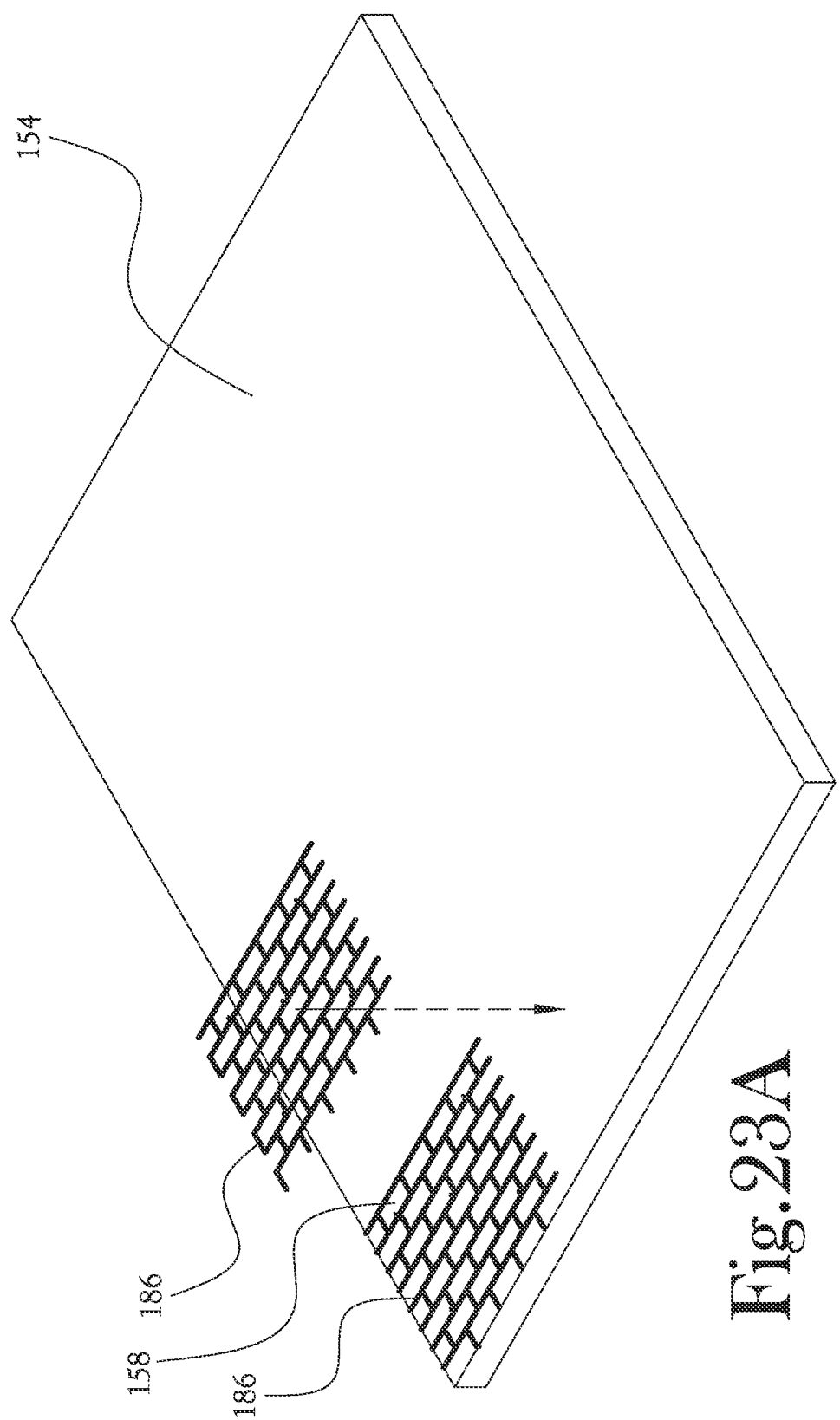

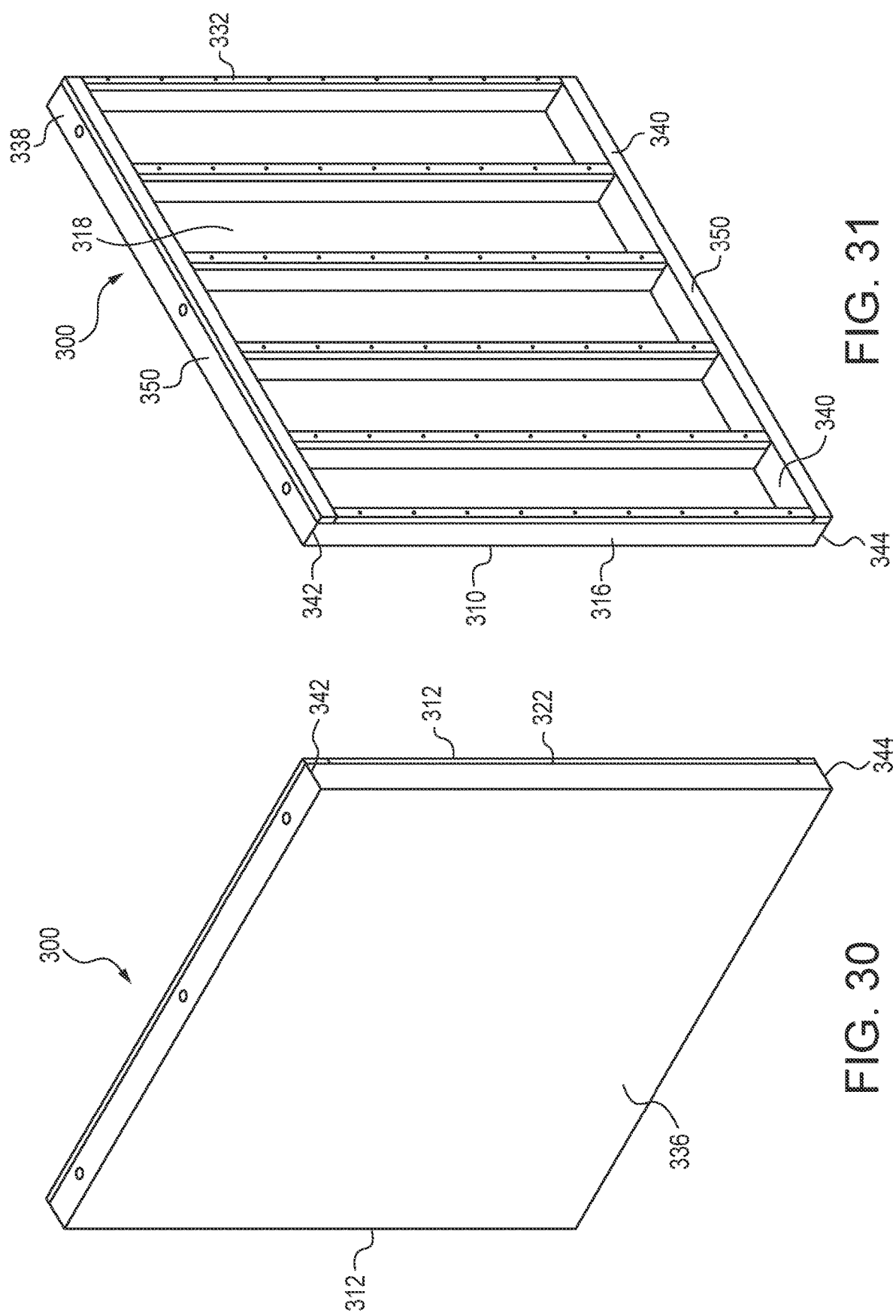

METHOD OF FORMING A COMPOSITE WALL STRUCTURE

CROSS-REFERENCE TO RELATED APPLICATIONS

This application is a continuation-in-part of U.S. patent application Ser. No. 17/567,534, filed on Jan. 3, 2022, which is a continuation-in-part of U.S. Patent Application Ser. No. 16/728,620, filed on Dec. 27, 2019, now U.S. Pat. No. 11,214,963, issued on Dec. 15, 2021. U.S. Patent Application Ser. No. 16/728,620 is a continuation of PCT/US2018/040014, filed on Jun. 28, 2018 which claims the benefit of U.S. Provisional Patent Application No. 62/526,101, filed on Jun. 28, 2017 U.S. Patent Application Ser. No. 16/728,620 is also a continuation-in-part of U.S. patent application Ser. No. 14/610,475, filed on Jan. 30, 2015, now U.S. Pat. No. 11,077,583, issued on Aug. 3, 2021, which claims the benefit of U.S. Provisional Patent Application No. 61/934,405, filed on Jan. 31, 2014. The contents of each of the foregoing applications are incorporated herein in their entireties by reference.

STATEMENT REGARDING FEDERALLY-SPONSORED RESEARCH OR DEVELOPMENT

Not Applicable

BACKGROUND OF THE INVENTION

1. Field of Invention

The present general inventive concept relates to prefabricated wall structures, and more particularly, to a precast concrete composite wall structure and method for manufacturing a precast concrete composite wall structure.

2. Description of the Related Art

Precast concrete wall structures are often used as a way of avoiding more costly, time consuming, and/or labor-intensive processes of fabricating walls from brick or block materials, wood, metal studs, or the like, or fabricating walls by pouring and curing concrete in situ. Generally, the manufacture of a precast concrete wall structure involves the use of a casting bed fabricated to form a mold for pouring and curing concrete in the shape of a desired wall structure. The casting bed is typically oriented with the desired wall structure shape extending in a horizontal plane. Desired non-concrete structural fixtures may be added to the casting bed, and concrete may then be poured into the casting bed, thereby filling the mold shape and at least partially surrounding the fixtures. The concrete may then be allowed to cure, thereby forming a concrete wall structure in the desired shape. Once cured, the wall structure may be removed from the casting bed, such as for example by disassembling the casting bed from around the wall structure. The wall structure may then be transported to a desired location, where it can be stood upright along a substantially vertical plane (or other desired orientation) for use as a structural member in a building construction.

One prior art method for manufacturing a precast concrete wall structure is described in U.S. Pat. No. 8,491,831, issued to Buedel et al. (hereinafter "the '831 Patent"). In the method of the '831 Patent, a frame is provided having a plurality of spaced-apart wall studs interconnecting opposing first and second wall plate members. The frame is placed within a casting bed extending along a horizontal plane, and a layer of insulating material is positioned overlaying the frame. Multiple insulating foam blocks are then placed above the insulating layer at spaced apart intervals to define void channels extending therebetween along the length of the casting bed. Lengths of rebar are positioned within the channels, and concrete is poured into the casting bed, thereby filling the channels and surrounding the rebar, covering the insulating foam blocks, and filling the spaces between the first and second wall plate members and the adjacent sides of the casting bed. The concrete is allowed to cure, thereby forming a concrete wall structure having a substantially planar concrete first outer surface, a plurality of steel-reinforced concrete "ribs" extending internally of the structure, and a second outer surface defined by the frame structure and adjacent surface of the insulating layer. Concrete top beam and toe sections are provided extending above and below the frame structure at locations corresponding to the spaces between the first and second wall plate members and the adjacent sides of the casting bed. Thereafter, the concrete wall structure may be removed from the casting bed, such as by removing one or more sides of the casting bed and/or lifting the wall structure therefrom.

In methods and apparatus for forming precast wall structures of the type described above, significant problems may be encountered with regard to quality control of the finished precast wall structure. Specifically, while pouring the unfinished concrete into the casting bed described above, difficulty may be encountered in maintaining the desired spaced-apart configuration of the insulating foam blocks. As the unfinished concrete flows over and around the insulating foam blocks, such blocks may be prone to flex and/or shift laterally along the layer of insulating material, and the blocks may further be prone to shift vertically due to buoyancy of the blocks in the more dense unfinished concrete. Furthermore, depending upon the flexural strength and stiffness of the layer of insulating material, the layer of insulating material may be subject to flexural deformation and/or failure under the weight of the unfinished concrete. The end result may be a finished wall structure which does not strictly conform to desired specifications.

In several applications, it may be desirable for an outer surface of a concrete wall to be imparted with surface texture, color, or other decorative surface features. For example, several prior art precast concrete wall structures are known which have a flat concrete outer surface, and which may also include a number of insulating foam blocks or other materials extending along an interior surface thereof. While these precast wall structures with flat concrete outer surfaces may be suitable for use, for example, in an underground or partially underground situation in which the outer surface of the wall structure is not seen or not aesthetically important, use of such plain, flat, concrete outer wall surfaces in above-ground settings may be undesirable, as these plain, flat concrete outer surfaces are considered by many to be aesthetically displeasing.

Several prior art devices are known which may be used to impart a desired surface texture to an exposed surface of unfinished concrete prior to curing, so that the cured concrete surface maintains the desired surface texture. For example, it is known to use stamps, rollers, and other forms defining a three-dimensional negative surface, and to press the negative surface onto an uncured concrete surface to impart a corresponding positive surface shape into the surface of the uncured concrete. Thereafter, the concrete may be allowed to cure such that the concrete maintains the positive surface shape. Additionally, it is known to adhere or otherwise secure a prefabricated wall veneer sheet or panel to an exposed concrete surface in order to provide a more aesthetically pleasing appearance to an exposed surface of concrete. Such prefabricated wall veneers may, for example, define shapes and colors resembling a brick façade, wooden shapes, stone, stucco, ribbed or other raised and/or unraised geometric patterns, etc. These prefabricated wall veneers may be used to provide a desired look for an exposed wall of a building employing, for example, a precast wall structure. The prefabricated wall veneers may be formed of wood composite and/or other composite materials which resist damage from moisture, rot, splitting, pests, and so on, while providing many years of maintenance free use. By forming the veneers to a desired look, painting and other types of general maintenance may be avoided.

Significant problems may be encountered when attempting to employ the above-described devices and methods to impart surface texture, color, or other decorative surface features to an outer surface of a precast concrete wall or structure. For example, in applications in which a concrete surface of a precast concrete wall or structure is to be imparted with a stamped or rolled texture, such texture must be rolled or stamped onto an exposed surface of the precast concrete wall structure while the concrete is still uncured within the casting bed or mold. Once the stamped or rolled texture is pressed into the uncured exposed surface of concrete, the concrete must remain undisturbed in order to allow the concrete to cure, thereby preserving the desired stamped or rolled texture in the exposed concrete surface. Thus, two manufacturing limitations are encountered: First, the stamped or rolled texture must be applied to the concrete relatively quickly, i.e., while the concrete is still uncured. Second, the stamped or rolled texture imparted to the uncured concrete must be undisturbed while the concrete is allowed to cure. Hence, manufacturing activities involving moving or otherwise agitating the casting bed or mold prior to curing of the concrete in the casting bed or mold must be limited.

In light of the above, an improved method for manufacturing a precast concrete wall structure to conform to more strict tolerances and to allow for more convenient imparting of surface texture to an outer concrete surface thereof to allow the textured surface to exhibit desired aesthetic qualities, and a precast concrete wall structure manufactured according to such specifications, is desired.

BRIEF SUMMARY OF THE INVENTIVE CONCEPT

The present general inventive concept, in various example embodiments, provides a precast concrete wall and a method for forming a wall structure. In one embodiment, a casting bed is provided having a plurality of upright surfaces defining a generally rectangular interior area and a lower surface defining a plurality of shapes corresponding to a three-dimensional outer surface of a wall structure. A first layer of uncured concrete is placed within the casting bed and allowed to conform to the shapes defined by the lower surface. A forming member is positioned in overlying relation above the frame, the forming member comprising a one-piece layer of insulating material sized to extend fully along a width dimension of the casting bed, the forming member defining a plurality of integrally-formed rectangular protrusions, each said integrally-formed rectangular protrusion having a length dimension extending fully along a length dimension of the forming member in a parallel and spaced-apart relationship to one another to define a plurality of rectangular-shaped channels therebetween. A frame is positioned within the casting bed along the forming member opposite the second layer of uncured concrete, the frame comprising first and second spaced apart members extending fully along the width dimension of the casting bed and a plurality of studs interconnecting the first and second spaced apart members, the studs each extending fully along a length dimension of the frame. A second layer of uncured concrete is placed within the casting bed and allowed to conform to the rectangular-shaped channels between the rectangular protrusions. Finally, the concrete is allowed to cure.

In various example embodiments according to several features of the present general inventive concept, the method may further comprise placing a third layer of uncured concrete within the casting bed and allowing the concrete to fill at least one space between the frame and the upright surfaces of the casting bed. The frame and the forming member may be positioned within the casting bed to provide a first space between the forming member and the frame first member and a first upright surface of the casting bed and to provide a second space between the forming member and the frame second member and an opposite second upright surface of the casting bed. The forming member may be positioned with the rectangular protrusions facing toward the first layer of uncured concrete.

In various example embodiments, the method may further comprise placing at least one connector within the at least one space between the frame and the upright surfaces of the casting bed. The at least one connector may comprise an elongated member at least partially protruding from at least one of the layers of uncured concrete in the casting bed. The at least one connector may comprise a socket for receiving a pin. The forming member may be composed of insulating material. The insulating material may be expanded polystyrene.

In various example embodiments, the lower surface may define a first area conforming to a first wall texture and a second area comprising to a second wall texture. In various embodiments, the first and second wall textures may be selected from the group consisting of brick texture, stone texture, lap siding texture, and board and batten texture. Various embodiments may provide at least two opposite upright surfaces of the casting bed defining structures shaped to allow the concrete to form matingly-shaped portions of a joint along opposite sides of the wall structure. In various embodiments, a first of the at least two opposite upright surfaces of the casting bed may define a ridge extending along a length thereof, and the second of the at least two opposite upright surfaces of the casting bed may define a matingly-shaped groove extending along a length thereof.

In various example embodiments, the method may further comprise positioning a plurality of reinforcing members within the casting bed prior to placing the second layer of uncured concrete within the casting bed. The positioning of a plurality of reinforcing members may further comprise placing at least one reinforcing member along each of the rectangular-shaped channels between the rectangular protrusions of the forming member. In various example embodiments, the method may further comprise forming at least one of the plurality of shapes in the lower surface of the casting bed. One or more elements may be configured to be anchored to the concrete, along the lower surface of the casting bed. The method may further comprise positioning one or more pattern stamps along the lower surface of the casting bed.

In various example embodiments according to several features of the present general inventive concept, the method may further comprise removing the wall structure from the casting bed after the concrete has cured and removing the one or more pattern stamps from the wall structure. In various embodiments, a color may be applied to the wall structure prior to removing the one or more pattern stamps.

Additional aspects and advantages of the present general inventive concept will be set forth in part in the description which follows, and, in part, will be obvious from the description, or may be learned by practice of the present general inventive concept.

BRIEF DESCRIPTION OF THE SEVERAL VIEWS OF THE DRAWINGS

The following example embodiments are representative of example techniques and structures designed to carry out the objects of the present general inventive concept, but the present general inventive concept is not limited to these example embodiments. In the accompanying drawings and illustrations, the sizes and relative sizes, shapes, and qualities of lines, entities, and regions may be exaggerated for clarity. A wide variety of additional embodiments will be more readily understood and appreciated through the following detailed description of the example embodiments, with reference to the accompanying drawings in which:

FIGS. 23A-D illustrate the forming of the prefabricated wall with the veneer of FIG. 19 according to an example embodiment of the present general inventive concept;

FIG. 30 depicts a perspective outside view of an uninsulated precast concrete wall structure in accordance with several features of the present general inventive concept.

FIG. 31 depicts a perspective inside view of the uninsulated precast concrete wall structure represented in FIG. 30.

DETAILED DESCRIPTION OF THE INVENTION

Figure 1:
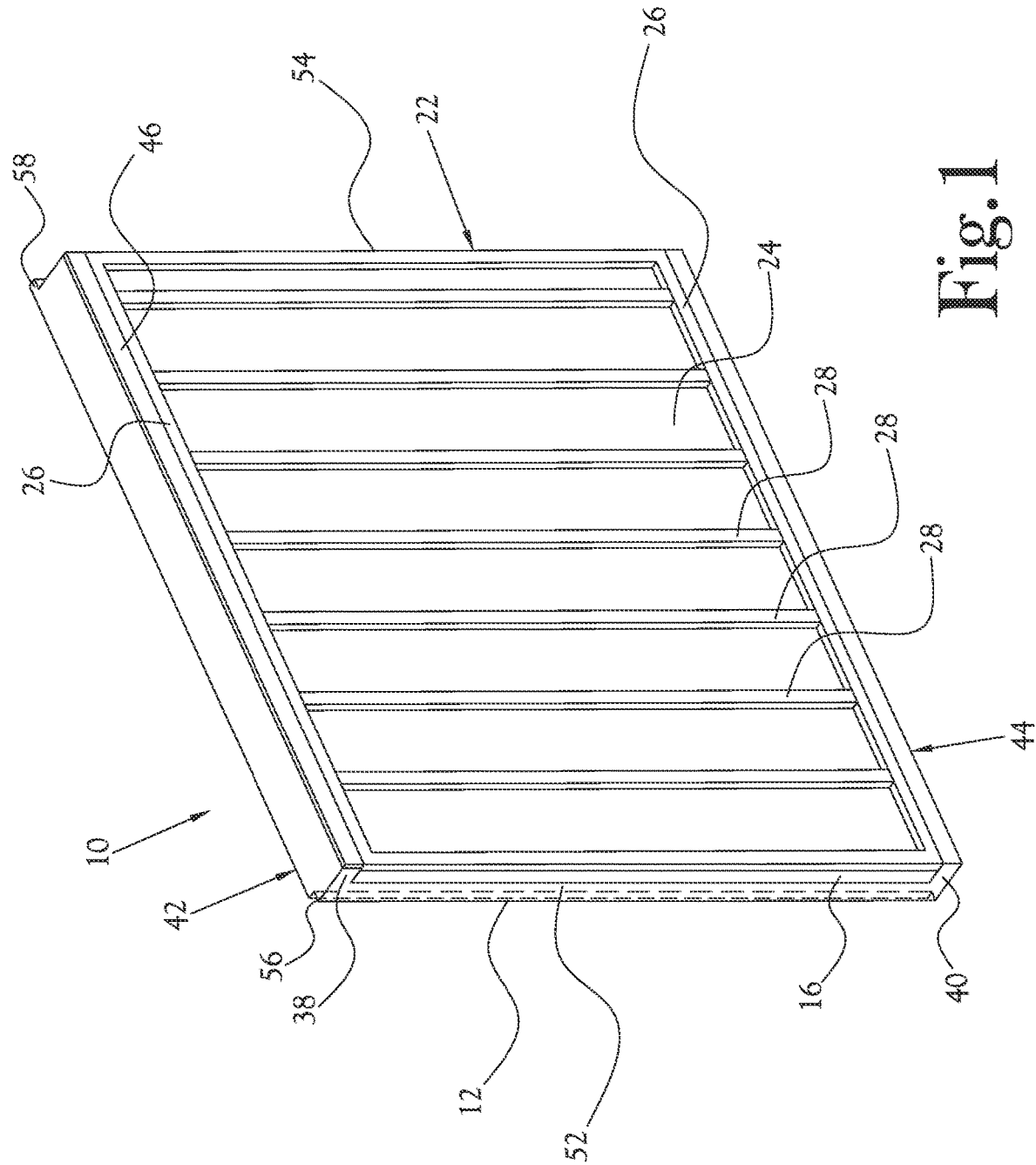
FIG. 1 is a perspective view showing one embodiment of a precast concrete wall constructed in accordance with several features of the present general inventive concept.

Reference will now be made to certain example embodiments of the present general inventive concept which are illustrated in the accompanying drawings and illustrations. The example embodiments are described herein in order to explain the present general inventive concept by referring to the figures. The following detailed description is provided to assist the reader in gaining a comprehensive understanding of the structures and fabrication techniques described herein. Accordingly, various changes, modification, and equivalents of the structures and fabrication techniques described herein will be suggested to those of ordinary skill in the art. The progression of fabrication operations described are merely examples, however, and the sequence type of operations is not limited to that set forth herein and may be changed as is know in the art, with the exception of operations necessarily occurring in a certain order. Also, description of well-known functions and constructions may be omitted for increased clarity and conciseness.

Note that spatially relative terms, such as "up," "down," "right," "left," "beneath," "below," "lower," "above," "upper" and the like, may be used herein for ease of description to describe one element or feature's relationship to another element(s) or feature(s) as illustrated in the figures. Spatially relative terms are intended to encompass different orientations of the device in use or operation in addition to the orientation depicted in the figures. For example, if the device in the figures is turned over or rotated, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

In accordance with several features of the present general inventive concept, a precast concrete wall structure and method for manufacturing a precast concrete wall structure are disclosed herein and in the accompanying figures. With reference to the accompanying figures, and with particular reference to FIGS. 1-3, in one embodiment, a wall structure 10 is provided which includes an outer concrete face 12 defining an outer surface 36 forming an exterior surface of the wall structure 10, and an inner surface 18 defining a plurality of inwardly-facing ribs 14. In the illustrated embodiment, each of the ribs 14 is of a substantially rectangular cross-section and extends substantially vertically along the inner surface 18 of the concrete face 12 in substantially parallel-planar, spaced apart relation to the other ribs. In the illustrated embodiment, the concrete face 12 defines elongated top beam 38 and toe 40 portions extending inwardly from the inner surface 18 along respective upper 42 and lower 44 ends of the concrete face 12, in an orientation substantially perpendicular to the ribs 14.

In several embodiments, the concrete face 12 is fabricated from a reinforced concrete material, of the type having a plurality of reinforcing members embedded in a cement-based concrete material. For example, in the present embodiment, a plurality of elongated steel reinforcing members are provided within the concrete face 12, extending substantially parallel to the inner and outer surfaces 18, 36 thereof. More specifically, in the present embodiment, a plurality of elongated steel members are provided, each member extending within and along a respective rib 14 of the concrete face 12, thereby strengthening the concrete face 12 and resisting flexure of the concrete face 12. In certain embodiments, additional reinforcement in the form of wire mesh or fiber materials may be provided within and along the concrete face 12.

It will be recognized that the above-discussed reinforcement against flexure of the concrete face 12 may be useful in various applications of the wall structure 10, such as for example use of the wall structure 10 in forming a basement or other below-ground or partially below-ground structure, or in forming a retaining wall structure. However, it will further be understood that the reinforcing members may be provided at other locations within the concrete face 12 without departing from the spirit and scope of the present general inventive concept. For example, in other embodiments, one or more reinforcing members may be provided slightly interior to the outer surface 36 of the concrete face 12 to reinforce the concrete face against flexure. Such reinforcement may be useful in other applications of the wall structure 10, such as for example use of the wall structure 10 in forming portion of an above-ground or partially above-ground structure, such as an above-ground or partially above-ground residential, commercial, or industrial building. Additional reinforcement may also be provided extending within the top beam 38 or toe 40, or along the concrete face 12 between the inner and outer surfaces to provide strength and reinforcement to those portions of the wall structure 10.

A substantially planar forming member 16 is provided extending along the inner surface 18 of the concrete face 12. The forming member 16 defines a plurality of outwardly-extending rectangular protrusions 20 sized and shaped to be received in mating engagement between each of the ribs 14. In several embodiments, the forming member 16 is constructed from a material that allows the forming member 16 to provide moisture resistance and vapor permeability to the wall structure 10 and/or to decrease the overall thermal conductivity of the wall structure 10. For example, in several embodiments, the forming member 16 is fabricated from an insulating material, such as for example expanded polystyrene (EPS), extruded polystyrene (XPS), rockwool, or other such material. In a preferred embodiment the forming member 16 is both resistant to moisture and thermally insulating.

Figure 2:
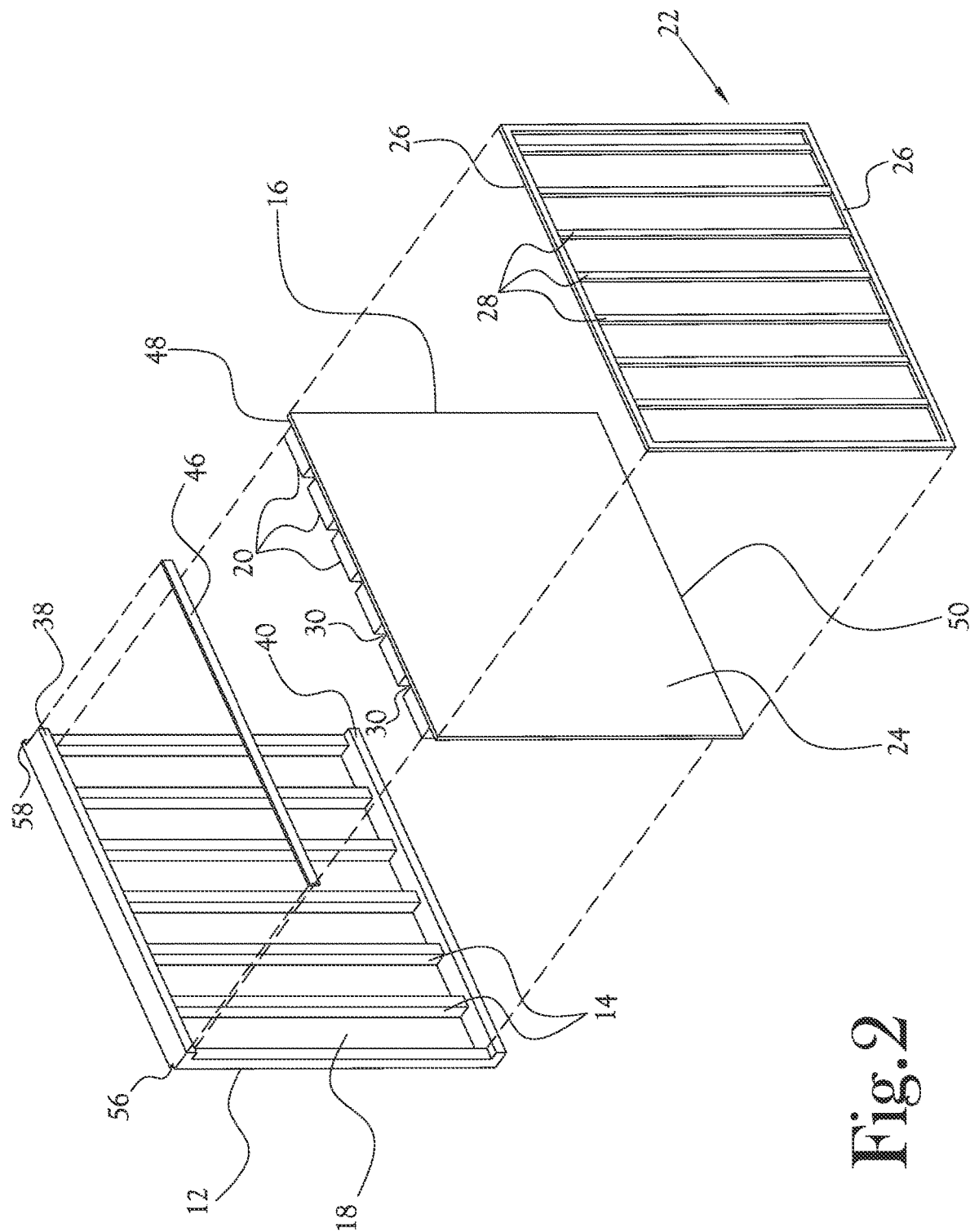
FIG. 2 is an exploded view of the precast concrete wall of FIG. 1.
Figure 3:
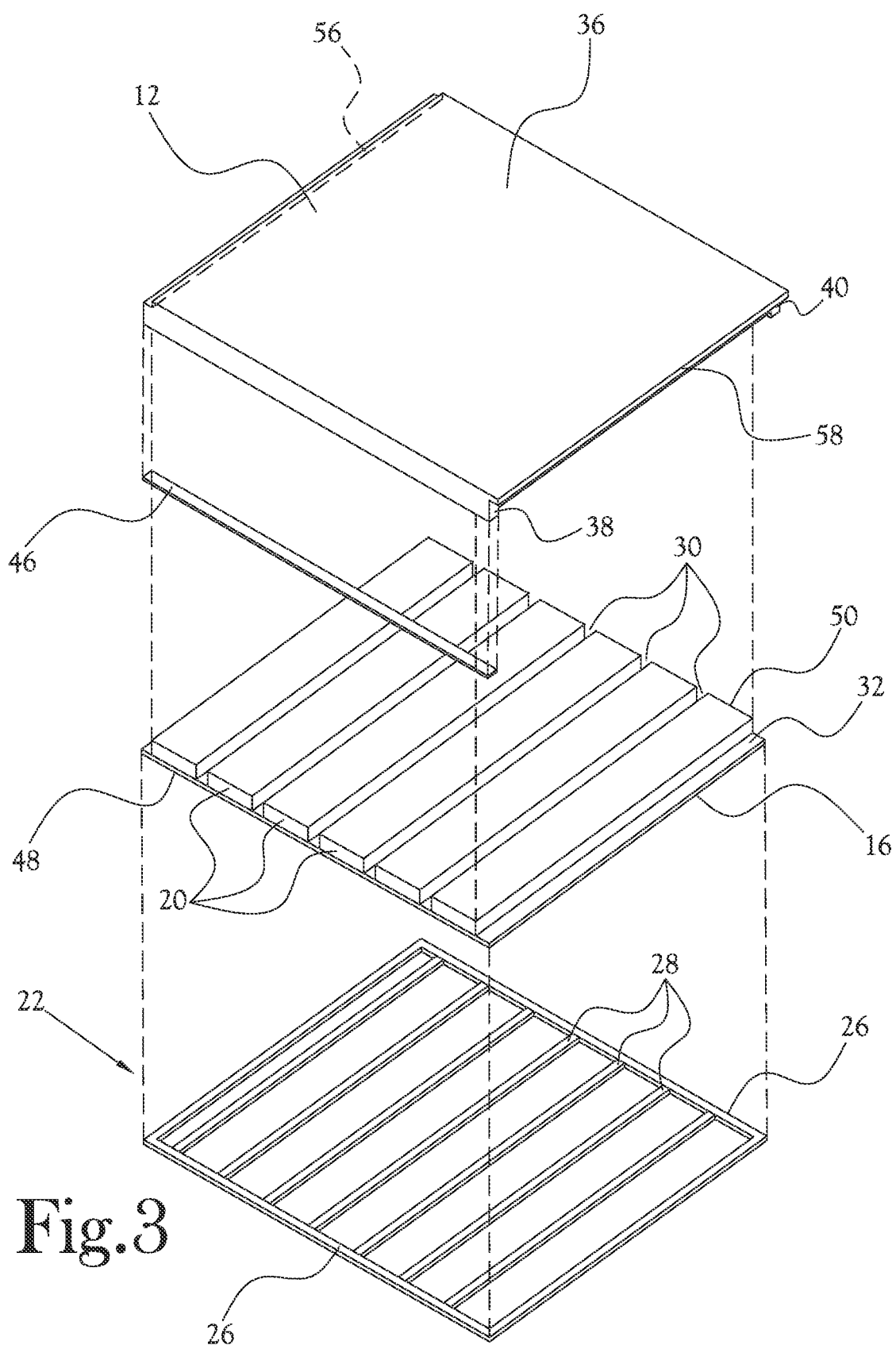
FIG. 3 is another exploded view of the precast concrete wall of FIG. 1.

Referring to FIGS. 2 and 3, in one embodiment, the forming member 16 comprises a layer of EPS material having a plurality of integrally-formed protrusions 20 extending along an outer surface 32 thereof. The protrusions 20 are generally rectangular in shape and extend in a parallel and spaced-apart relationship to one another to define a plurality of rectangular-shaped channels 30 therebetween. As will be discussed in greater detail below, the channels 30 provide mold forms for forming the ribs 14 of the concrete face 12 during manufacture of the wall structure 10. Hence, each rib 14 of the concrete face 12 is mated to, and is received within, a respective channel 30 of the forming member 16, and each protrusion 20 is received between and adjacent corresponding ribs 14 of the concrete face 12. It will be understood that the specific dimensions of the various elements of the forming member 16 may vary depending upon the desired characteristics of the finished wall structure 10. For example, in one embodiment, the rectangular protrusions 20 may be approximately sixteen inches wide, while the channels 30 may be approximately 3.5 inches wide and approximately 5.5 inches deep. Accordingly, each mating rib 14 may be approximately 3.5 inches wide and approximately 5.5 inches deep, and each rib 14 may be spaced approximately 19.5 inches apart, centerline-to-centerline. In this embodiment, the portions of the forming member 16 extending between the rectangular protrusions 20 may be approximately 1.5 inches thick. However, it will be understood that the present general inventive concept is not limited to such dimensional restrictions.

In several embodiments, the forming member 16 terminates at a lower edge of the top beam 38 and at an upper edge of the toe 40. In certain of these embodiments, the top beam 38 and toe 40 each extend inwardly to at least partially surround upper and lower ends, respectively, of the forming member 16. In some embodiments, the top beam 38 and toe 40 portions of the concrete face 12 may each extend inwardly to completely surround the upper and lower ends, respectively, of the forming member 16. In other words, the top beam 38 and toe 40 portions of the concrete face 12 may each extend inwardly to terminate substantially flush with an inner surface 24 of the forming member 16. In other embodiments, the top beam 38 and toe 40 portions of the concrete face 12 may terminate outwardly of the forming member inner surface 24, or in other words, may terminate short of the inner surface 24 of the forming member 16, In certain of these embodiments, at least one insulating member 46 may be provided along an inner surface of the top beam 38 and/or the toe 40.

In several embodiments, the forming member 16 defines a relatively smooth inner surface 24 opposite the outwardly-extending protrusions 20. The inner surface 24 of the forming member 16 defines an interior surface of the wall structure 10. In several embodiments, a stud frame 22 is secured along the inner surface 24 of the forming member 16 to provide an attachment means for additional structures which may be useful in conjunction with the wall structure 10, i.e., drywall or other interior wall sheathing, additional insulation, plumbing or electrical fixtures, or the like. In the illustrated embodiment, the stud frame 22 comprises generally first and second spaced apart members 26 extending along opposite upper and lower edges 48, 50 of the forming member 16. The upper and lower members 26 are interconnected by a plurality of studs 28 extending perpendicular to the members 26 in parallel, spaced apart relation to one another. The stud frame 22 may be fabricated from any of a variety of conventional materials commonly used in the construction of building framing without departing from the spirit and scope of the present general inventive concept. However, in a preferred embodiment the stud frame 22 is of a metal construction and comprises generally first and second spaced apart metal tracks 26 having metal studs 28 extending therebetween.

In the illustrated embodiment, the various studs 28 of the stud frame 22 extend uniformly between the upper and lower members 26 at evenly-spaced locations along the width of the stud frame 22. However, it will be recognized that the configuration of the stud frame 22 may vary in order to allow the stud frame 22 to provide any of numerous desirable features commonly associated with framed building construction. For example, in several embodiments, the upper and lower members 26 of the stud frame 22 may comprise double cap or sole members of the type commonly found in traditional building framing. The stud frame 22 may further define door or window frames, with associated cripple studs, top beam members, etc., of the type commonly found in building framing. It will be recognized that, in such embodiments, corresponding through openings may be defined in the concrete face 12 and forming member 16 to accommodate such door and window frames. Numerous such configurations will be recognized by one of skill in the art and may be used without departing from the spirit and scope of the present general inventive concept.

In several embodiments, opposite first and second sides 52, 54 of the wall structure 10 define suitable structures or mating surfaces to allow the wall structure 10 to be joined along its first or second side 52, 54 with an adjacent wall structure 10 to form a continuous wall. For example, in several embodiments, suitable fasteners are embedded along the first or second sides 52, 54 of the wall. In other embodiments, the first and second sides 52, 54 of the wall structure 10 define mating joint surfaces adapted to form a joint with an adjacent wall structure 10. With reference to FIGS. 1-3, in the illustrated embodiment, the first and second sides 52, 54 of the wall structure define inatingly-shaped female and male lap joints, respectively, extending along respective lengths of the first and second sides 52, 54. More specifically, in the illustrated embodiment, the portion of the concrete face 12 along the first side 52 defines a female portion of a lap joint 56, while the portion of the concrete face 12 along the second side 54 defines a male portion of a lap joint 58. The female and male lap joint portions 56, 58 are matingly-shaped, such that each male portion 56 may mate with a corresponding female portion 58 of an adjacent wall structure 10, thereby joining adjacent wall structures in side-by-side relationship with one another. Those of skill in the art will recognize other suitable shapes which may be used in forming the mating surfaces of the first and second sides 52, 54 of the wall structure without departing from the spirit and scope of the present general inventive concept.

Figure 4:
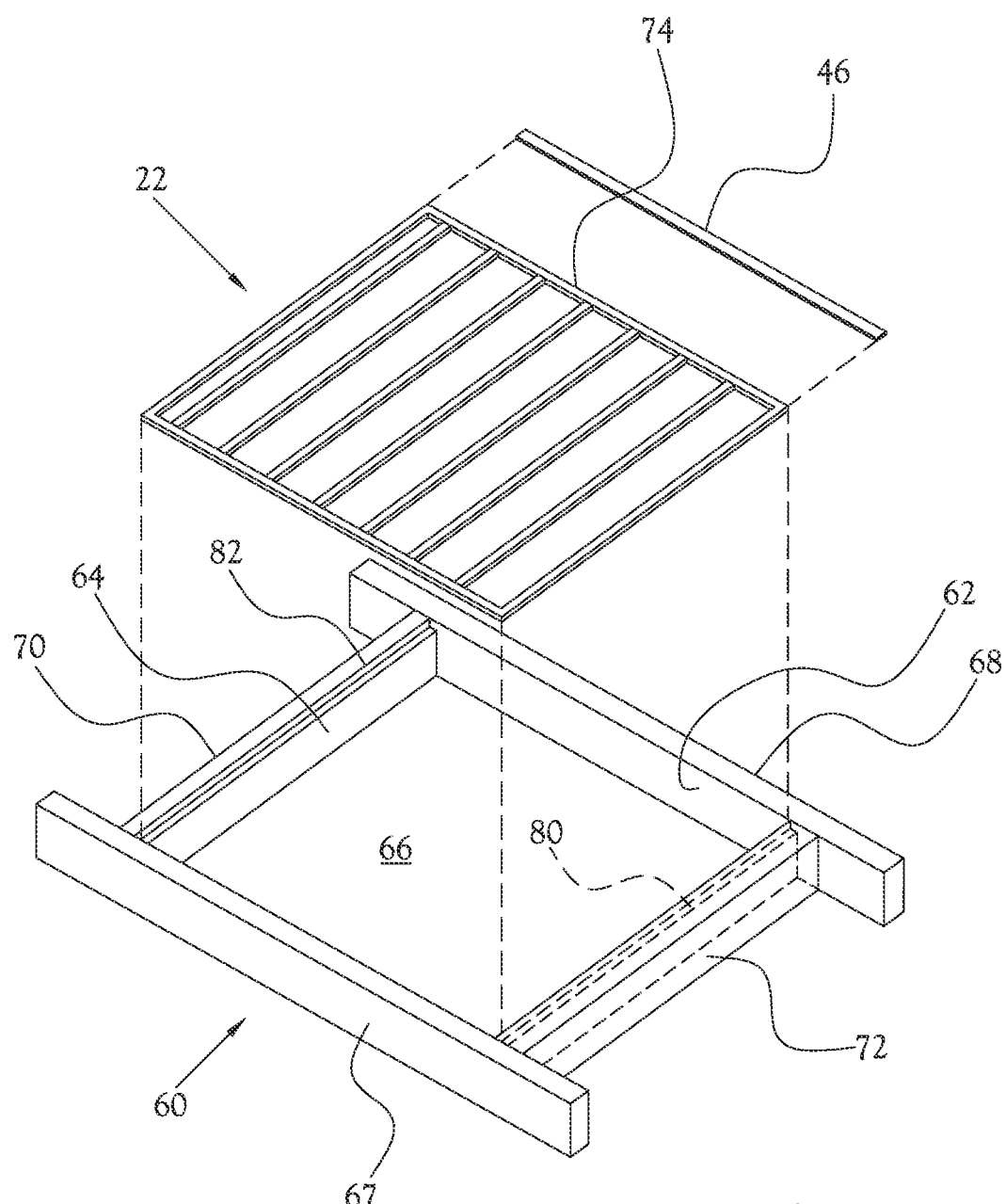
FIG. 4 is a partially exploded perspective view showing various operations of one embodiment of a method according to several features of the present general inventive concept.

In accordance with several additional features of the present general inventive concept, a method of manufacturing a precast concrete wall structure is also disclosed herein and in the accompanying figures. Various operations according to one embodiment of a method of manufacturing a precast concrete wall structure, or "method," may be understood by reference to the illustrations depicted in FIGS. 4-6 and the description herein, With reference to FIGS. 4-6, in one embodiment, a casting bed 60 is provided having a plurality of surfaces 62, 64 for defining a generally rectangular interior area 66 corresponding generally to a desired overall shape of the finished wall structure 10. In the embodiment of FIG. 4, the casting bed 60 includes generally first and second elongated side rails 67, 68 arranged in a parallel, spaced-apart relationship, with first and second elongated gate members 70, 72 extending therebetween in parallel, spaced-apart relationship with one another, and in perpendicular relationship with the first and second side rails 67, 68. Each side rail 67, 68 defines an interior planar surface 62 facing an interior planar surface 62 of the opposite side rail 67, 68, and likewise, each gate member 70, 72 defines an interior planar surface 64 facing an interior planar surface 64 of the opposite gate member. Thus, the planar surfaces 62, 64 cooperate to define a substantially rectangular interior area 66 therebetween. The various side rails 67, 68 and gate members 70, 72 may be assembled and placed along a substantially flat, level support surface, such as a table or the floor, with respective lower edges of the interior planar surfaces 62, 64 substantially flush with the support surface, thereby substantially closing the lower end of the rectangular interior area 66. Thus, the interior area 66 forms a substantially planar, rectangular mold having an interior shape substantially corresponding to a desired overall shape of the finished wall structure 10.

In several embodiments, one or more of the interior planar surfaces 62, 64 of the casting bed may optionally define shapes suitable for forming the above-discussed fasteners and/or joint portions of the wall structure 10. For example, in one embodiment, the interior surface 64 of the second gate member 72 defines a lip 80 extending outwardly therefrom along a length thereof, while the interior surface 64 of the opposite first gate member 70 defines a groove 82 extending along a length thereof. The lip and groove 80, 82 provide mold surfaces of the casting bed 60 suitable to form the above-discussed matingly-shaped joint portions 56, 58 along opposite side surfaces of the finished wall structure 10. In other embodiments, suitable cutouts are provided along interior surfaces 62, 64 to allow the placement of fasteners along the interior surfaces, protruding into the interior area 66 of the casting bed 60.

With reference to FIG. 4, a stud frame 22 may be provided and positioned within the casting bed 60 to extend along the support surface. In several embodiments, the casting bed 60 is sized such that the frame 22 extends substantially fully between opposite interior surfaces 64 of the of the gate members 70, 72 and/or between opposite interior surfaces 62 of the side rails 67, 68. In other embodiments, the frame 22 may be sized to extend only partially between opposite interior surfaces 62 of the of the side rails 67, 68 and/or between opposite interior surfaces 64 of the gate members 70, 72. In such embodiments, the frame 22 may be positioned between the opposite interior surfaces 62, 64 of the side rails 67, 68 and gate members 70, 72 so as to provide space between the frame 22 and the interior surfaces 62, 64 for formation of the top beam 38 and toe 40 portions of the wall structure 10 discussed above. In some embodiments, a suitable spacer may optionally be positioned between the frame 22 and at least one interior surface 62, 64 of the casting bed 60 to assist in positioning the frame 22 at a desired location along the support surface of the casting bed 60. In some embodiments, the spacer may be designed to form a portion of the top beam 38 or toe 40 of the wall structure 10 upon completion of the wall structure 10 as described hereinbelow. For example, in the illustrated embodiment, the above-discussed insulating member 46 serves as an elongated spacer during manufacture of the wall structure 10. The insulating member (hereinafter, "spacer") 46 comprises a strip of insulating extruded polystyrene (XPS) approximately one inch in thickness. The spacer 46 is positioned between the upper member 74 of the stud frame 22 and an adjacent interior surface 62 of the casting bed 60. Upon completion of the present embodiment of the method as further described hereinbelow, the spacer 46 forms an interior portion of the top beam 38 of the wall structure 10 and provides a layer of insulation and moisture resistance to the top beam portion 38 of the wall structure 10.

Figure 5:
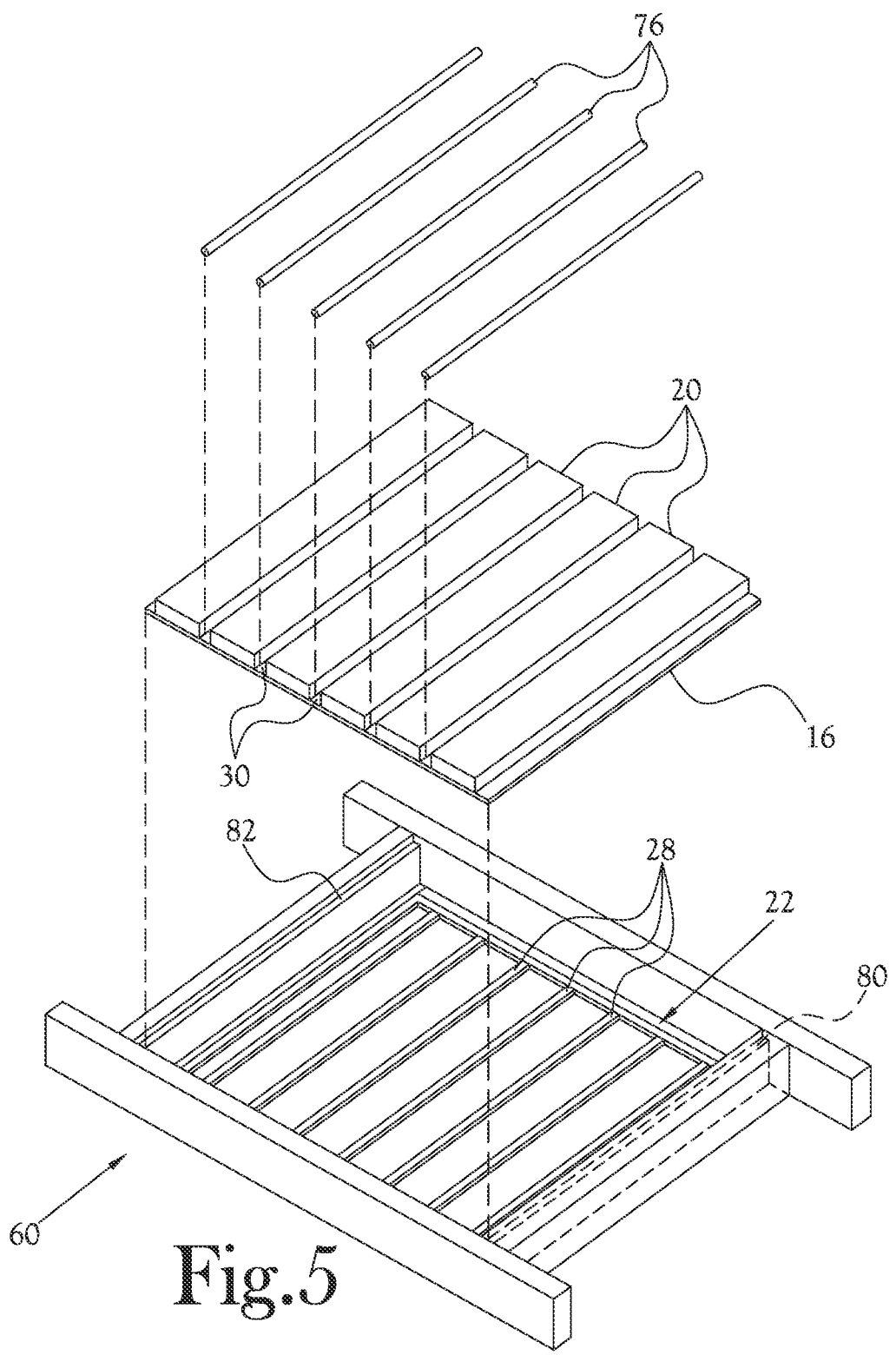
FIG. 5 is a partially exploded perspective view showing other operations of the method of FIG. 4.

With reference to FIG. 5, upon positioning the frame 22 within the casting bed 60, a forming member 16 may then be positioned in overlying relationship above the stud frame 22, with the rectangular protrusions 20 of the forming member 16 protruding generally upwardly away from the frame 22. In several embodiments, the forming member 16 may be sized to extend along the frame 22 to span the length and width of the frame 22, thereby cooperating with the support surface of the casting bed to encapsulate the spaces between each of the studs 28 of the frame 22 and to limit fluid communication between the spaces between the studs 28 and the remainder of the interior area 66 of the casting bed 60, in a preferred embodiment, the forming member 16 is positioned such that the protrusions 20 extend generally parallel to the studs 28 of the frame 22. However, it will be recognized that the protrusions 20 may be positioned non-parallel to the studs 28 without departing from the spirit and scope of the present general inventive concept.

As discussed above, the forming member 16 includes a plurality of rectangular protrusions 20 extending in parallel and spaced-apart relationship to define a plurality of parallel channels 30 extending along a width dimension of the forming member 16. In one embodiment, the forming member 16 is defined by a single, unitary member. In other embodiments, the forming member 16 is defined by a plurality of members arranged in side-by-side relationship to form the forming member 16. For example, in one embodiment, a plurality of forming member segments are provided, with each segment defining a portion of the total length of the forming member 16, including one or more of the rectangular protrusions 20 and one or more channels 30. In this embodiment, a plurality of forming member segments are provided and arranged in side-by-side relationship to form the complete forming member 16, including the desired number of rectangular protrusions 20 and channels 30 interposed therebetween. The forming member segments may be secured to one another via suitable fasteners of the type known to one of skill in the art.

With further reference to FIG. 5, following placement of the forming member 16 in the casting bed 60, a plurality of reinforcing members 76 are optionally positioned within the casting bed 60 at locations either above the forming member 16 or between the protrusions 20, within the channels 30. As discussed above, the reinforcing members 76 may be of the type commonly used to reinforce concrete, such as for example rebar segments, wire mesh, or the like. The reinforcing members 76 may be supported centrally along each of the channels 30 or may be supported from contact with the surfaces of the forming member 16 using suitable spacers of the type known to one of skill in the art.

Figure 6:
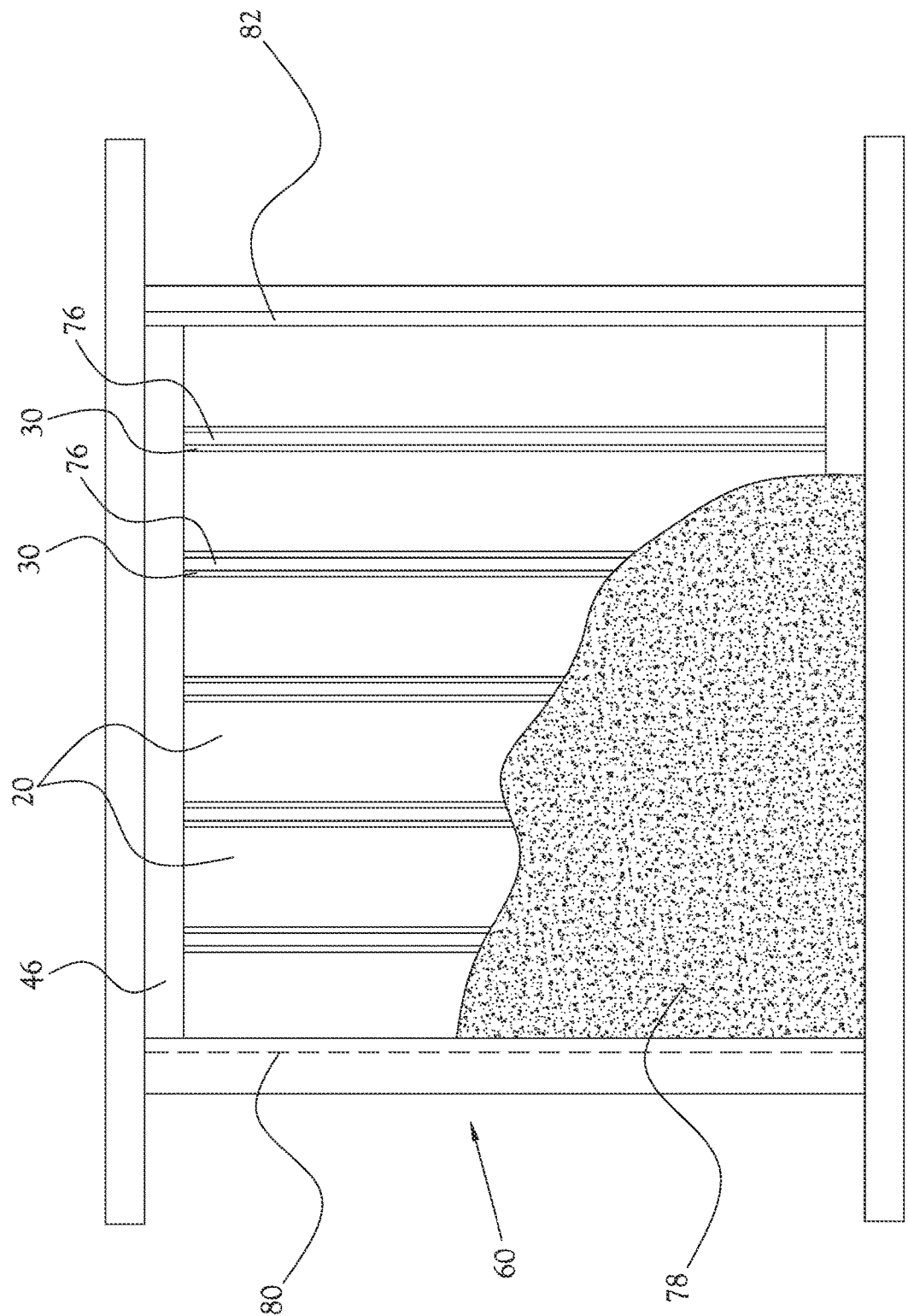
FIG. 6 is a top view showing other operations of the method of FIG. 4.

As shown in FIG. 6, following placement of the forming member 16 and optional placement of the reinforcing members 76, uncured, flowable concrete 78 is placed within the casting bed 60. The concrete 78 is allowed to fill each of the channels 30 and any voids between the side walls 62, 64 of the casting bed 60 and the frame 22 and forming member 16. For example, as discussed above, in one embodiment, suitable spaces are left between each of the upper and lower members 26 of the frame 22 and the adjacent walls 62, 64 of the casting bed 60 for formation of the top beam 38 and toe 40 portions of the wall structure 10 along outer edges of the wall structure adjacent the upper and lower members 26 of the frame 22. In such embodiments, the flowable concrete 78 is allowed to fill such spaces, thereby forming the top beam 38 and toe 40 portions of the wall structure 10. However, it will be recognized that, because the forming member 16 serves to encapsulate the spaces between each of the studs 28 of the frame 22, the forming member 16 limits the concrete from flowing into the spaces between each of the studs 28.

In certain embodiments, an upper surface of the uncured concrete 78 is finished to a substantially level surface. In other embodiments, self-leveling concrete is employed, such that finishing the upper surface subsequent to pouring the concrete 78 into the casting bed 60 is not necessary. In still other embodiments, and in particular in certain embodiments in which the outer surface of the concrete face 12 is to be exposed, such as for example when the wall structure 10 is to be used in an above-ground or partially above-ground setting, the uncured concrete 78 may be finished to a desired texture via tamping, troweling, brushing, stamping, or other techniques known in the art. Thereafter, the concrete is allowed to at least partially cure to form a rigid concrete face 12, thereby forming the finished wall structure 10. The wall structure 10 may then be removed from the casting bed 60 by means known in the art, such as for example by lifting the wall structure 10 and/or by disassembling, or partially disassembling, the casting bed 60. In still other embodiments, following curing of the concrete to form the rigid concrete face 12, the exterior surface of the concrete face 12 is further finished to a desired surface or texture. For example, in one embodiment following curing of the concrete, an additional application of material, such as for example paint, stain, wood or brick veneer, plaster, or the like, is applied to the outer surface of the concrete face 12. In another embodiment, following curing of the concrete, the outer surface of the concrete face 12 is abraded, such as for example by sanding, sandblasting, or the like, to a desired finish.

Figure 7:
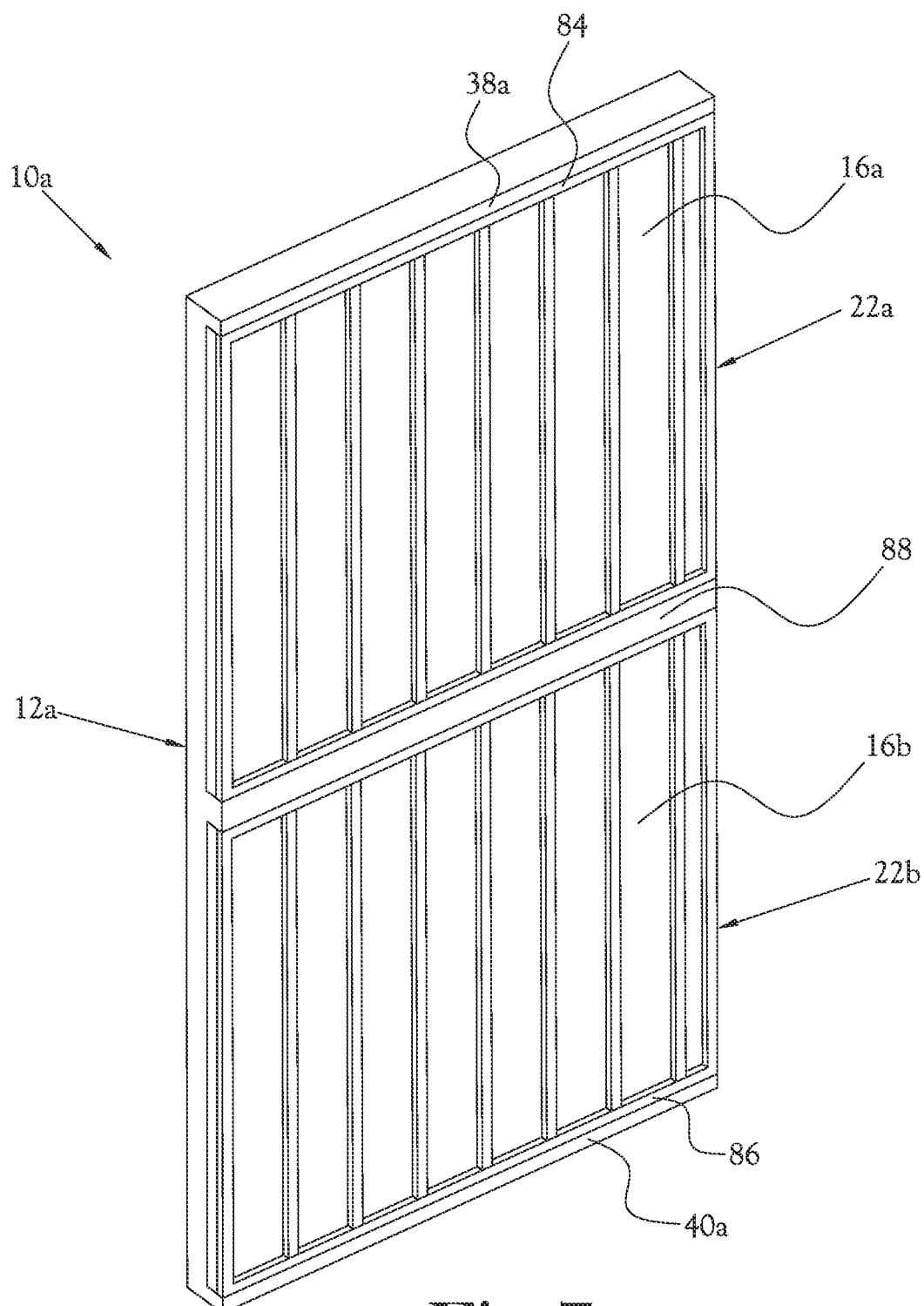
FIG. 7 is a perspective view of another embodiment of a precast concrete wall constructed in accordance with several features of the present general inventive concept.

FIGS. 7-10 illustrate another embodiment of a wall structure 10*a*, as well as various operations of another embodiment of a method according to several features of the present general inventive concept. In the embodiment of FIGS. 7-10, a wall structure 10*a* is formed which may be used in the construction of a wall which extends upwards to provide multiple floors in height. With reference to FIG. 7, in one embodiment, the wall structure 10*a* includes generally a first stud frame 22*a* and corresponding forming member 16*a* arranged in parallel-planar, overlying relationship with one another, and a second stud frame 22*b* and corresponding forming member 16*b* arranged in parallel-planar, overlying relationship with one another. The first stud frame 22*a* and corresponding forming member 16*a* are arranged in a spaced-apart, end-to-end configuration in relation to the second stud frame 22*b* and corresponding forming member 16*b*. Thus, the outer concrete face 12*a* extends around an upper end 84 of the first stud frame 22*a* and corresponding forming member 16*a* to form a top beam 38*a*, around a lower end 86 of the second stud frame 22*b* and corresponding forming member 16*b* to form a toe 40*a*, and between the two sets of stud frames and forming members to form an intermediary beam 88.

In the illustrated embodiment, the first and second sets of stud frames and forming members 16*a*, 22*a* and 16*b*, 22*b* are arranged in an end-to-end vertical configuration, such that the wall structure 10*a* may provide multiple floors in height. In such an embodiment, it will be recognized that the intermediary beam 88 may serve to provide a location for anchoring additional structures suitable to form an elevated ceiling, floor structure, or the like. However, it will further be understood that other configurations for the first and second sets of stud frames and forming members 16*a*, 22*a* and 16*b*, 22*b* may be utilized without departing from the spirit and scope of the present general inventive concept. For example, in another embodiment (not shown), the first and second sets of stud frames and forming members are arranged in a horizontal, side-by-side configuration, such that the concrete face forms a top beam along upper ends of both sets of stud frames and forming members, a toe along lower ends of both sets of stud frames and forming members, and a vertical stud extending between the two sets of stud frames and forming members. It will further be recognized that multiple sets of stud frames and forming members may be provided in side-by-side arrangement, end-to-end arrangement, or a combination thereof, without departing from the spirit and scope of the present general inventive concept.

Figure 8:
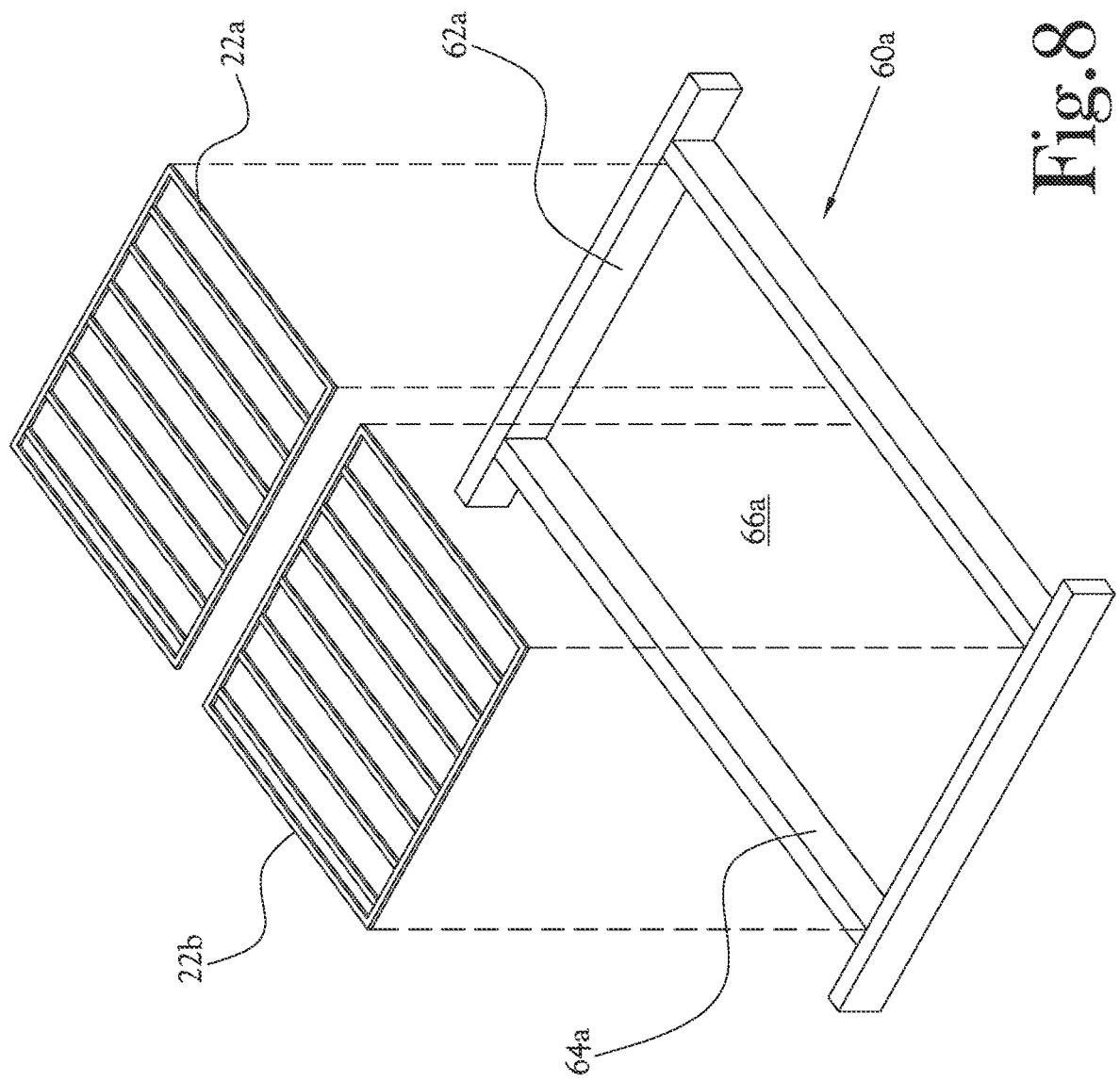
FIG. 8 is a partially exploded perspective view showing various operations of another embodiment of a method according to several features of the present general inventive concept.
Figure 9:
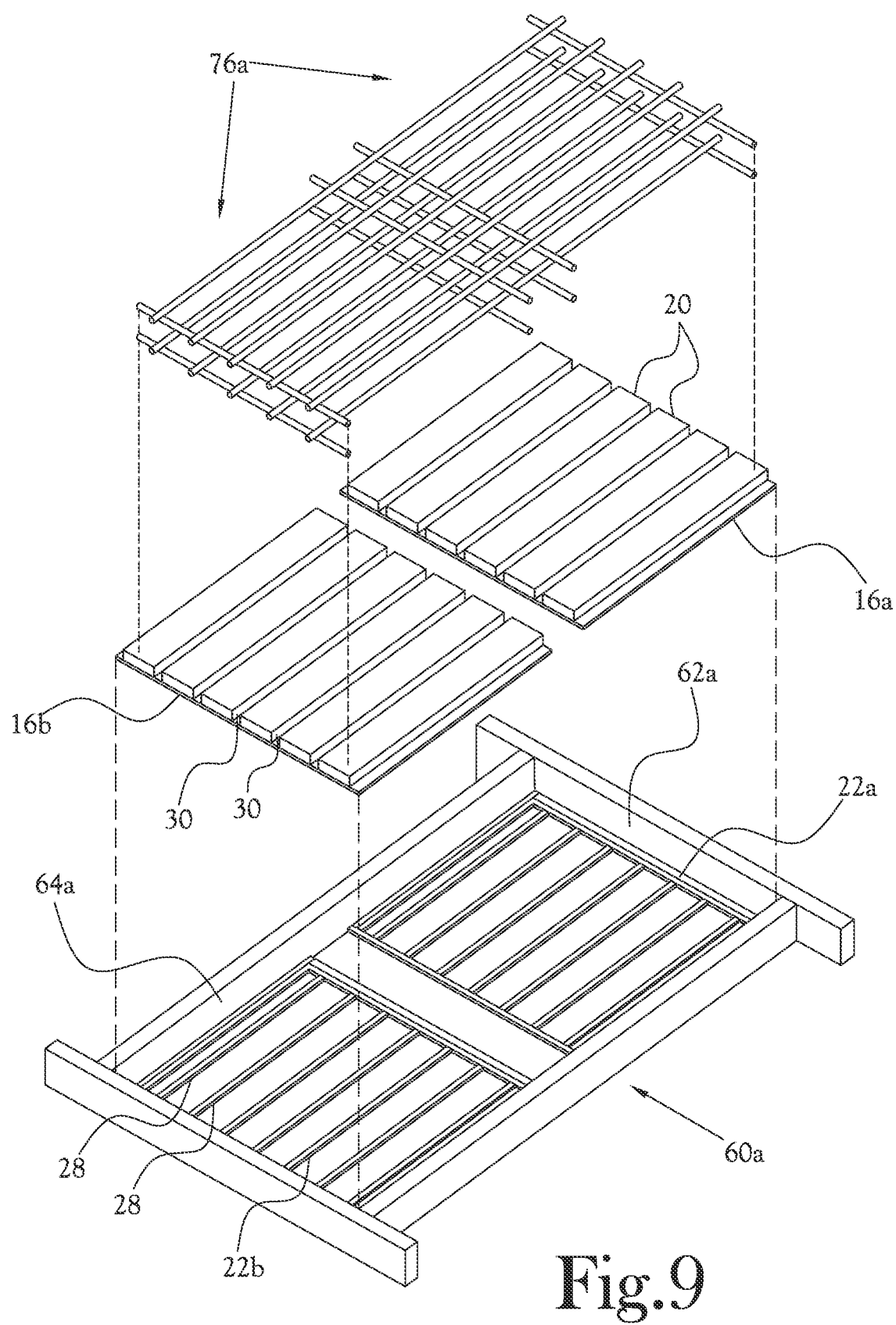
FIG. 9 is a partially exploded perspective view showing other operations of the method of FIG. 8.
Figure 10:
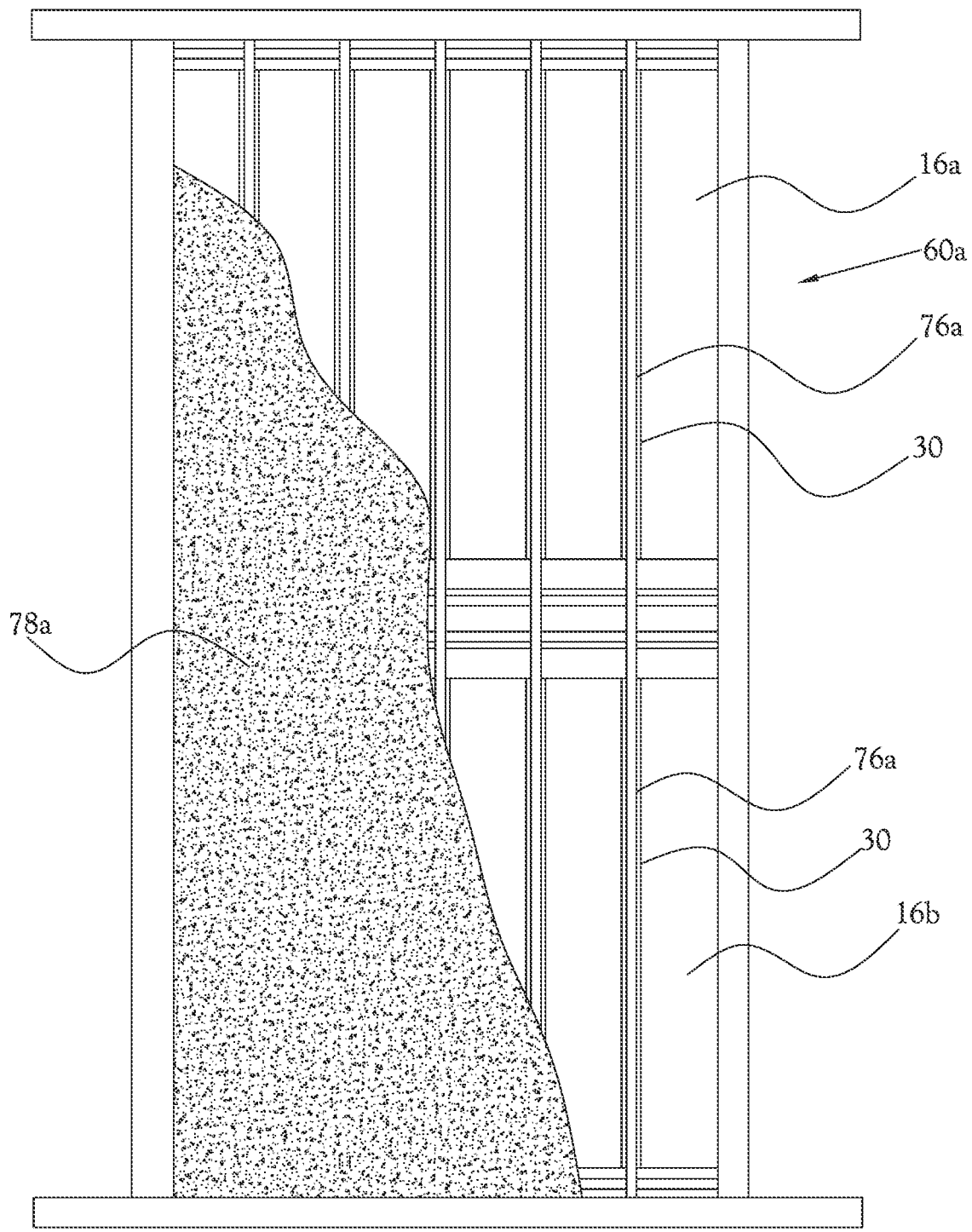
FIG. 10 is a top view showing other operations of the method of FIG. 8.

With reference to FIGS. 8-10, in one embodiment of the method, a casting bed 60*a* is provided having a plurality of surfaces 62*a*, 64*a* for defining a generally rectangular interior area 66*a* corresponding generally to a desired overall shape of the finished wall structure 10*a*. Of note in the present illustrated embodiment, the depicted casting bed 60*a* does not include the above-discussed structures suitable for formation of the joint. Thus, each of the interior surfaces 62*a*, 64*a* of the casting bed 60*a* is relatively smooth and upright.

As shown in FIG. 8, in one embodiment of the method, the above-discussed first and second stud frames 22*a*, 22*b* may be provided and positioned within the casting bed 60*a* in a parallel-planar relationship along the support surface, and in an end-to-end, or side-by-side, and spaced-apart relationship with one another. In the illustrated embodiment, the casting bed 60*a* is sized such that the first and second frames 22*a*, 22*b* each extend substantially fully between opposite interior side surfaces 64*a* of the of casting bed 60*a*. However, the distance between opposite interior end surfaces 62*a* of the casting bed 60*a* is such that the frames 22*a*, 22*b* extend between the end surfaces 62*a* in their end-to-end and spaced-apart configuration and allow sufficient space from the end surfaces 62*a* to form the above-discussed top beam 38*a* and toe 40*a*. It will be noted that, in the illustrated embodiment, the above-discussed spacer between the frames and the interior surfaces of the casting bed is not provided. However, one or more such spacers similar to the one described above may be provided without departing from the spirit and scope of the present general inventive concept.

With reference to FIG. 9, upon positioning the first frame 22*a* within the casting bed 60*a*, the first forming member 16*a* may then be positioned in overlying relationship above the first frame 22*a*, with the rectangular protrusions 20 of the first forming member 16*a* protruding generally upwardly away from the first frame 22*a*. Likewise, upon positioning the second frame 22*b* within the casting bed 60*a*, the second forming member 16*b* may then be positioned in overlying relationship above the second frame 22*b*, with the rectangular protrusions 20 of the second forming member 16*b* protruding generally upwardly away from the second frame 22*b*. Similar to the above-discussed embodiment, the forming members 16*a*, 16*b* may be sized to extend along their respective frames 22*a*, 22*b* to span the length and width of the frame, thereby cooperating with the support surface of the casting bed 60*a* to encapsulate the spaces between each of the studs 28 of the respective frame 22*a*, 22*b* and to limit fluid communication between the spaces between the studs 28 and the remainder of the interior area 66*a* of the casting bed 60*a*. Furthermore, as discussed above, each of the forming members 16*a*, 16*b* may be defined by a single, unitary member, or may be defined by a plurality of members arranged in side-by-side relationship to form the forming member.

With further reference to FIG. 9, following placement of the forming members 16*a*, 16*b* in the casting bed 60*a*, a plurality of reinforcing members 76*a* are optionally positioned within the casting bed 60*a* at locations either along or between the forming members 16*a*, 16*b*. In the illustrated embodiment, the reinforcing members 76*a* are distributed generally along the various channels 30 of the forming members 16*a*, 16*b*, along the space between the two forming members 16*a*, 16*b* and between the two frames 22*a*, 22*b*, and along the spaces between each of the forming members 16*a*, 16*b* and their respective adjacent interior end surfaces 62*a* of the casting bed 60*a*. As shown in FIG. 10, following placement of the reinforcing members 76a, uncured, flowable concrete 78a is placed within the casting bed 60a. The concrete 78a is allowed to fill each of the channels 30 of the forming members 16a, 16b, the space between the two forming members 16a, 16b and between the two frames 22a, 22b, and any voids between the side walls 62a, 64a of the casting bed 60a and the frames 22a, 22b and forming members 16a, 16b. Thus, the flowable concrete 78 is allowed to form the top beam 38a, toe 40a, and intermediate beam 88 portions of the wall structure 10.

Similar to the above-discussed method, in certain embodiments, an upper surface of the uncured concrete 78a is finished to a desired surface. For example, in certain embodiments, the upper surface of the uncured concrete 78a is finished to a substantially level surface. In still other embodiments, the uncured concrete 78a is finished to a desired texture via techniques known in the art, such as for example painting, staining, tamping, troweling, brushing, stamping, or the application of veneers or other such surface coverings. The concrete is allowed to at least partially cure to form the rigid concrete face 12a, thereby forming the finished wall structure 10a. The wall structure 10a may then be removed from the casting bed 60a by means known in the art such as for example by lifting the wall structure 10a and/or by disassembling, or partially disassembling, the casting bed 60a.

From the foregoing description, it will be recognized by one skilled in the art that a precast concrete wall structure and method for manufacturing a precast concrete wall structure are provided herein which allow significant improvement over prior art methods and apparatus. For example, it will be recognized that, by forming the forming layer 16 from an insulating material, such as for example expanded polystyrene (EPS), extruded polystyrene (XPS), rockwool, or other such material, the forming layer 16 serves to increase the insulating properties of the wall structure 10, thereby allowing the wall structure 10 to be used in applications in which an insulating wall is desired absent the need to add further insulating material to the wall structure 10. It will further be recognized that the amount of thermal resistance provided by the materials of the forming layer 16 are, at least in part, a function of the average thickness per unit area of forming layer material along the surface of the wall structure 10. Accordingly, it will be recognized that the specific dimensions of the forming layer 16, i.e., the thickness, width, and spacing of the protrusions 20 and of the portions of the forming layer 16 between the protrusions 20, may vary in order to achieve a desired thermal resistance of the wall structure 10, while also maintaining structural integrity of the wall structure 10 and suitability of the wall structure 10 for use in a specific application.

It will be recognized that through application of the method disclosed herein, a precast concrete wall structure may be made having significant advantages over conventional poured-in-place concrete wall structures. Through application of the method disclosed herein, a precast concrete wall structure weighing approximately 50 lbs. per square foot may be produced, wherein a poured-in-place concrete structure of the same thickness would weigh approximately 126 lbs. per square foot. Thus, significant reductions in material cost and associated transportation expense may be achieved. Furthermore, it will be recognized that the precast concrete wall structure provided herein includes a frame having studs pre-installed along one surface thereof, thereby saving the expense and labor associated with installing these fixtures at the desired finished location for the wall structure. In several embodiments, the EPS and XPS materials forming the wall structure may be recycled into other products following their use in the wall structure, and in certain embodiments, scrap EPS materials may be used to form the forming member. Furthermore, it will be understood that the reinforcing members may be formed from recycled materials, i.e., recycled rebar, without departing from the spirit and scope of the present general inventive concept.

Various example embodiments of the present general inventive concept may also be used to produce floor and/or roof structures such as floor panels, roof panels, deck panels, etc. FIGS. 11-18 illustrate various features and configurations of two example embodiments of such panels. For the sake of simplicity in these descriptions, the structures may be referred to simply as panels, but it is understood that the structures can be utilized as floor panels, deck panels, roof panels, etc., or any other number of similar structures, including wall panels.

Figure 11:
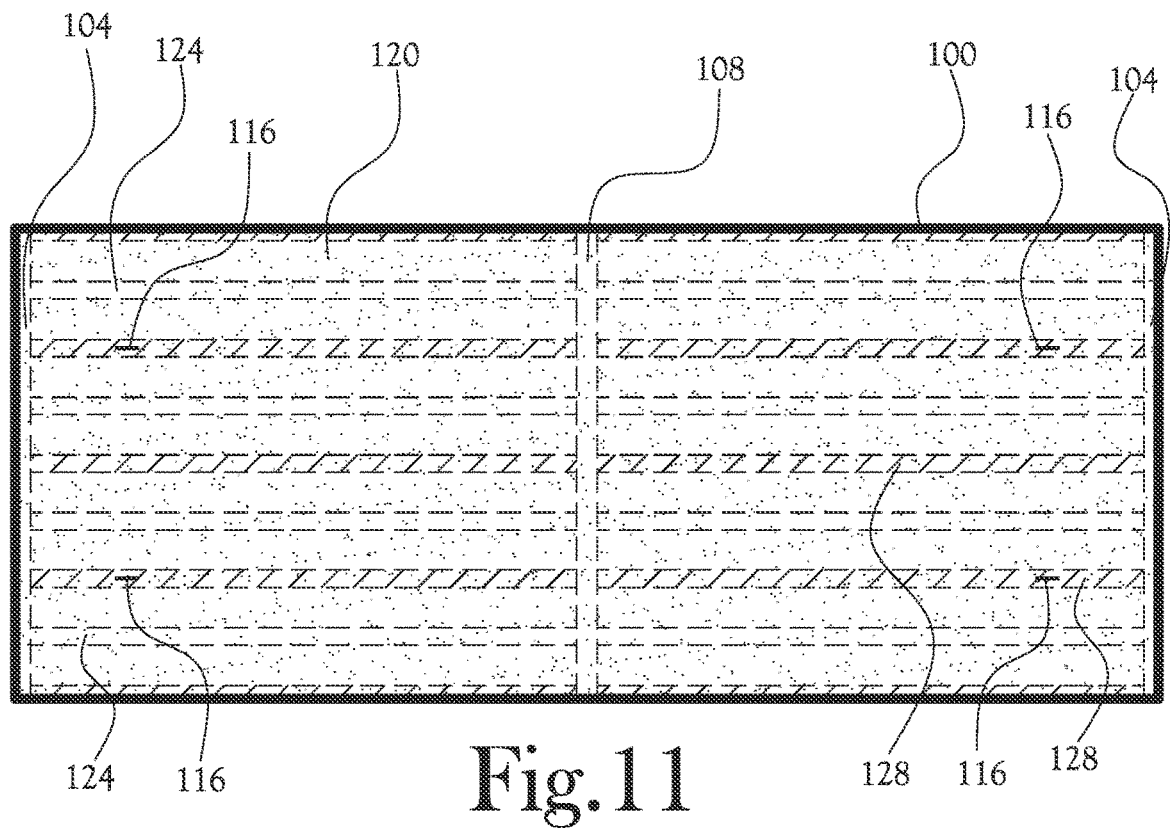
FIG. 11 illustrates a plan view of a panel according to an example embodiment of the present general inventive concept.
Figure 12:
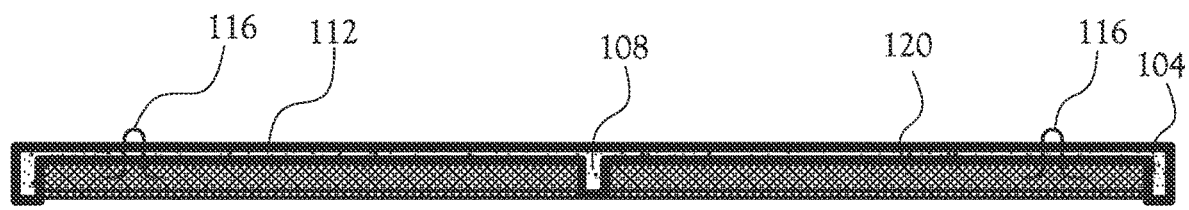
FIG. 12 illustrates a lengthwise section of the panel of FIG. 11.
Figure 13:
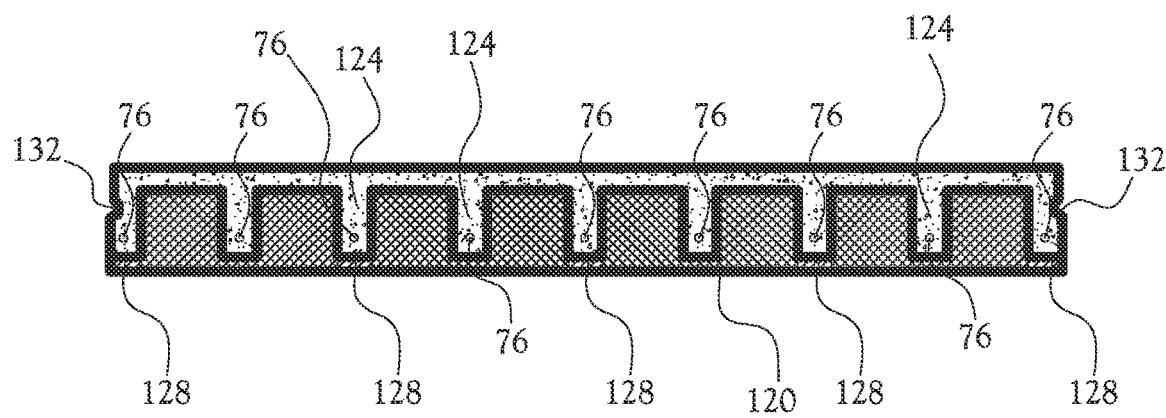
FIG. 13 illustrates a crosswise section of the panel of FIG. 11.
Figure 14:
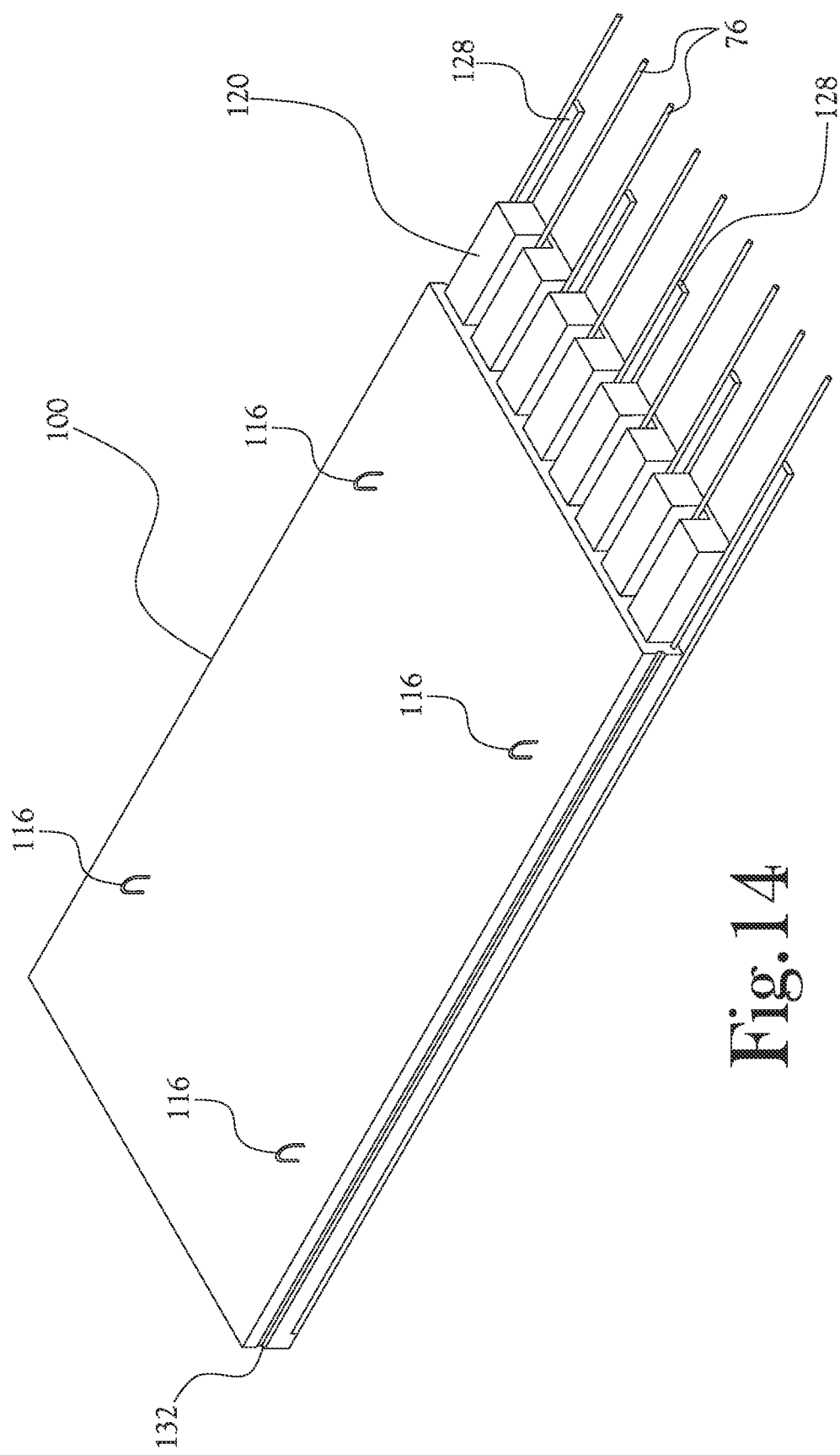
FIG. 14 illustrates a perspective view of the panel of FIG. 11 with a partial breakout to show some of the inner components of the panel.

FIG. 11 illustrates a plan view of a panel according to an example embodiment of the present general inventive concept, FIG. 12 illustrates a lengthwise section of the panel of FIG. 11, FIG. 13 illustrates a crosswise section of the panel of FIG. 11, and FIG. 14 illustrates a perspective view of the panel of FIG. 11 with a partial breakout to show some of the inner components of the panel. The example embodiment illustrated in FIGS. 11-14 is a panel with no soffit. As can be seen from FIGS. 11-14, the panel 100 is similar to the example embodiments illustrated in FIGS. 140, but is formed without a stud frame. As illustrated in the plan view of FIG. 11, the panel 100 has bearing closures 104 provided across the entirety of both respective ends of the panel 100. These bearing closures 104 are analogous to the top beam 38 and toe 40 illustrated in FIGS. 1-3. An intermediary beam 108, which may be referred to herein as a web stiffener, is provided across the panel 100 at approximately the center point of the panel 100. In various example embodiments of the present general inventive concept, the panel 100 may be formed with a length of 10 feet from an end of the panel 100 to a center of the intermediary beam 108, but placement of such a beam in other example embodiments may vary. As a floor or roof panel is likely to encounter more forces acting in a direction perpendicular to a face of the panel 100, such intermediary beams 108 may be more necessary than would be needed for a wall panel. The web stiffener or intermediary beam 108 may be provided with a reinforcement component such as rebar, prestressing strand, wire, etc., to produce increased structural support against flexing or other undesired forces. Although the example embodiment in FIG. 11 illustrates one intermediary beam 108, or web stiffener, proximate the center of the panel 100, other example embodiments of the present general inventive concept may include no or more intermediary beams, and/or may vary in the placement of the beam(s). The longitudinal section of the panel 100 illustrated in FIG. 12 shows the bearing closures 104, as well as the web stiffener 108, which in various example embodiments may each have a width of approximately 4 inches. FIG. 12 also shows the upper surface of the panel having a face 112 which may have, for example, have a thickness of approximately two inches. Similar to the previously described example embodiments, the face, bearing closures, and web stiffener are formed of concrete. However, it is understood that different example embodiments may include more or fewer components, and may have different dimensions, than those illustrated in FIGS. 11-14 without departing from the scope of the present general inventive concept.

As illustrated in FIG. 12, the web stiffener 108 of this example embodiment does not extend as far from the face 112 of the panel 100 as do the bearing closures 104 formed at each end of the panel 104, This configuration may be formed by the forming member 120 used in the construction of the panel 100, in which the forming member defines a channel in which the web stiffener 108 is formed. As discussed herein, the forming member 120 may be of single piece construction, or may include several separately formed components depending upon the desired configuration and features. FIG. 12 also illustrates lifting devices 116 such as lift hooks that may be formed to aid in the lifting and otherwise moving, installation, etc., of the panel 100. The lifting devices may vary according to different example embodiments and/or desired usage, and may be simply omitted in various example embodiments of the present general inventive concept.

As illustrated in FIG. 13, the forming member 120 defines a plurality of parallel and evenly spaced channels in which concrete joists 124 are formed. In various example embodiments of the present general inventive concept, the forming member 120 may be constructed of any of a host of types of insulation, but are preferably structurally robust enough for concreted to be poured over without being deformed. As illustrated in FIG. 13, every other concrete joist 124 is provided with a nailer strip 128 on the face thereof, such as, for example, a P.T. 2×4 nailer strip, for attaching other surface fixtures/bodies/members to a bottom face of the panel. In various example embodiments of the present general inventive concept, wooden 2×4's may be employed as the nailer strips 128. It is understood that "upper" and "bottom" surface terms are used relative to the orientation illustrated in FIGS. 11-14, and the panel 100 may be used in different orientations such as, for example, the discussed "upper" surface facing a bottom of an installation. To provide the nailer strips 128 to the panel, the insulation forming member 120 may (actually include a number of separately formed components. For example, to produce the example embodiment illustrated in FIG. 13, four separate forming member 120 components may be employed. Each of the four separate forming members 120 may define a central longitudinal channel in which an entire concrete joist 124 may be formed, and a centrally defined cross channel in which the previously described web stiffener 108 may be formed. By alternating these forming member 120 components with nailer strips 128, and arranging the components so that all are in flush contact with one another, the regularly spaced and formed concrete joists 124 may be formed in the channels defined therein. In various example embodiments, the nailer strips 128 may be formed integrally with the insulation components of the forming member 120 to provide a single piece construct. As indicated in FIG. 14, each of the concrete joists may have reinforcing members 76 such as, for example, rebar, prestressing strand, wire, etc., formed therein to provide enhanced structural support. Multiple strands of rebar or other structural components may be employed in each web location, and depth placement of the structural components may vary according to various example embodiments of the present general inventive concept. As illustrated in FIG. 14, rebar has been placed in each of the channels defined by the forming member(s), in which the concrete joists are formed, to act as the reinforcing members 76.

As illustrated in FIG. 13, grout keyways 132 may be formed on the respective outer surfaces of the outermost concrete joists 124 to improve the connection of panels 100 to one another. The grout keyways 132 may be formed by protrusions in the casting bed in which these panels 100 are formed. In the example embodiment illustrated in FIG. 13, the grout keyways 132 may be approximately 2 inches wide, and may start at a point approximately 3 inches from the upper surface of the panel. As also illustrated in FIG. 13, the width of the portion of the outermost concrete joists 124 between the grout keyway 132 and the upper surface may be approximately ½ inch smaller than the width of the concrete joist 124 below the grout keyway 132. Such an indention may also be formed in the casting bed and may be formed by the same protrusions respectively forming the grout keyways 132.

The forming of a panel such as that illustrated in FIGS. 11-14 may in various example embodiments be similar to the process previously described in relation to FIGS. 4-6, albeit without the inclusion of a stud frame. A casting bed defining the desired length, width, and thickness of the frame may be constructed and placed upon a flat forming surface. The inner surface of the lengthwise members of the casting bed may have formed thereon the protrusion(s) to form the grout keyways 132 of the panel, as well as the outer indentation of the upper part of the outermost concrete joists. In various example embodiments, a nailer strip 128 may be placed on the flat surface inside the casting bed and flush against one lengthwise member of the casting bed. Space may be left at either end of the nailer strip 128 to form the bearing closures 104. Such spacing may be actuated by other methods rather than simply leaving an empty space, in order to prevent the forming members 120 from movement during fabrication of the panel 100. Then a forming member 120 may be placed flush alongside the nailer strip 128, and the process may be repeated until the casting bed is filled. After the forming members 120 are placed, rebar or other structural components may be placed in the respective grooves or channels to act as reinforcing members 76 in the spaces that will form the concrete joists 124. The channels may be defined such that the concrete joists 124 will be parallel and evenly spaced across the width of the panel 100, and running end to end to the bearing closures 104. The insulation used in the forming members 120 may be one of the types mentioned in the previously described embodiments of the present general inventive concept. After placement of all the forming members 120 and structural reinforcements, uncured, flawable concrete is placed within the casting bed. The concrete is allowed to fill each of the channels of the forming members 120, the space at the longitudinal ends of the forming members 120, and to form the face 112 or upper surface over the forming members 120 to the desired thickness. The upper surface of the uncured concrete may be finished to a desired surface as described in the previous example embodiments of the present general inventive concept. Upon removal from the casting bed, or upon removal of the casting bed, the panel 100 will have the form illustrated in FIGS. 11-14.

Figure 15:
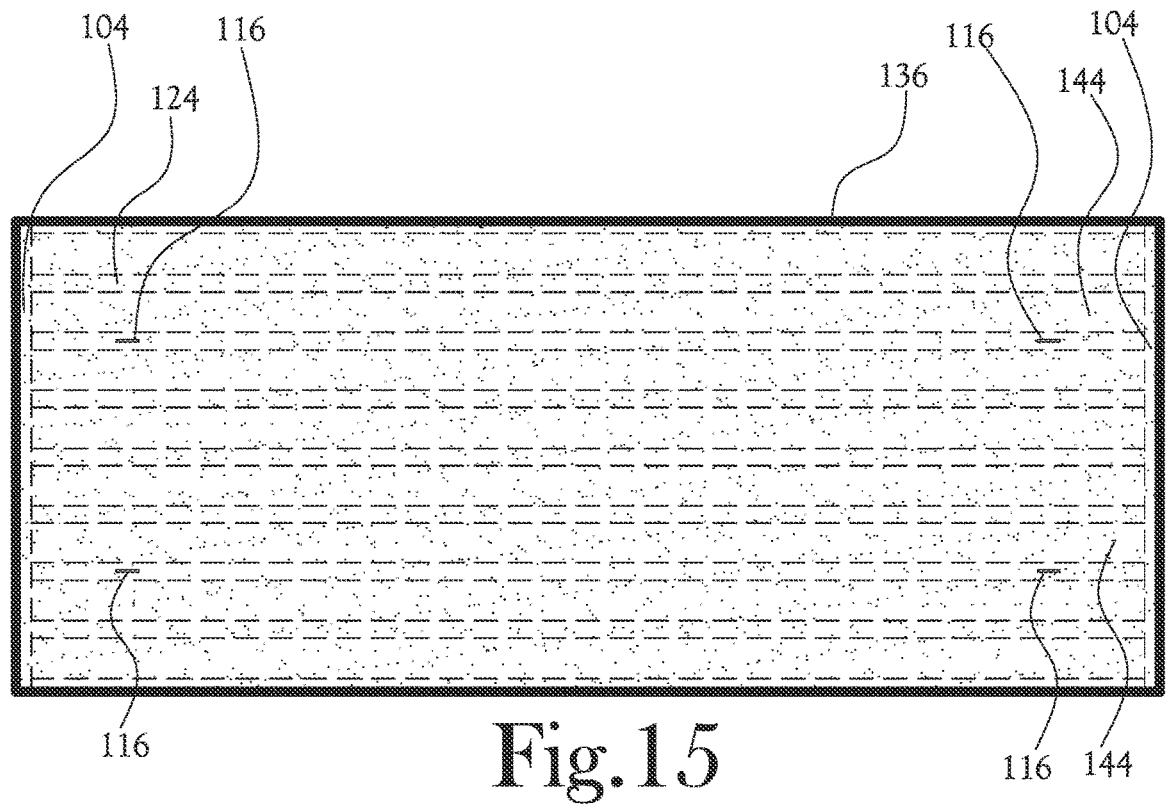
FIG. 15 illustrates a plan view of a panel according to another example embodiment of the present general inventive concept.
Figure 16:
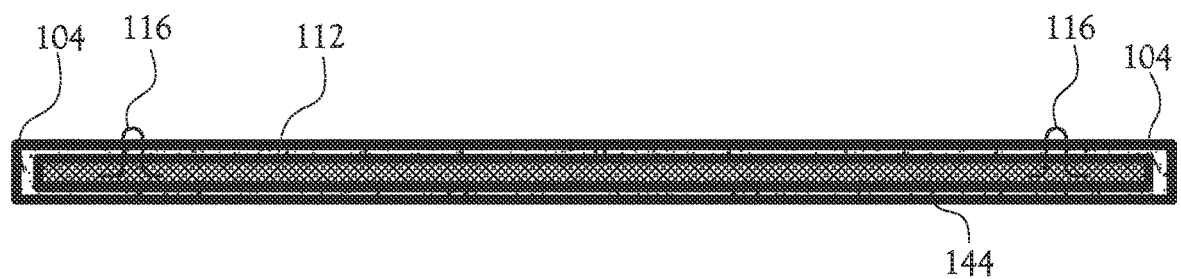
FIG. 16 illustrates a lengthwise section of the panel of FIG. 15.
Figure 17:
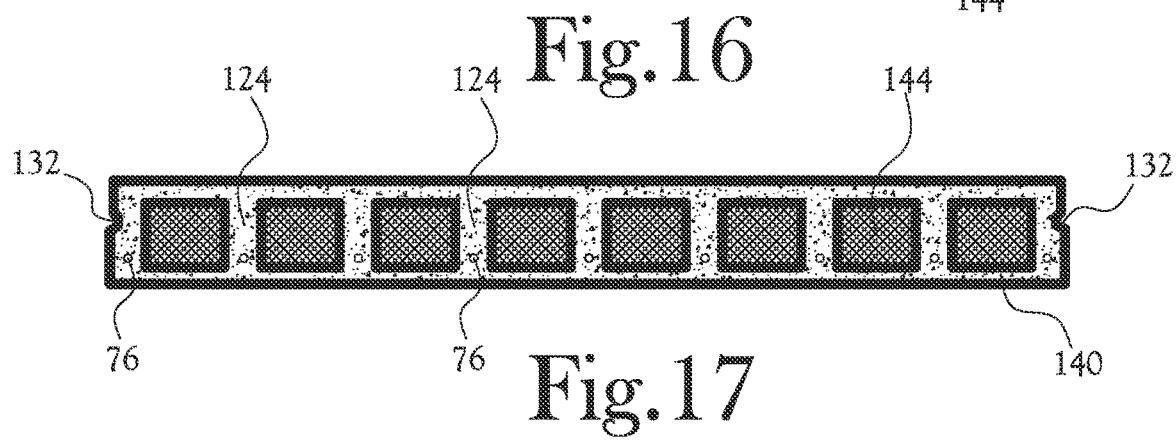
FIG. 17 illustrates a crosswise section of the panel of FIG. 15.
Figure 18:
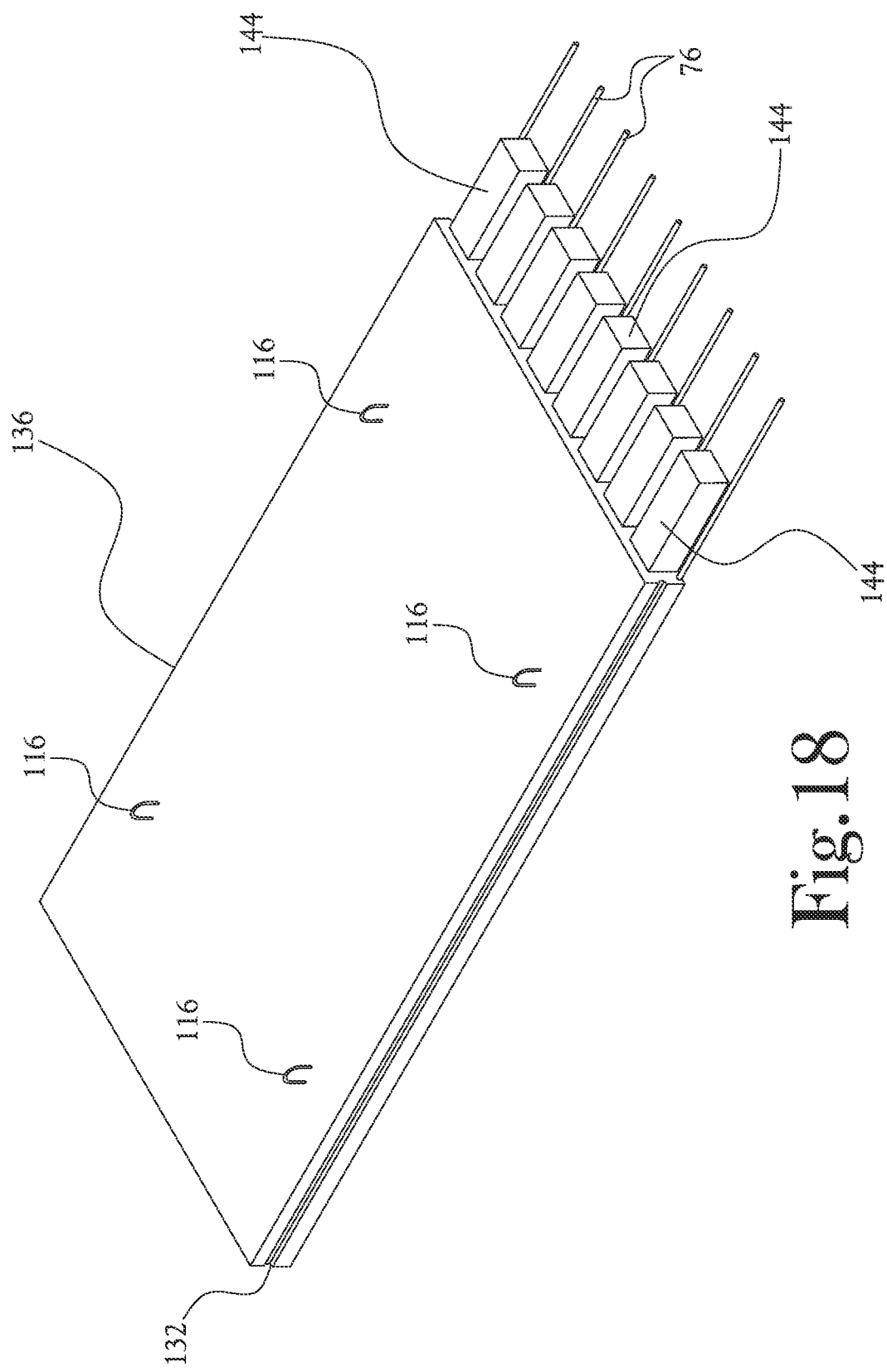
FIG. 18 illustrates a perspective view of the panel of FIG. 15 with a partial breakout to show some of the inner components of the panel.

FIG. 15 illustrates a plan view of a panel according to another example embodiment of the present general inventive concept, FIG. 16 illustrates a lengthwise section of the panel of FIG. 15, FIG. 17 illustrates a crosswise section of the panel of FIG. 15, and FIG. 18 illustrates a perspective view of the panel of FIG. 15 with a partial breakout to show some of the inner components of the panel. The example embodiment panel 136 illustrated in FIGS. 15-18 is similar to the example embodiment illustrated in FIGS. 11-14, except that a concrete soffit 140 is provided to the panel 136. Thus, rather than having a lower surface formed of insulation and nailer strips, the lower surface will be formed uniformly with concrete that may be the same as the upper surface or face 112 of the panel 136. To form such a panel 136, in which insulation portions 144 acting as forming members are "floating" inside the concrete wall, in various example embodiments an approximately 2 inch layer of concrete is poured into the casting bed before the forming members or insulation portions 144 of the panel 136 are placed therein. This lower sheet of concrete forms the soffit 140 of the panel 136. After the lower sheet of concrete has cured to a desired state so as to support the weight of the forming members or insulation portions 144 and concrete poured thereon, the insulative forming members 144 are placed at regular intervals in the casting bed on top of the soffit 140 such that channels are defined therebetween in which concrete joists 124 will be formed. As in the example embodiment illustrated in FIGS. 11-14, space may be left at each end for the bearing closures 104, and approximately 4 inch spaces may be left between each of the forming members 144, and between the outermost forming members 144 and the casting bed, to define the channels in which the concrete joists 124 will be formed. In various example embodiments, methods of maintaining the spacing may be employed to keep the forming members 144 in place during the pouring of the uncured concrete. The structural reinforcement components 76 and lift hooks 116 may be placed as in FIGS. 11-14, and the uncured concrete is poured over the forming members 144. In the example embodiment illustrated in FIGS. 15-18, no intermediate beam or web stiffener is included at a center of the panel 136, as the soffit 140 will provide additional structural support for the panel 136. However, in various example embodiments of the present general inventive concept, one or more such web stiffeners may be provided. Various example embodiments of the present general inventive concept may employ connection components to assist the soffit 140 and the later poured concrete to adhere to one another. In various example embodiments of the present general inventive concept, the soffit layer 140 may be added after the upper layer has been formed by simply inverting the partially poured panel and adding the soffit layer 140 atop the panel 136 in a casting bed. In the example embodiment illustrated in FIGS. 15-18, the soffit layer 140 is approximately 2 inches thick, but various example embodiments of the present general inventive concept may provide soffits of various thicknesses. The soffit 140 may be finished to a desired surface as described in the previous example embodiments of the present general inventive concept.

While various example embodiments of the present general inventive concept described thus far have included a precast wall structure typically having a smooth concrete outer surface, which may be used, for example, in an underground or partially underground situation in which the outer surface of the wall structure is not seen or not aesthetically important, other various example embodiments of the present general inventive concept may include a prefabricated wall veneer that may be adhered to the outer concrete surface to provide a more aesthetically pleasing precast wall structure, and/or stylings formed in the outer concrete surface to provide various types of façades. Such prefabricated wall veneers may be formed to have a host of different looks, such as, for example, brick, stone, stucco, ribbed or other raised and/or unraised geometric patterns, etc. The different desired looks/textures of the veneers may be formed by stamping during production of the veneer panels. These prefabricated wall veneers may be fixed to a precast wall structure during the production of the precast wall structure to provide a desired look for an outside wall of a building employing the precast wall structure. The prefabricated wall veneers may be formed of wood composite and/or other composite materials which resist damage from moisture, rot, splitting, pests, and so on, while providing many years of maintenance free use, By forming the veneers to a desired look, painting and other types of general maintenance may be avoided.

Figure 19:
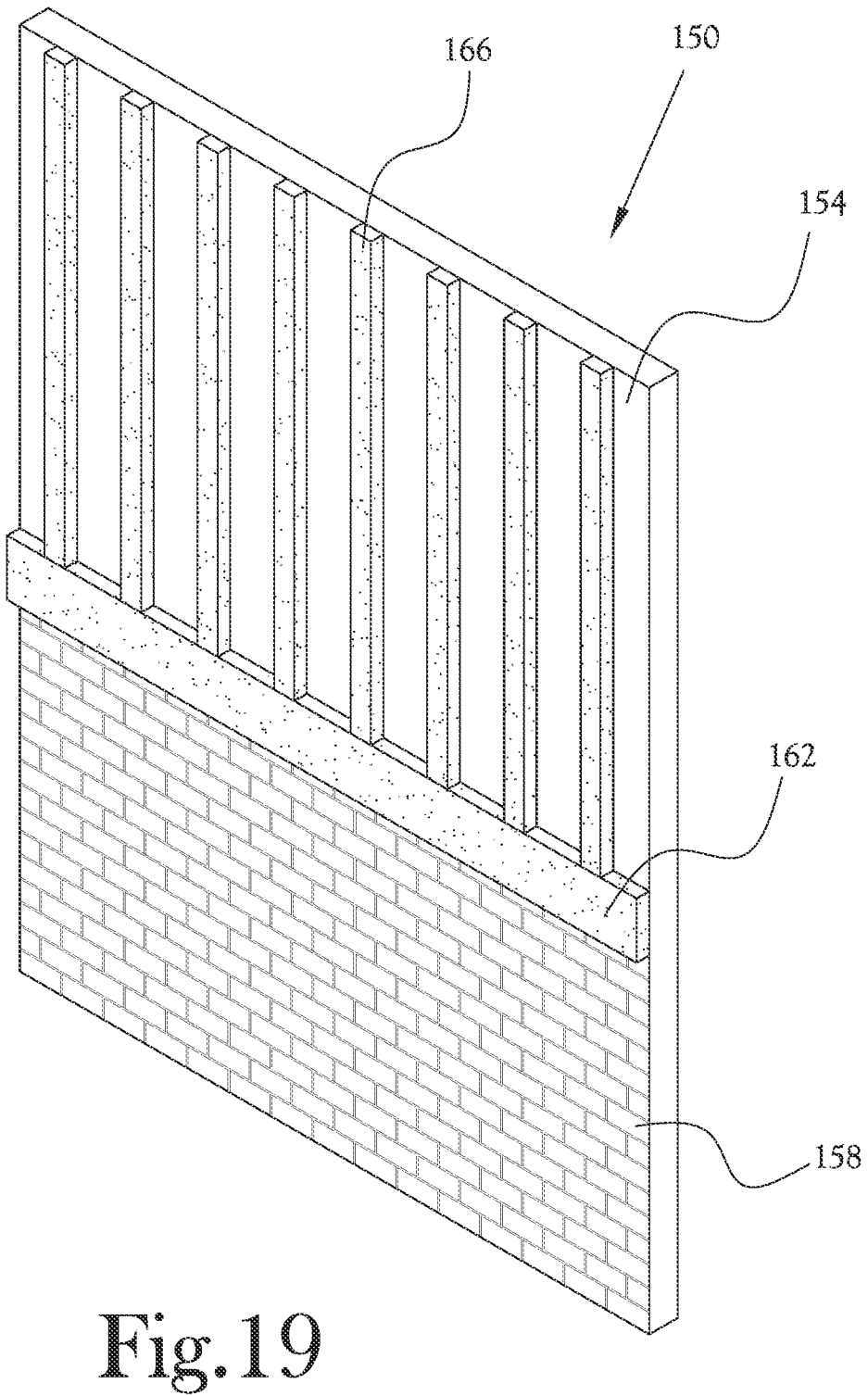
FIG. 19 illustrates a perspective view of a prefabricated wall with a veneer according to an example embodiment of the present general inventive concept.

FIG. 19 illustrates a perspective view of a prefabricated panel with a veneer according to an example embodiment of the present general inventive concept. In this example embodiment the prefabricated wall and veneer 150 is configured to have an outer façade with two different decorative portions, including an upper portion having trim members such as a horizontal trim member 162 and a plurality of vertical trim members 166, and a lower portion having a brick pattern 158. Portions of concrete 154 of the panel 150 not adorned by the veneer are shown between the vertical members 166. In this example embodiment the horizontal trim member 162 is configured as a frieze board, and the vertical trim members 166 are configured as batten strips, but various example embodiments may have a host of differently configured trim members, or no trim members at all. It is understood that the façade of the prefabricated wall and veneer 150 discussed herein may have any of a number of different surface looks, thicknesses, feel, etc., and may have fewer or more decorative areas than described herein. Various portions of the veneer may be configured to be fixed to the concrete 154 during the forming of precast concrete wall structure, and may have anchoring members that extend into the concrete 154 (as described further herein). In the example embodiment illustrated in FIG. 19, the brick pattern 158 is embedded into the concrete 154, but in various example embodiments the brick pattern itself may be an external façade affixed to the concrete 154 of the panel 150.

Figure 20A:
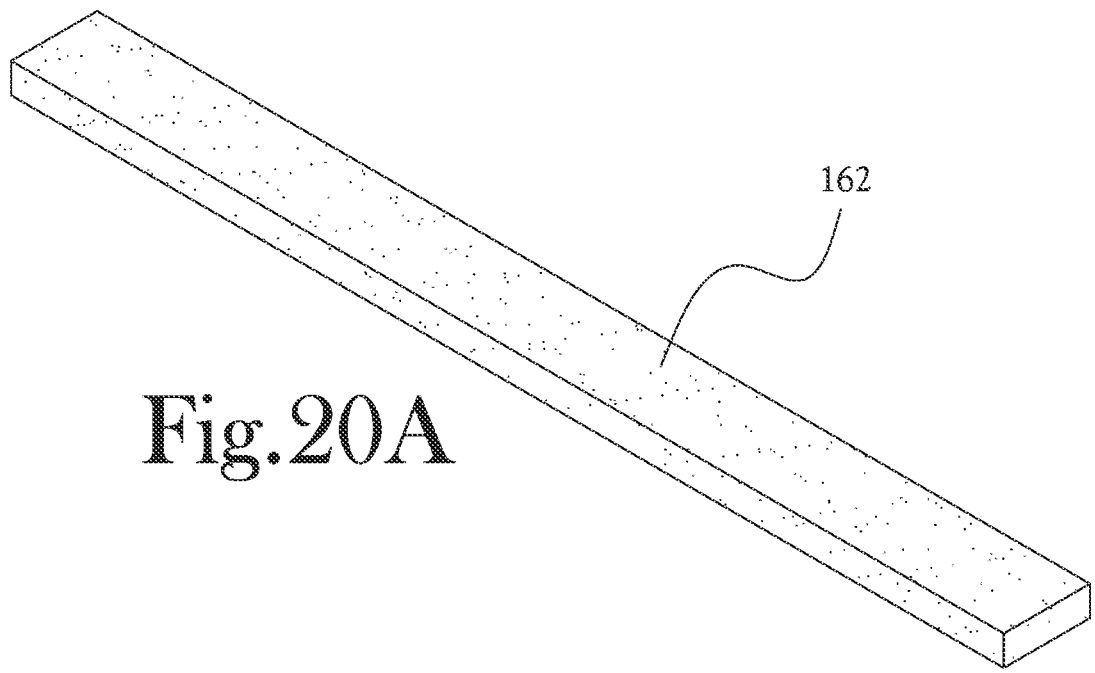
FIGS. 20A-D illustrate the preparation of the horizontal trim member of FIG. 19 according to an example embodiment of the present general inventive concept.
Figure 20B:
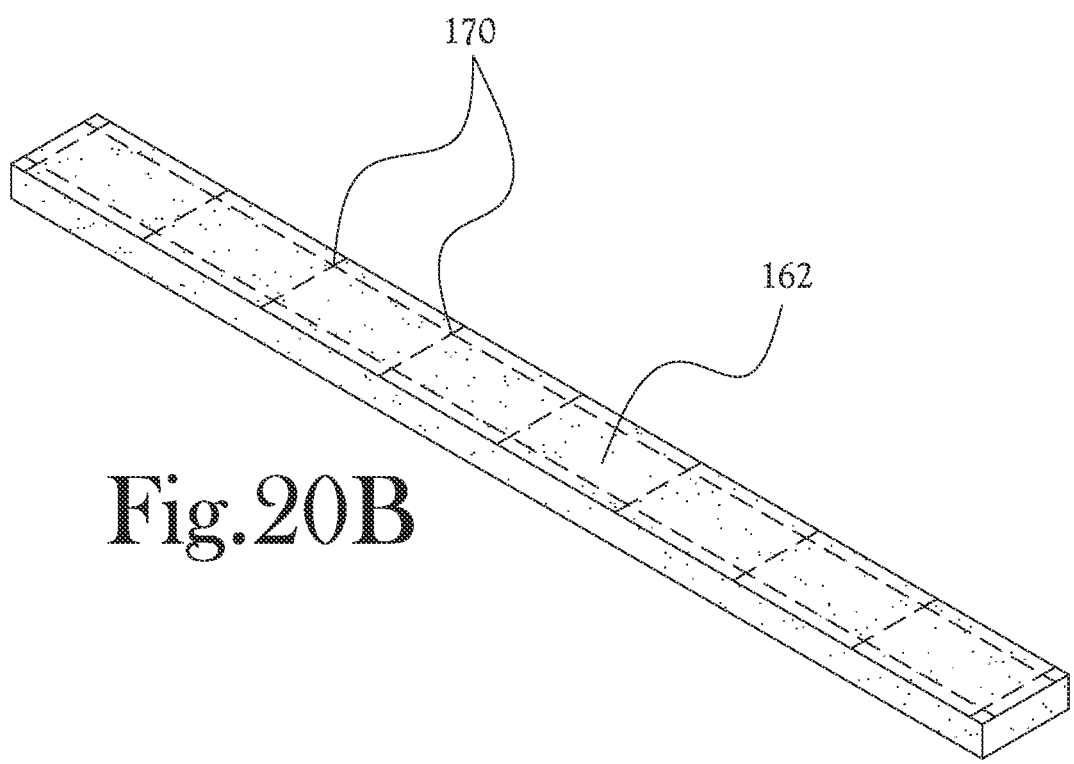
Figure 20C:
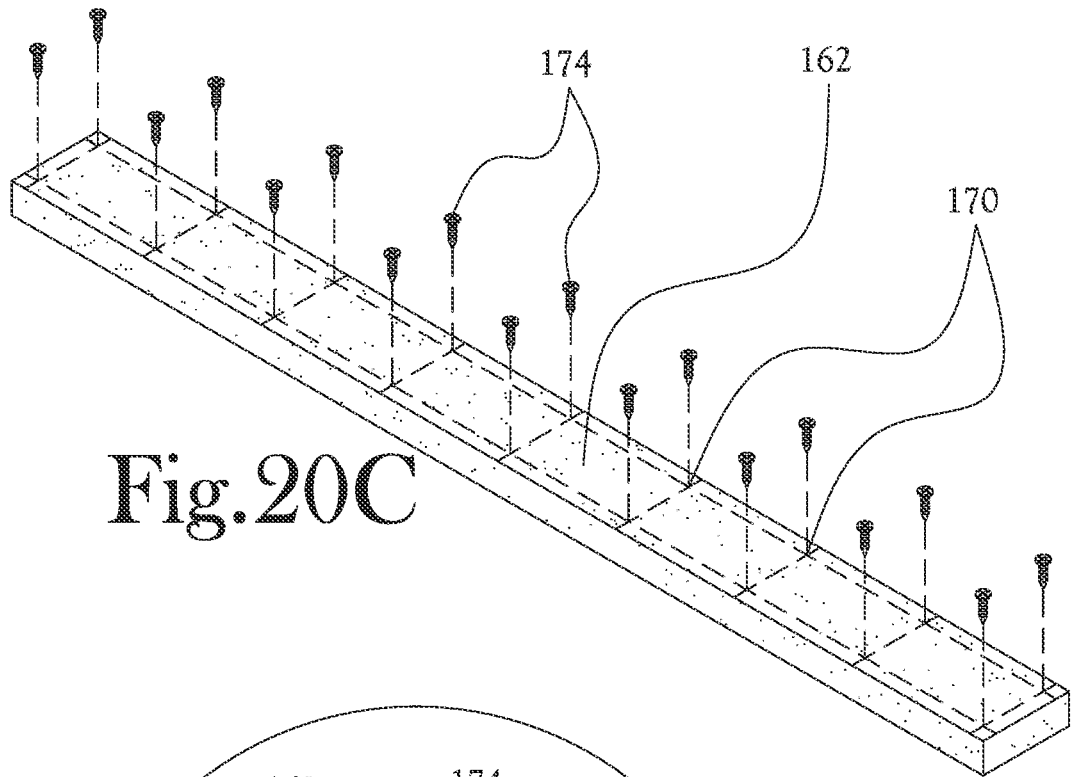
Figure 20D:
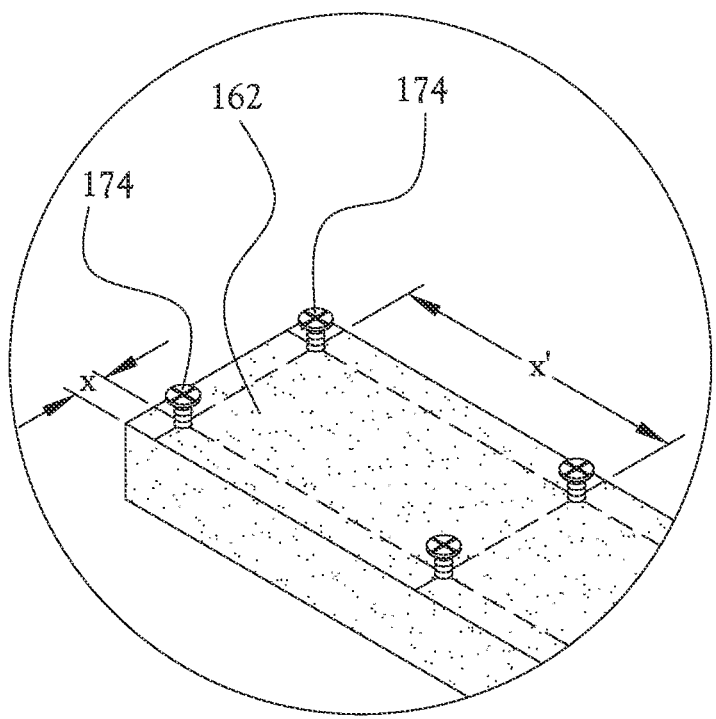

FIGS. 20A-D illustrate the preparation of the horizontal trim member 162 of FIG. 19 according to an example embodiment of the present general inventive concept. As previously described, the horizontal trim member 162 of this example panel 150 is configured as a frieze board, and serves as a border between the brick pattern 158 and the vertical trim members 166. The horizontal trim member 162 of FIG. 20A has been cut to the desired size, e.g., having a length corresponding to the width of the prefabricated panel 150, and coated with a sealant, as the trim member 162 may be exposed to outside weather elements. In this example embodiment the horizontal trim member 162 is coated with a bituminous coating as a sealant, but it is understood that different sealants may be used without departing from the scope of the present general inventive concept. FIG. 20B shows markings made on the horizontal trim member 162 to determine anchor points 170 for the anchor members 174 shown in FIG. 20C. In this example embodiment, the anchor members 174, and thus the anchor points 170 at which the anchor members 174 will be affixed, are to be attached to the horizontal trim member 162 at substantially nine-inch intervals along the length of the horizontal trim member 162, and substantially one inch from the border of the horizontal trim member 162. Thus, as shown, an assembler has measured the one-inch and nine-inch intervals along the length of the board, and the cross sections of the markings are the anchor points 170 at which the anchor members 174 are attached. In various example embodiments these described anchor point 170 intervals may be used with any trim member that is wider than four inches FIG. 20D illustrates the anchor members 174 attached to the horizontal trim member 162 at those anchor points 170. In this example embodiment the anchor members 174 are anchor screws that are screwed into the horizontal trim member 162, and the heads of the anchor screws are wholly encased in the concrete 154 into which the anchor members 174 extend. Various example embodiments may provide a host of different anchor points and/or configurations of anchor members. In this example embodiment, the horizontal trim member 166 and vertical trim members 166 may be formed of a composite material such as MIRATEC®, and may simply be a non-structural decorative trim. After the anchor members 174 have been screwed into the horizontal trim member 162, additional sealant may be provided about the insertion point of the anchor members 174 to seal the opening created by attaching the anchor members 174.

Figure 21A:
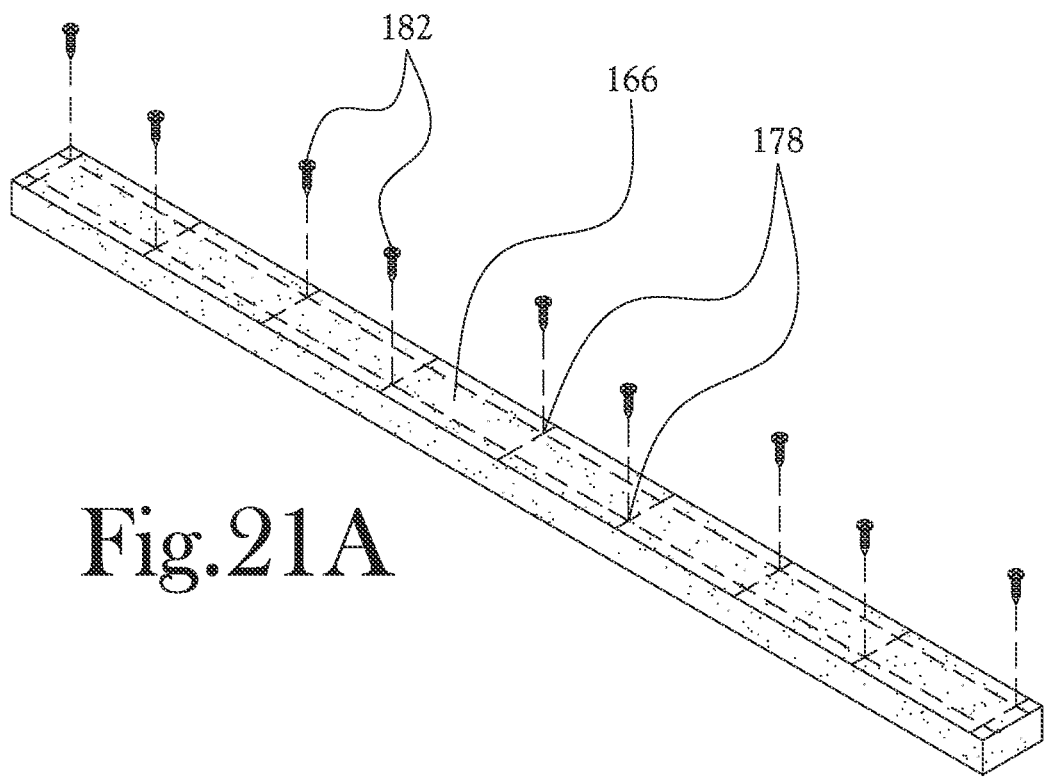
FIGS. 21A-B illustrate the preparation of the vertical trim members of FIG. 19 according to an example embodiment of the present general inventive concept.
Figure 21B:
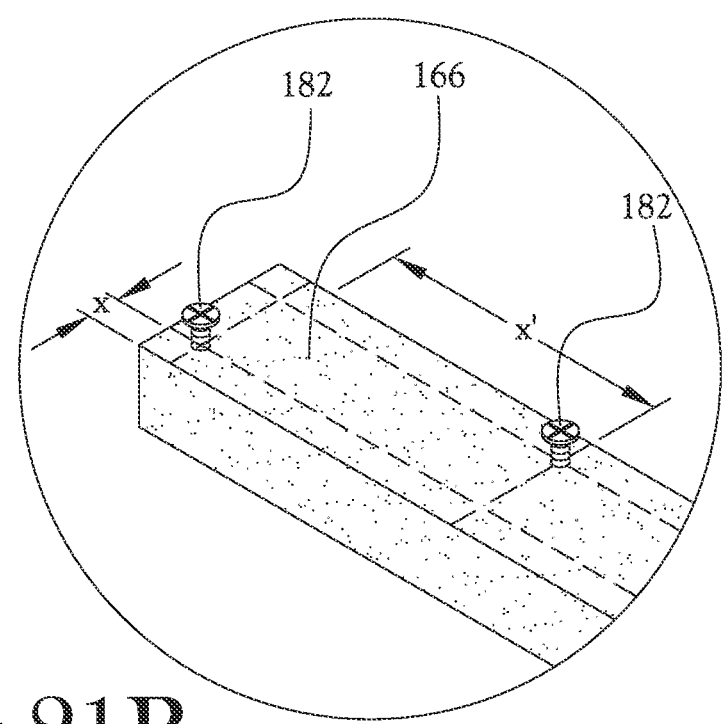

FIGS. 21A-B illustrate the preparation of the vertical trim members of FIG. 19 according to an example embodiment of the present general inventive concept. Similar to the preparation of the anchor points 170 in FIG. 20B, in FIG. 21A anchor points 178 are provided at nine inch intervals along the length of the vertical trim members 166, and one inch from the edge of the vertical trim members 166. However, in this example embodiment, trim members having a width of less than 4" may have anchor members 182 in the staggered pattern shown in FIG. 21B, in which the anchor members 182 are provided in an alternating pattern as shown, with the anchor members 182 skipping every other anchor point such that no two anchor members 182 are side by side on the batten strips or vertical trim members 166. After this preparation, the horizontal trim members 162 and vertical trim members 166 are ready to be placed in the curing concrete, so that they are anchored in place when the concrete 154 is dried.

Figure 22A:
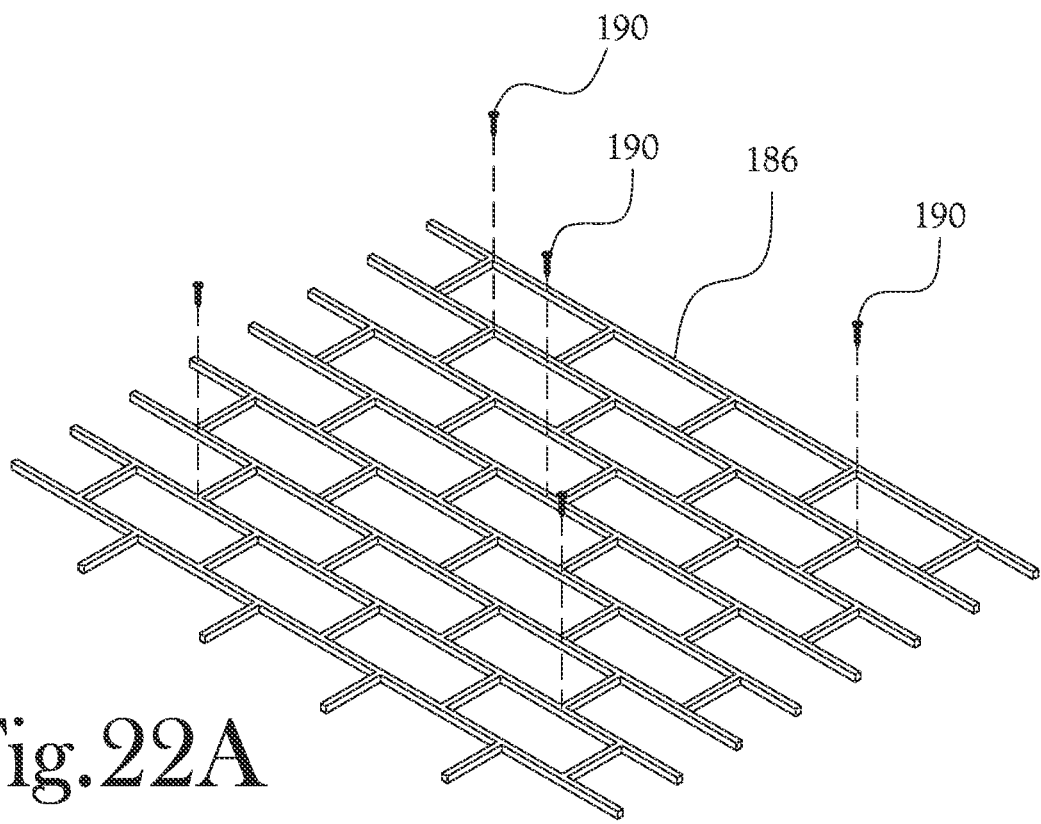
FIGS. 22A-B illustrate the preparation of a brick stamp used to form the brick pattern of FIG. 19 according to an example embodiment of the present general inventive concept.
Figure 22B:
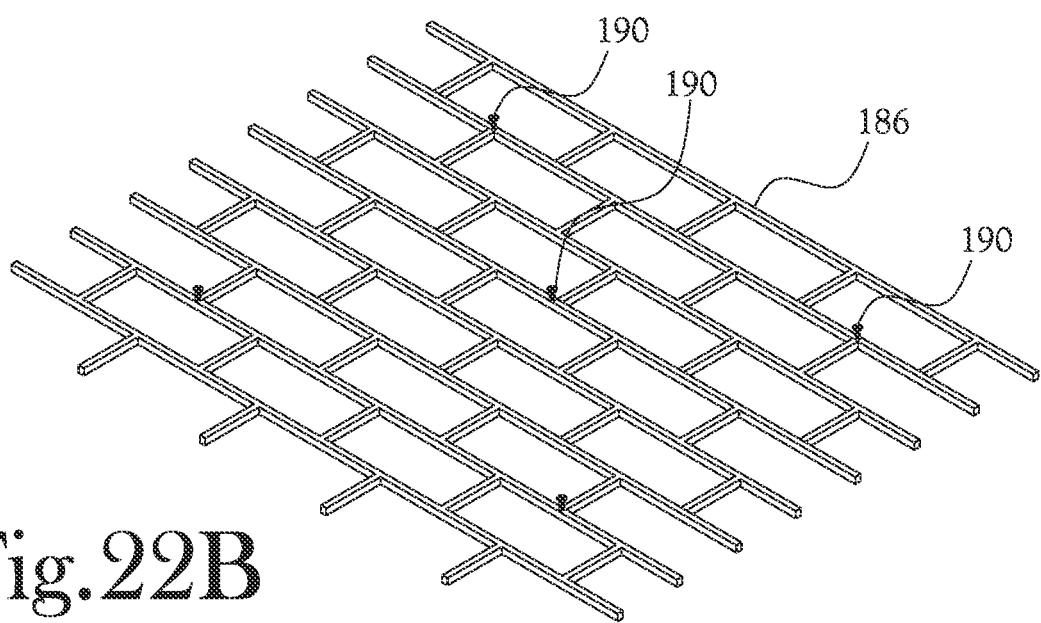

FIGS. 22A-B illustrate the preparation of a brick stamp used to form the brick pattern of FIG. 19 according to an example embodiment of the present general inventive concept. As illustrated in FIGS. 22A-B, a brick stamp 186 is cut to a desired size for the wall and veneer panel 150. The brick stamp 186 is a model of a brick pattern that may be placed in the drying concrete to form the brick pattern 158 shown in FIG. 19. As illustrated, the brick stamp 186 is a skeletal structure in which the body of the brick stamp 186 corresponds to the mortar between the bricks, and the open spaces of the brick stamp 186 correspond to the bricks themselves. In various example embodiments the thickness of the brick stamp 158 corresponds to the desired depth of the mortar in the gaps between the bricks in the brick pattern 158. In this example embodiment a plurality of the brick patterns 158 are cut to a desired size such that they all may be placed on the curing concrete to form the overall brick pattern 158 shown in FIG. 19. In various example embodiments a brick pattern may be cut that is large enough to only use that one brick pattern in the formation of the panel 150, but using a plurality of smaller brick patterns 158 as described herein may be more convenient for the assembler/fabricator to place in, and remove from, the curing concrete. As illustrated in FIGS. 22A-B a plurality of grip members 190 are attached to the brick pattern 158 to provide the assembler a convenient point to hold in order to manipulate the brick patterns 158 into and out of the curing concrete. In this example embodiment, the grip members 190 are screws that are screwed in the brick pattern 158 close to each corner, with one in the middle, to provide a plurality of conveniently located grips for the assembler, but it is understood that a host of different grip members may be used, as well as in a host of different configurations, without departing from the scope of the present general inventive concept. In various example embodiments pattern stamps other than a brick pattern may be provided to form façades on the panel, and such stamps may be configured to be removed before the concrete is fully cured, or to remain in place after the concrete is fully cured.

Figure 23B:
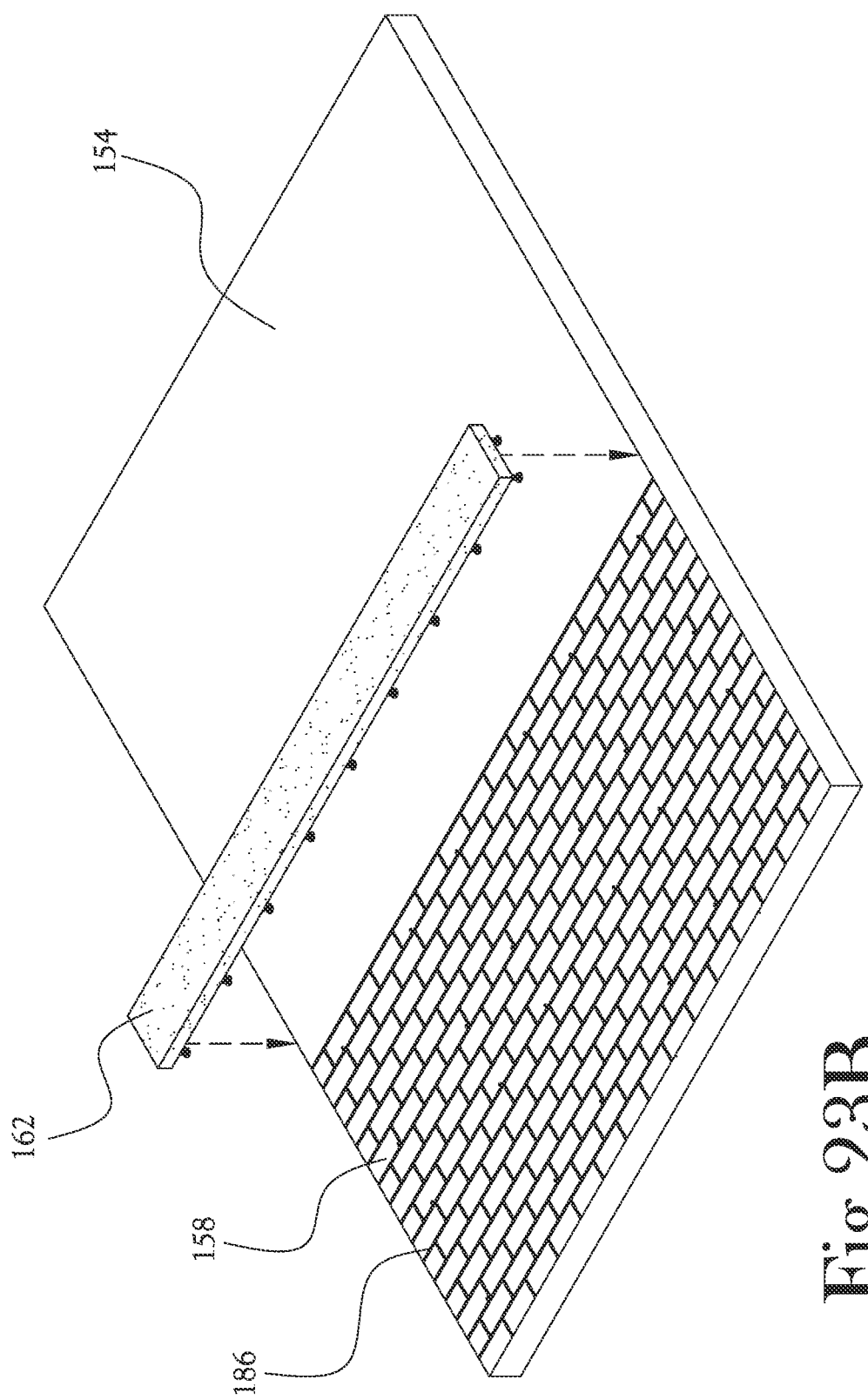

FIGS. 23A-D illustrate the forming of the prefabricated wall with the veneer of FIG. 19 according to an example embodiment of the present general inventive concept. In FIG. 23A, the concrete 154 has been freshly poured, and may have been poured over any of the various structures previously described herein to form various internal portions and/or the interior surface of the wall panel 150, and thus has a substantially planar upper surface on which to form the veneer portion or portions. In FIG. 23A the brick stamps 186 are placed in the curing concrete 154. An assembler may use the grip members 190 to easily place the brick stamps 186 in the concrete 154, and as shown the brick stamps 186 may be cut so that they correspond to each adjacent brick stamp 186 to form a proper brick pattern 158, including the edges between panels 150. After placing the brick stamps 186 in the curing concrete, they may be tamped down until the upper surface of the brick stamps 186 is substantially flush with the upper surface of the curing concrete 154, so as to provide desired and uniform depth of the appearance of "mortar" between the appearance of "bricks."

Figure 23C:
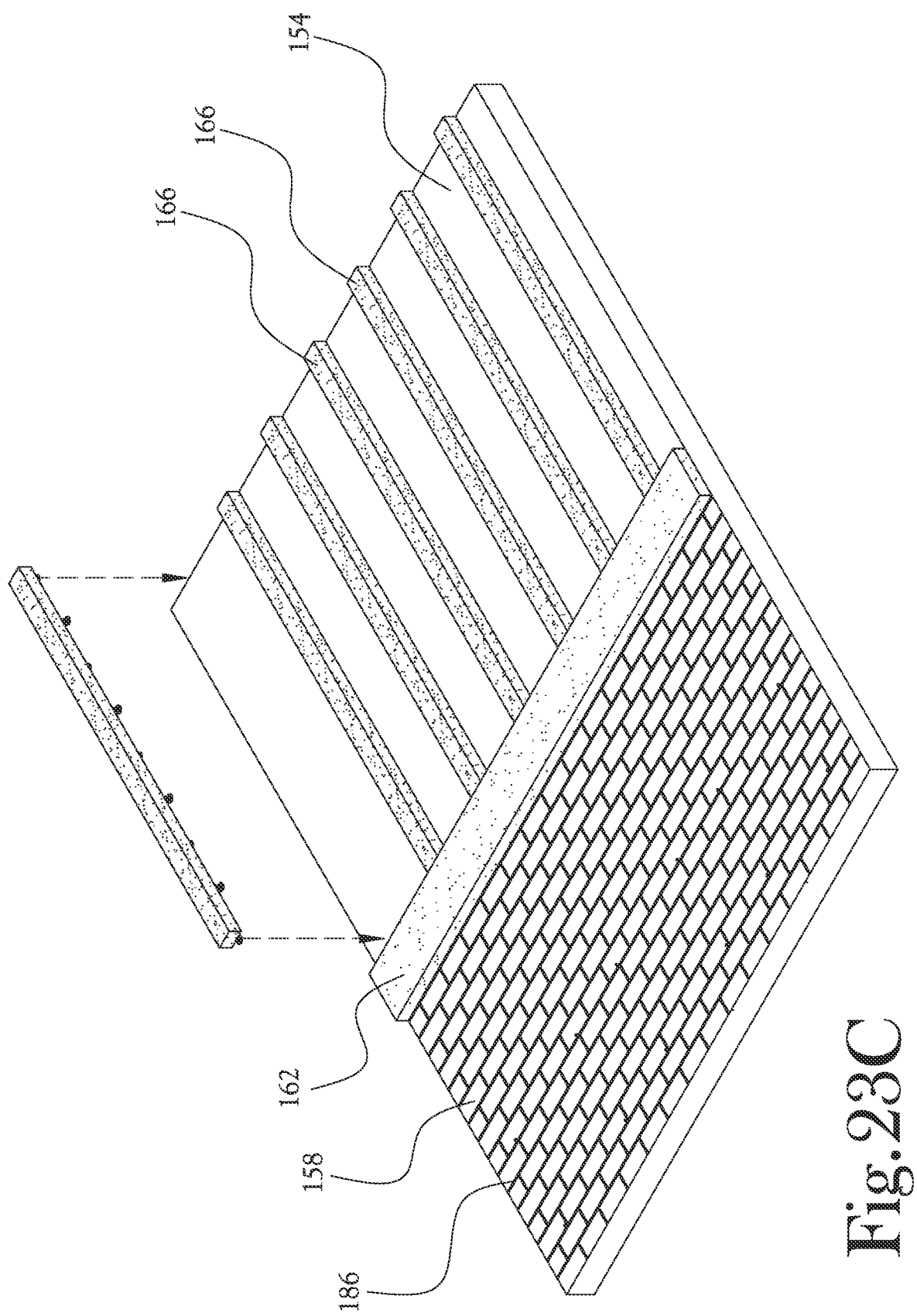

In FIG. 23B, after the brick stamps 186 have been placed in the concrete, the frieze board, or horizontal trim member 162, is placed on the curing concrete 154 such that the bottom surface of the horizontal trim member 162 contacts the upper surface of the curing concrete 154, and the anchor members 174 extend down into the curing concrete 154. In this example embodiment the horizontal trim member 162 is placed immediately adjacent to the edge of the brick stamps 186 that will form the "top" of the brick pattern 158 relative to the finished panel 150 being stood upright. In FIG. 23C, the batten strips, or vertical trim members 166 are placed such that the "lower" edges contact an "upper" edge of the horizontal trim member 162 the bottom surface of the vertical trim members 166 contact the upper surface of the curing concrete 154, and the anchor members 182 extend down into the curing concrete. The horizontal trim member 162 may be cut so that the ends of the horizontal trim member 162 meet corresponding ends of horizontal trim members of other panels, and the vertical trim members 166 may be arranged such that the gaps between the vertical trim members 166 of the panel 150 are substantially uniform, and that gaps between the outermost vertical trim members 166 and outermost vertical trim members 166 of other panels substantially match the gaps between the adjacent vertical to members 166 of the panel 150. Thus, trim members are fixed to the precast wall structure at various points and are prevented from warping or other such unwanted movement. The extended anchoring members 174, 182 may be provided in a number of forms and configurations. For example, the anchoring members may be formed of the same composite material as the trim members and formed at the same time as the trim members. In other example embodiments, the anchoring members may be attached to the trim members after the production of the trim members. In the example embodiment of the present general inventive concept, the anchoring members may be panhead screws that are screwed partially into the trim members such that the head of the panhead screws may be embedded in the poured concrete of the precast wall structure to provide anchoring of the trim members to the precast wall structure. In other various example embodiments, the anchoring members/extensions may be formed with barbs, ribs, annular flanges, one or more tapering portions, etc., or any combination of such protrusions and/or open spaces in the anchoring members, which allows the wet concrete to surround, fill, etc., one or more portions of the anchoring members to provide an anchoring action. The quantity and configuration of the anchor members 174,182 may vary according to various example embodiments of the present general inventive concept.

Figure 23D:
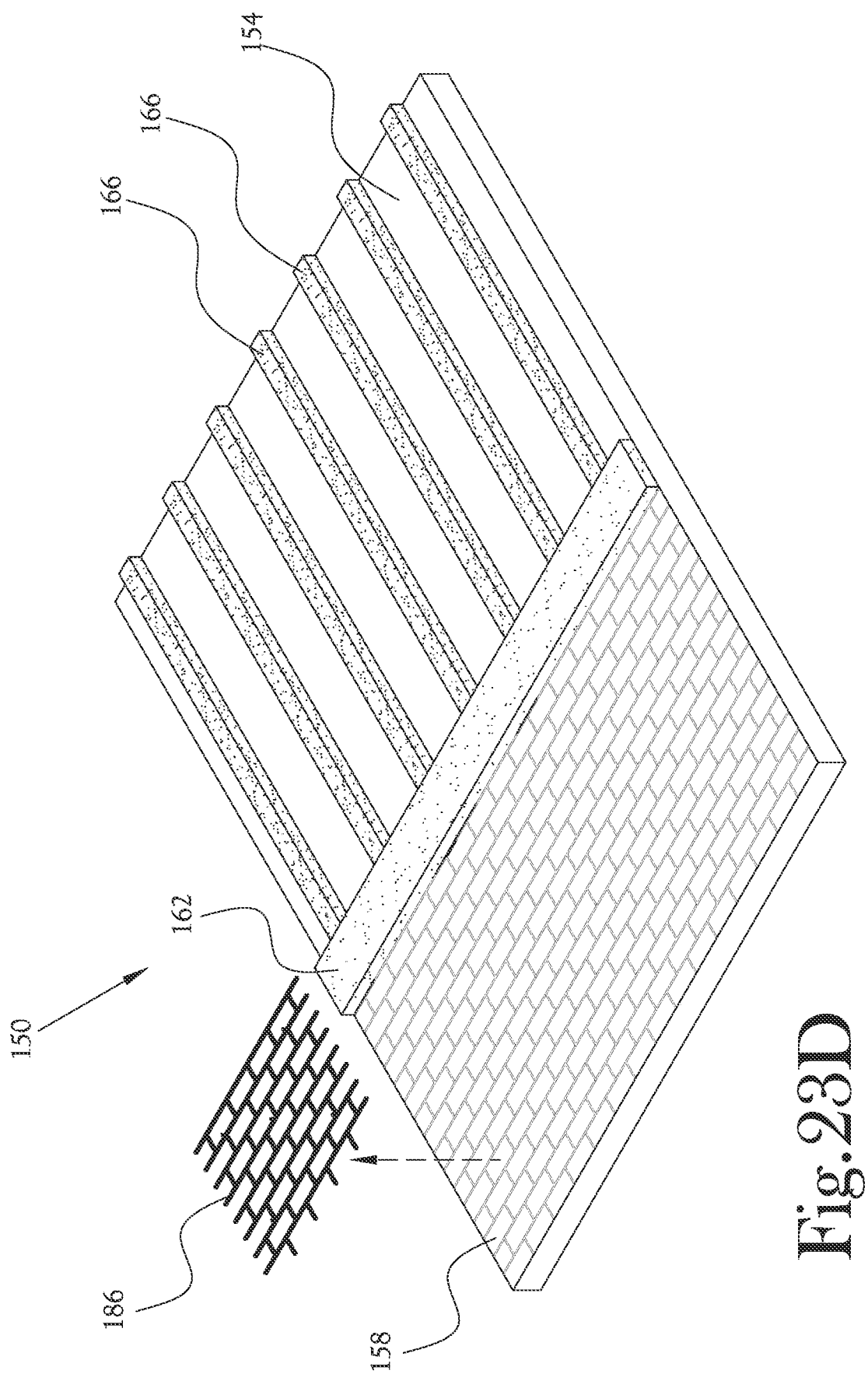

As illustrated in FIG. 23D, when the concrete is cured to a sufficient degree, such as being firm enough to hold the shape imprinted by the brick stamps 186, the brick stamps 186 may be lifted straight up from the upper surface of the concrete 154, leaving the brick pattern 158 formed in the curing concrete. After the concrete 154 is completely dried, the panel 150 may be stood up to a vertical position, resulting in the panel 150 illustrated in FIG. 19.

FIGS. 24-29 illustrate an additional embodiment of a method of manufacturing a prefabricated composite wall structure in accordance with several additional features of the present general inventive concept. In the embodiment of FIGS. 24-30, a prefabricated composite wall structure is formed in a "face down" orientation within the casting bed, such that the desired "veneer" texturing and surfacing of the outer surface of the concrete face is formed along a bottom surface of the casting bed, while various interior structural elements, such as for example the ribs, toe, and top beam, of the outer concrete face are formed above the outer surface of the outer concrete face within the casting bed. As will be shown hereinbelow, significant advantages may be realized in that this embodiment of the method permits the "veneered" outer surface of the outer concrete face to be poured first within the casting bed, before additional portions of the outer concrete face are poured. Thereafter, the additional features of the outer concrete face may be poured, and additional features of the prefabricated composite wall structure may be formed and/or fabricated, while the "veneered" outer surface remains relatively undisturbed within the bottom of the casting bed.

With reference to FIGS. 24-29, a casting bed 200 is provided having a plurality of generally horizontally elongated, upright surfaces 202, 204, similar to those of the above-discussed embodiments, arranged in an edge-to-edge configuration along corresponding adjacent and upwardly extending edges and defining a generally rectangular interior area 206 corresponding to a desired overall shape of a finished wall structure 210a-210c. In various embodiments, including the illustrated embodiment, a lower surface 208 of the casting bed 200 is provided that defines a plurality of shapes and/or elements corresponding to a desired "veneer" texturing and surfacing of the outer concrete surface of a finished wall structure 210.

Figure 24:
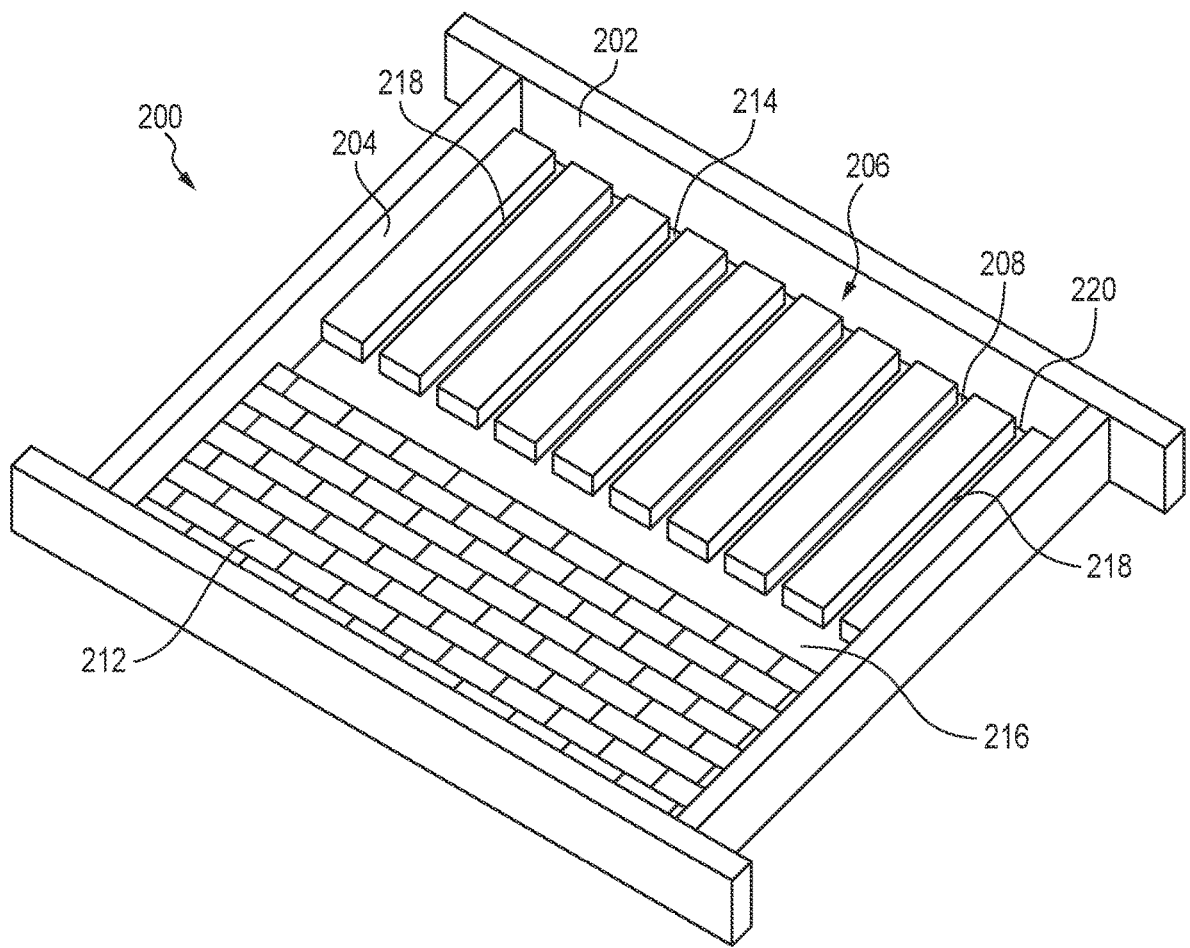
FIG. 24 illustrates a perspective view showing one embodiment of a casting bed used in various operations of one embodiment of a method according to several features of the present general inventive concept.

For example, as shown in FIG. 24, a lower surface 208 of the casting bed 200 is provided which includes a first area 212 corresponding to a lower section of the outer surface of the finished wall structure 210, and a second area 214 corresponding generally to an upper section of the outer surface of the finished wall structure 210. The first area 212 of the lower surface 208 defines a plurality of ridges shaped and arranged so as to cooperate to form a three-dimensional negative shape corresponding to a brick-and-mortar pattern. The second area 214 defines a plurality of channels which are sized, shaped, oriented, and textured to form a three-dimensional negative shape corresponding to a wooden board-and-batten pattern. More particularly, the second area 214 of the casting bed lower surface 208 defines a substantially rectangular shaped channel 216 extending centrally across the casting bed lower surface 208 along a terminal edge of the brick-and-mortar pattern defined by the first portion 212. The channel 216 defines a texture corresponding to the negative shape of a wooden board. Thus, the channel 216 defines a mold for forming the shape of a horizontal trim member of the type discussed above with regard to FIGS. 20A-D. Additional channels 218 are provided extending perpendicular to the horizontal trim member channel 216, in an even, parallel, spaced apart relationship to one another, and opening to the interior of the horizontal trim member channel 216. Each of these channels 218 is sized, shaped and textured such that they define molds for forming the shapes of wooden vertical trim members of the type discussed above with regard to FIGS. 20A-D. An additional channel 220 is defined along an edge of the lower surface 208, opposite the first area 212, parallel to the horizontal trim member channel 216 and opposite the vertical trim member channels 218 from the horizontal trim member channel 216. This channel 220 is sized, shaped and textured such that it defines a mold for forming the shape of a wooden header trim member.

In the illustrated embodiment, the various shapes and textures defined by the lower surface 208 allow the lower surface to effectively serve as a "stamp" or mold for forming veneer surfacing and texture into uncured concrete as uncured concrete is poured into the casting bed 200. However, in various additional embodiments, additional texturing and/or surfacing may be provided via the placement of one or more additional elements along the lower surface 208, such that the elements may be exposed to a lower surface of uncured concrete poured into the casting bed 200. For example, in various embodiments, one or more removable stamps may be positioned along the lower surface 208, such that the stamps cooperate with the lower surface to define a three-dimensional negative shape corresponding to a desired surfacing and/or texturing of a finished wall structure 210. In various embodiments, one or more permanent wall fixtures, such as for example the above-described horizontal trim member 162, vertical trim members 166, etc., may be placed within the casting bed 200 along the lower surface 208, such that these elements may become positioned and fixed along the outer surface of the outer concrete face as concrete in the casting bed 200 cures. In certain embodiments, the lower surface 208 may be provided with one or more recesses or sockets adapted to receive such fixtures and to hold such fixtures at a desired location, orientation, and/or height in relation to the remaining surfaces of the casting bed 200.

Figure 25:
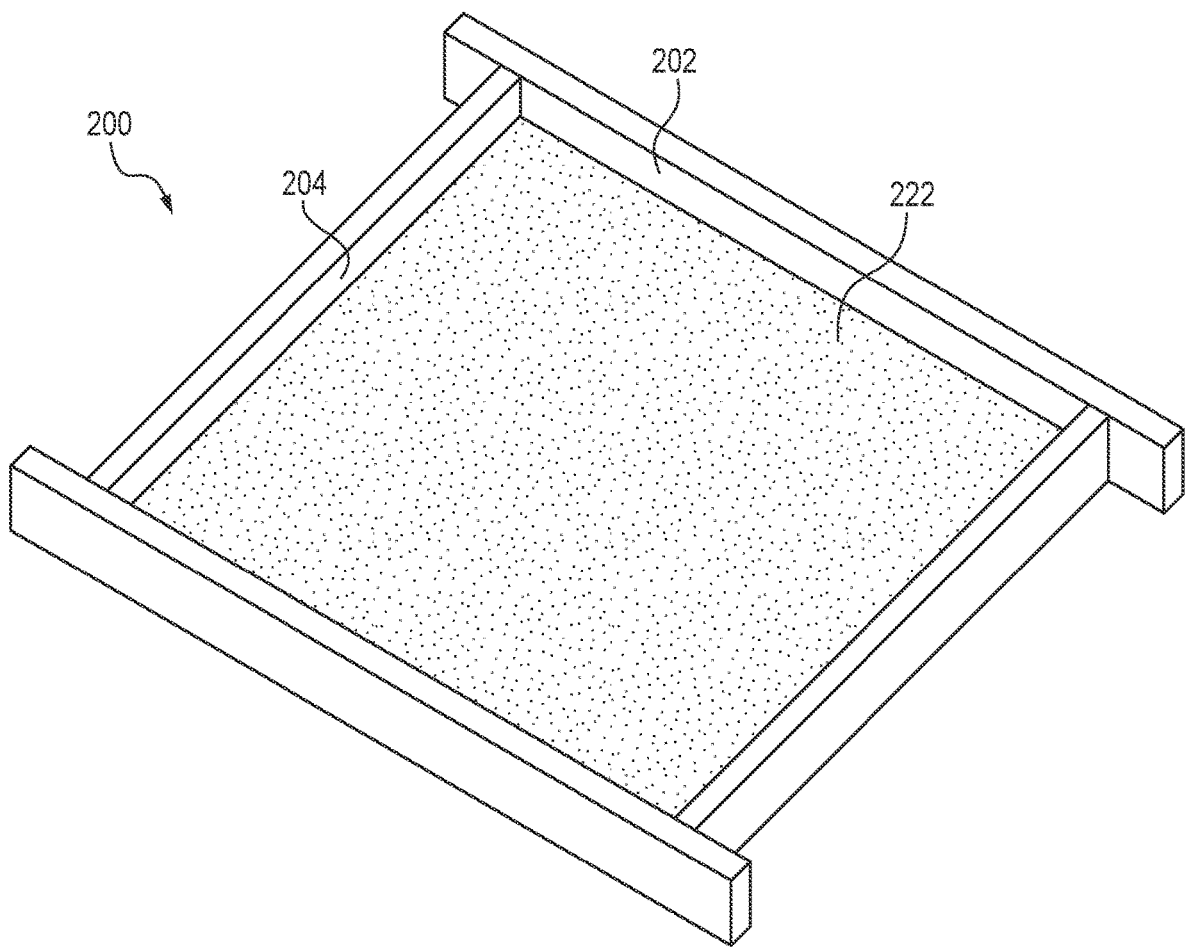
FIG. 25 is a perspective view of the casting bed of FIG. 24, showing other operations of the embodiment of the method.

Referring now to FIG. 25, following provision of the casting bed 200 and positioning of any additional elements within the casting bed along the lower surface 208, a first layer of uncured concrete 222 is placed within the casting bed 200. The quantity of uncured concrete comprising the first layer 222 is, in various embodiments, sufficient to form the outer concrete face of the finished wall structure 210. In several embodiments, the quantity of uncured concrete comprising the first layer 222 is sufficient to cover all texture and surfacing features provided by the lower surface 208 and any additional texturing or surfacing elements placed along the lower surface 208 during provision of the casting bed 200. However, it will be recognized that it is not necessarily required for all texture and surfacing features provided by or along the lower surface 208 to be completely covered by the first layer 222.

Figure 26:
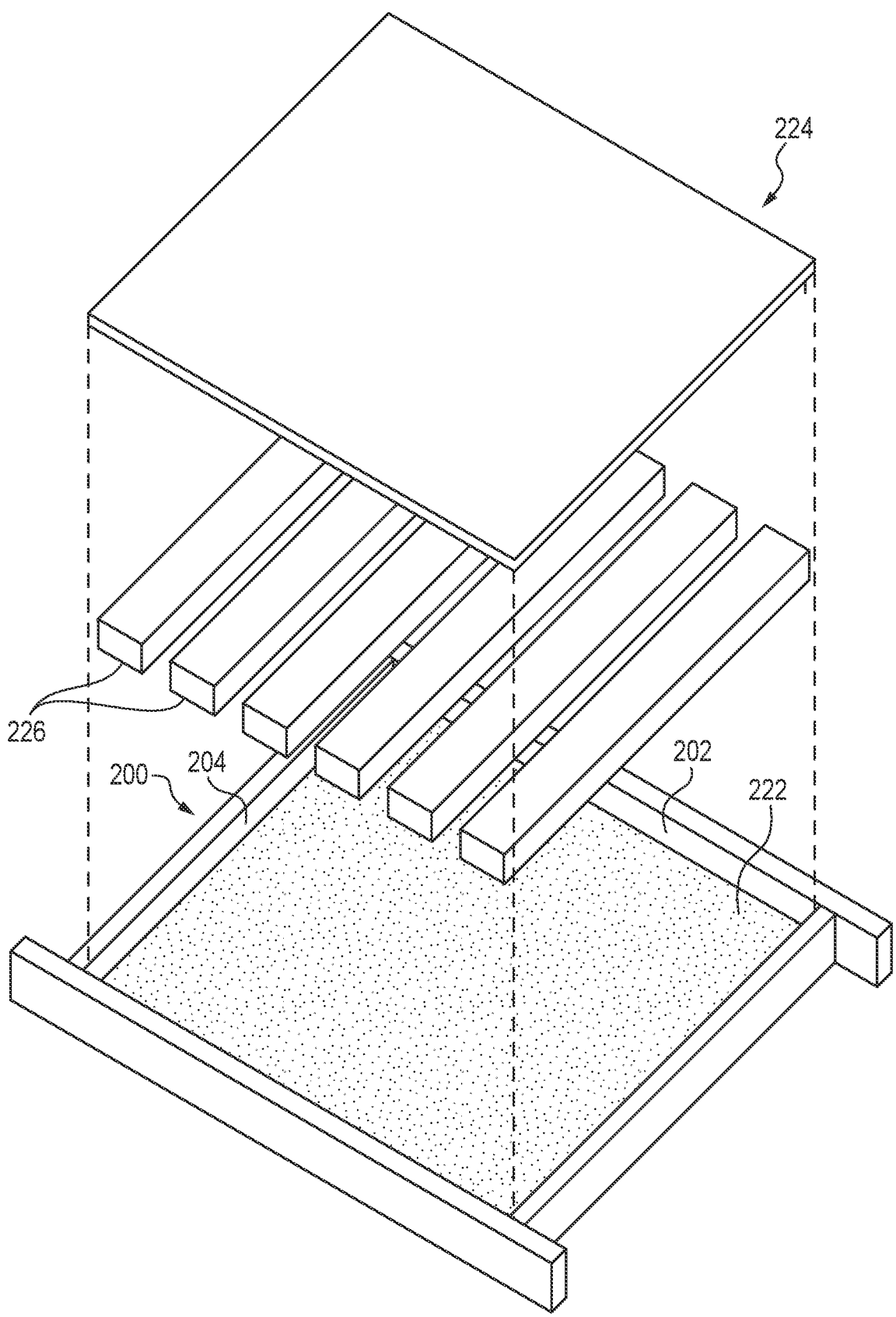
FIG. 26 is a partially exploded perspective view showing other operations of the embodiment of the method performed in connection with the casting bed of FIG. 24.

As shown in FIG. 26, following placement of the first layer 222 of uncured concrete within the casting bed 200, a plurality of elongated forming blocks 226 are placed within the casting bed 200 in parallel, spaced apart relationship to one another and in overlying relationship above the first layer of uncured concrete 222. The forming blocks 226 cooperate to define a plurality of rectangular shaped channels therebetween, similar to the protrusions of the forming members of the embodiments discussed above. However, in this embodiment, the forming blocks 226 are separate units and are not integrally formed as a forming member.

Prior to, or contemporaneously with, placement of the forming blocks 226 within the casting bed 200, one or more reinforcing members 233, such as steel reinforcing wire, rebar, fibers, or the like, may be optionally positioned about the perimeter of the forming blocks 226 and/or extending along the channels defined between the forming blocks 226. For example, one or more pieces of steel rebar 233 may be positioned within each channel defined between each adjacent pair of forming blocks 226 and may be held in a position suspended within the channel by suitable fasteners or support structures, such as for example wire, clips, cradles, and other devices known in the art. Thereafter, a second layer of uncured concrete 228 is placed within the casting bed 200.

Figure 27:
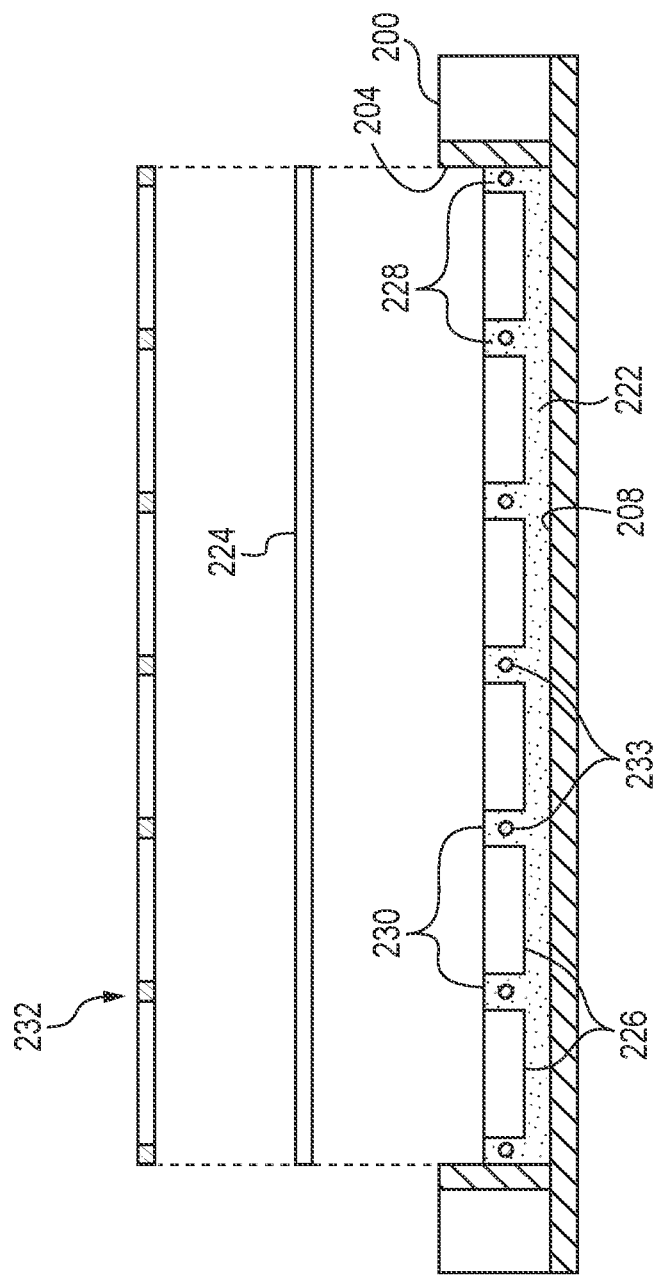
FIG. 27 is a partially exploded cross-sectional view showing other operations of the embodiment of the method performed in connection with the casting bed of FIG. 24.

FIG. 27 illustrates a cross-sectional view of a casting bed 200 having the above-described first and second layers 222, 228 of uncured concrete placed therein, along with the forming blocks 226. As shown in FIG. 27, the quantity of uncured concrete comprising the second layer 228 is, in various embodiments, sufficient to form concrete ribs 230 in the channels between the forming blocks 226. In various embodiments, the quantity of uncured concrete comprising the second layer 228 is sufficient to either substantially or completely fill the channels between the forming blocks 226, such that minimal void space remains between the concrete of the second layer 228 and the upper surfaces of the channels between the rectangular protrusions 226. However, it will be recognized that at least some space between the concrete of the second layer 228 and the upper regions of the channels between the forming blocks 226 may remain without departing from the spirit and scope of the present general inventive concept.

Figure 28:
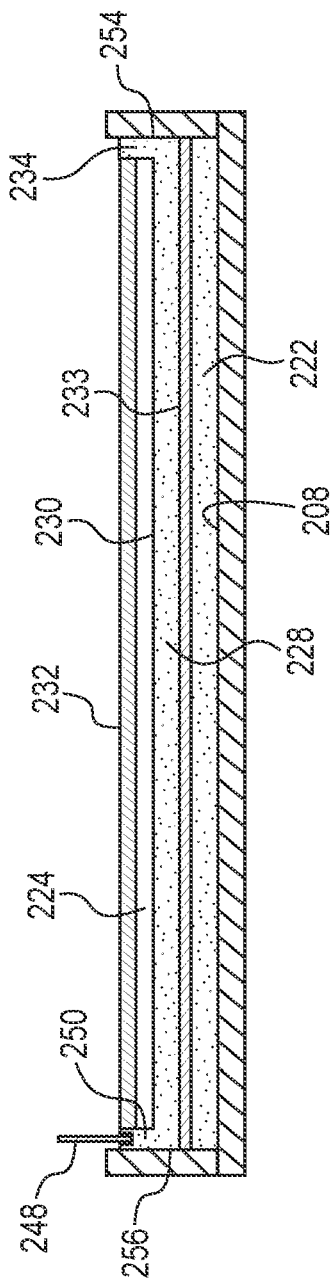
FIG. 28 is a cross-sectional view showing other operations of the embodiment of the method performed in connection with the casting bed of FIG. 24.
Figure 29C:
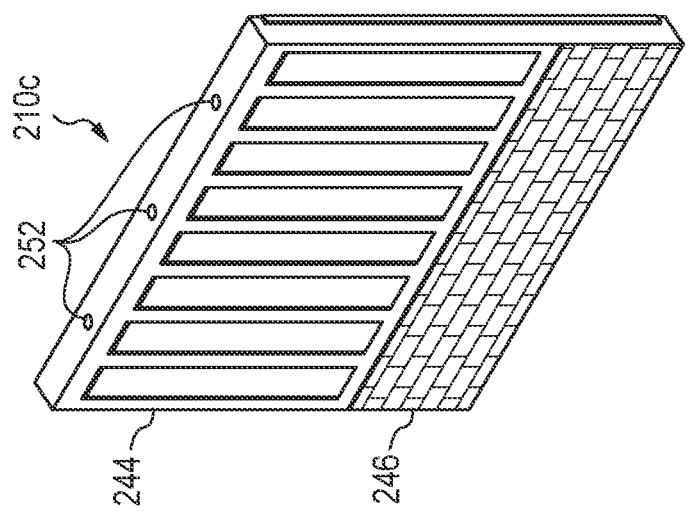
FIGS. 29A-29C illustrate various embodiments of precast composite wall structures constructed in accordance with various operations of various embodiments of a method according to several features of the present general inventive concept.
Figure 29B:
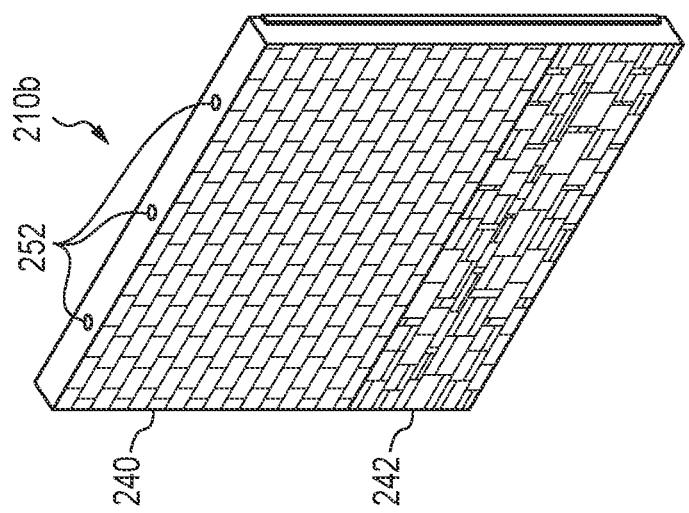
Figure 29A:
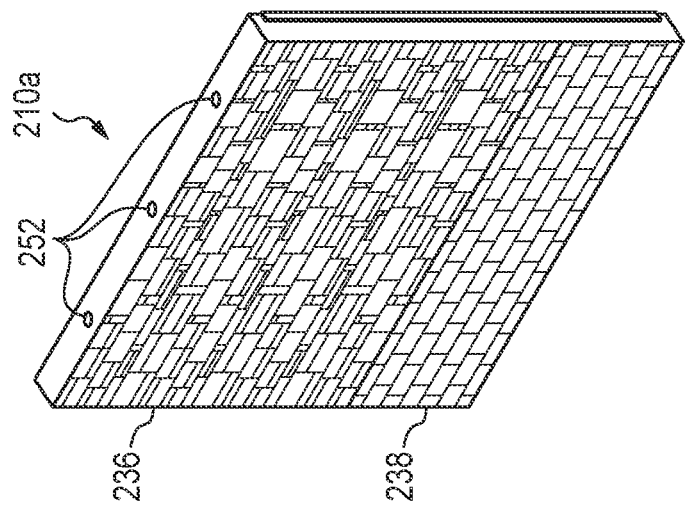

With continued reference to FIGS. 27-28, following placement of the second concrete layer 228, an insulating sheet 224 may be placed in overlying relationship with the second concrete layer 228 and the forming blocks 226. Thereafter, a stud frame 232 may be provided and positioned within the casting bed 200 to extend along the upper surface of the insulating sheet 224, on the opposite side of the insulating sheet 224 from the forming blocks 226. It will be recognized that placement of the stud frame 232 along the upper surface of the insulating sheet 224 may be performed prior to or contemporaneously with placement of the insulating sheet 224 within the casting bed 200. In any case, once the second layer 228 is placed within the casting bed 200, the insulating sheet 224 is positioned within the casting bed, and the stud frame 232 is positioned within the casting bed 200 and aligned above the insulating sheet 224, a third layer of uncured concrete 234 is placed within the casting bed 200 to fill the voids between the perimeter of the stud frame 232 and insulating sheet 224 and the interior of the casting bed 200.

It will be recognized by one of skill in the art that the embodiment of the present method calls for uncured concrete employed in the first placement 222, the second placement 228, and the third placement 234 to flow into the various features of the lower surface 208 of the casting bed 200, into the channels between the forming blocks 226, and into the voids between the perimeter of the stud frame 232 and the insulating sheet 224 and the interior of the casting bed 200. In this regard, numerous variations of concrete formulations exist which may be suitable for use in this and similar embodiments. For example, in various embodiments, a concrete formulation having a relatively high workability may be used in performance of the various concrete placement operations 222, 228, 234. In certain embodiments, a concrete formulation is used having a "slump" measurement of between eleven and twelve inches, as defined in the American Society for Testing and Materials ("ASTM") "C94" standards publication. In additional embodiments, concrete which is "self leveling" may be used, such term referring to concrete which exhibits a significantly high workability that upon placement of the uncured concrete within a vessel, the uncured concrete forms a substantially level upper surface thereof. Additionally, in various embodiments, concrete formulations having a relatively long cure time may be used, such that the workability of the concrete is maintained at a relatively high level throughout the operations of the first, second, and third placements 222, 228, 234.

Additionally, as an optional step, or as an alternative to the above-discussed high workability of the concrete, the uncured concrete may be subjected to vibration in order to encourage the uncured concrete to flow into the channels between the forming blocks 226 and into the voids between the perimeter of the stud frame 232 and the insulating sheet 224 and the interior of the casting bed 200. In this regard, it is generally known in the art that uncured concrete may be subjected to vibration energy during, or shortly after, placement within a form. During such vibration, the uncured concrete may temporarily exhibit increased workability or "flow." In certain concrete formulations, and depending upon the intensity of the vibration energy, vibration of the concrete may result in the concrete exhibiting temporary "self leveling" qualities. Such additional workability may serve, for example, to encourage the uncured concrete to flow into and fill all voids and spaces within the form and/or to release air bubbles which may be entrained in the uncured concrete. Thus, in one optional operation of the present embodiment of the method, the casting bed 200 is vibrated via a vibration machine of the type known to one in the art. In another optional operation, the various layers of concrete placed within the casting bed 200 may be subject to direct vibration. In still yet another optional operation, the insulating sheet 224, forming blocks 226, stud frame 232, and/or other components of the wall structure 210 placed within the casting bed 200 may be subjected to vibration, whereupon such vibration may then travel to the uncured concrete. In each of these operations, it will be recognized that such vibration may serve to encourage more even and uniform distribution of the uncured concrete within the various spaces to be filled in the form and may also result in decreased air bubbles or voids within the unfinished concrete.

It will be recognized that numerous variations, modification, and additional embodiments are possible to accomplish the operations, and if desired the additional optional operations, described above, and such variations may be used without departing from the spirit and scope of the present general inventive concept. For example, in one embodiment, the second and third concrete placement operations 228, 234 may be performed in a single operation, as by the placement of a single quantity of uncured concrete within the casting bed 200 that fills the perimeter of the casting bed 200 to a level substantially event with the top of the stud frame 232. In another embodiment, the first and second concrete placement operations 222, 228 may be performed in a single operation, as by the placement or suspension of the forming blocks 226 and/or insulating sheet 224 inside an otherwise empty casting bed 200 and subsequent pouring of a single quantity of uncured concrete sufficient to fill the various voids and shapes of the casting bed lower surface 208 and to fill the channels between the forming blocks 226. In still another embodiment, all three concrete placement operations 222, 228, 234 may be performed in a single operation.

FIGS. 30A-30C illustrate several variations in a finished prefabricated composite wall structure 210 which may be achieved through employment of various embodiments of the method of the present general inventive concept. More specifically, FIG. 30A illustrates a finished prefabricated composite wall structure 210a having an upper portion 236 which is textured and surfaced to resemble a stone wall, and a lower portion 238 which is textured and surfaced to resemble a brick wall. FIG. 30B illustrates a finished prefabricated composite wall structure 210b having an upper portion 240 which is textured and surfaced to resemble a lap siding pattern, and a lower portion 242 which is textured and surfaced to resemble a stone wall. FIG. 30C illustrates a finished prefabricated composite wall structure 210c having an upper portion 244 which is textured and surfaced to resemble a board and batten pattern, and a lower portion 246 which is textured and surfaced to resemble a brick wall. Numerous additional patterns and combinations will be recognized by one of skill in the art, and such additional patterns and combinations may be used without departing from the spirit and scope of the present general inventive concept.

With reference to FIG. 28, in various embodiments, upon placement of the uncured concrete within the casting bed 200, one or more connectors 248 may optionally be positioned at any of various locations about the composite wall structure 210 to assist in the connection of the wall structure 210 to an adjacent wall structure 210 or one or more additional structural elements. For example, in various embodiments, concurrent with, or following, the above-discussed concrete placement operations 222, 228, 234 one or more slab connectors 248 is positioned within the casting bed 200 along a toe portion 250 of the uncured concrete. The slab connectors 248 each comprise an elongated support member, such as steel rebar or the like, and are positioned to extend from the toe portion 250 of the concrete outward from the interior surface of the wall structure 210 formed by the stud frame 232 and forming member 224. In various additional embodiments, one or more pin sockets 252 is defined along the upper surface 254 and the lower surface 256 of the concrete slab. The pin sockets 252 are each configured to receive a pin (not shown), such as a short section of rebar or other such member, and are configured to align in registration with a corresponding socket 252 of an adjacent member, such that the aligned pin sockets 252 and pins received therein may cooperate to secure adjacent wall structures 210 in a fixed relationship with one another. In addition to the depicted slab connectors 248 and pin sockets 252, numerous additional connectors will be recognized which are suitable for use in joining the wall structure 210 to one or more additional structures, and such connectors may optionally be embedded in the uncured concrete in accordance with the various embodiments hereof without departing from the spirit and scope of the present general inventive concept.

Following the above-discussed concrete placement operations 222, 228, 234 and any additional optional operations of the type discussed above, the uncured concrete may be allowed to cure, thereby forming a relatively solid composite wall structure 210. Thereafter, the wall structure 210 may be removed from the casting bed 200, as by lifting the wall structure 210 and/or disassembling the various members forming the casting bed 200. In so doing, the texturing and/or surfacing of the outer concrete surface of the composite wall structure 210 may be revealed and accessed. At this point, one or more colors may be applied to various regions of the outer concrete surface of the composite wall structure 210 in order to allow the outer concrete surface of the composite wall structure 210 to further resemble the desired "veneer." For example, in numerous embodiments, one or more layers of paint, sealant, dye, pigment, or the like may be applied to the outer concrete surface of the composite wall structure 210 in order to render a desired color to the outer surface, or to render a desired characteristic, such as water resistance, wear resistance, etc., to the outer surface.

In various embodiments in which one or more removable stamps are positioned along the lower surface 208 prior to placement of the first layer of uncured concrete 222 within the casting bed 200, following removal of the wall structure 210 from the casting bed, a color may be applied to one or more portions of the outer surface not concealed by the stamp, whereupon the stamp may be removed to expose both the texturing and color contrast provided by the stamp. For example, in one embodiment, a plurality of stamps are arranged along the lower surface 208 of the casting bed, the stamps cooperating to resemble a three-dimensional negative shape of mortar joints between bricks. In this embodiment, following removal of the wall structure 210 from the casting bed, the portion of the outer concrete surface of the wall structure 210 carrying the mortar joint stamps may be painted with a paint, concrete dye, stain, or the like in a color resembling brick, i.e. red, brown, etc., such that the spaces in between the mortar joint shapes are imparted with color resembling traditional brick. Thereafter, the mortar joint stamps may be removed from the wall structure 210, exposing the mortar joint shapes that remain uncolored. Because the concrete forming the mortar joint shapes is of similar color to traditional brick mortar, the outer surface of the finished wall structure 210 then strongly resembles a traditional brick and mortar surface. It will be recognized that similar effects in the outer concrete surface of the wall structure 210 may be achieved by using suitable colors, stamps, and/or stencils, such that the outer concrete surface of the wall structure 210 may be made to resemble surfaces such as natural stone, masonry, wood, lap siding, traditional board and batten siding, and other variations.

Figure 34:
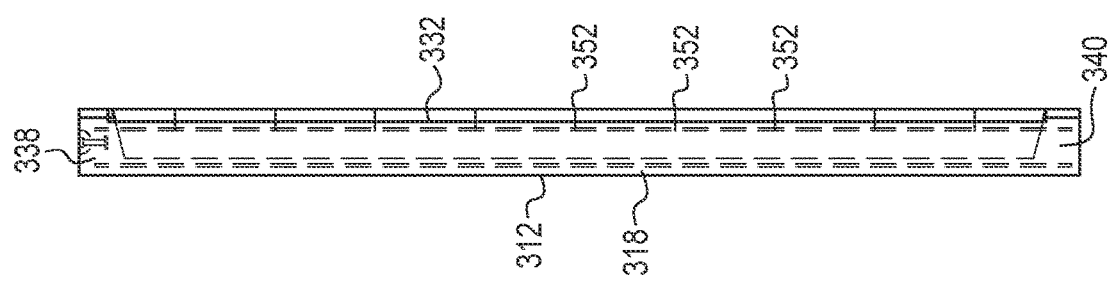
FIG. 34 depicts an end view of the uninsulated precast concrete wall structure represented in FIG. 30.
Figure 33:
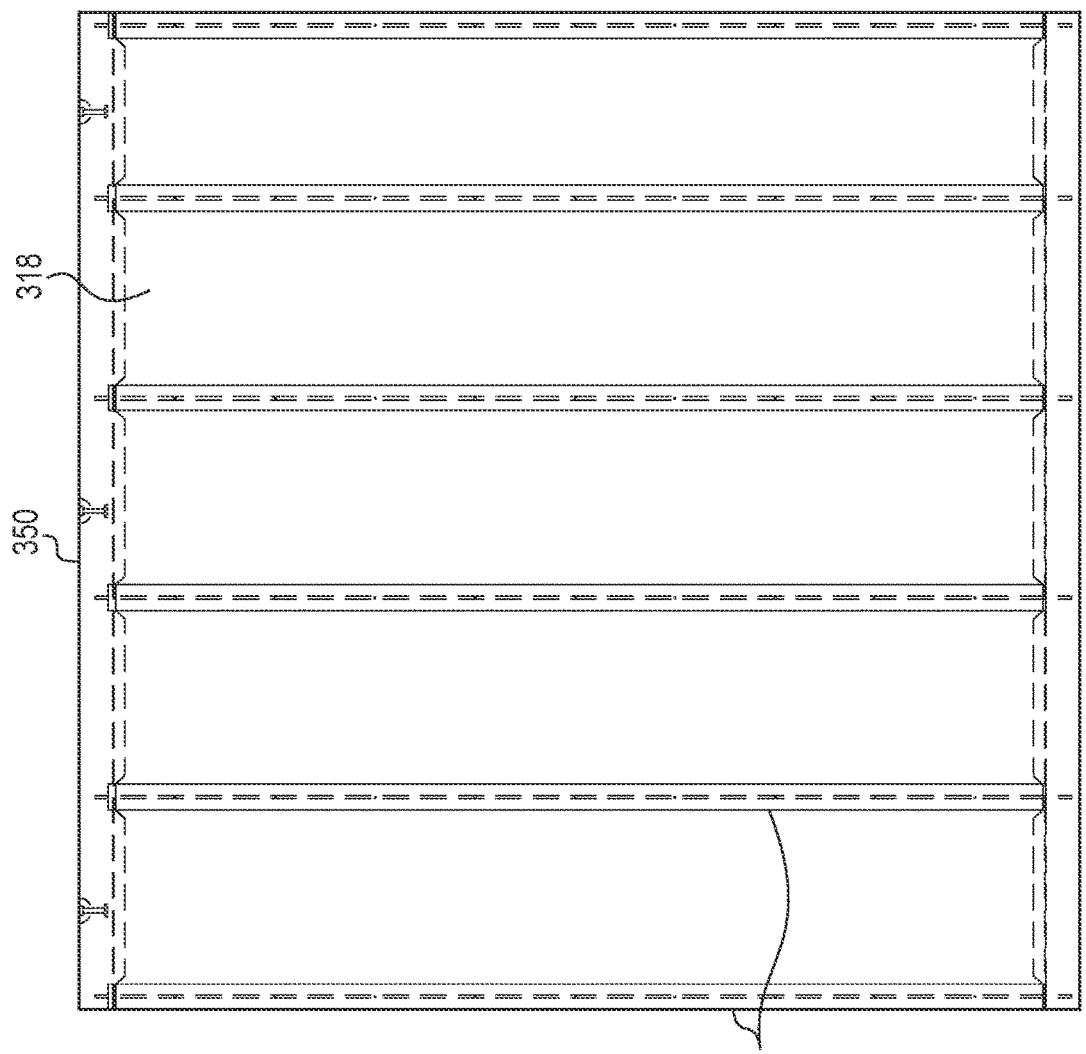
FIG. 33 depicts an inside elevation view of the uninsulated precast concrete wall structure represented in FIG. 30.
Figure 32:
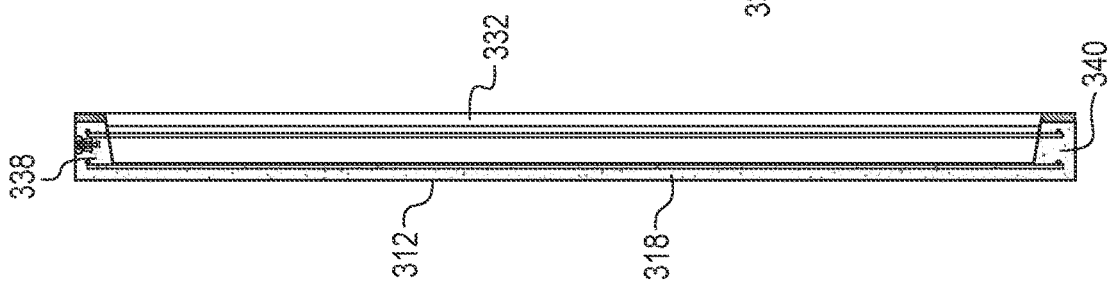
FIG. 32 depicts a vertical cross-section view of the uninsulated precast concrete wall structure represented in FIG. 30.
Figure 35:
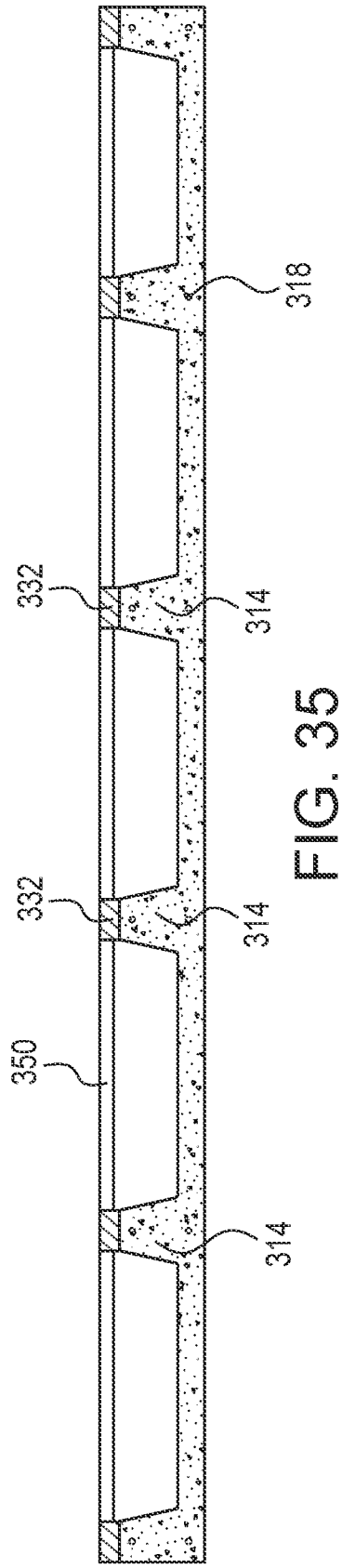
FIG. 35 depicts a horizontal cross-section view of the uninsulated precast concrete wall structure represented in FIG. 30.
Figure 36:
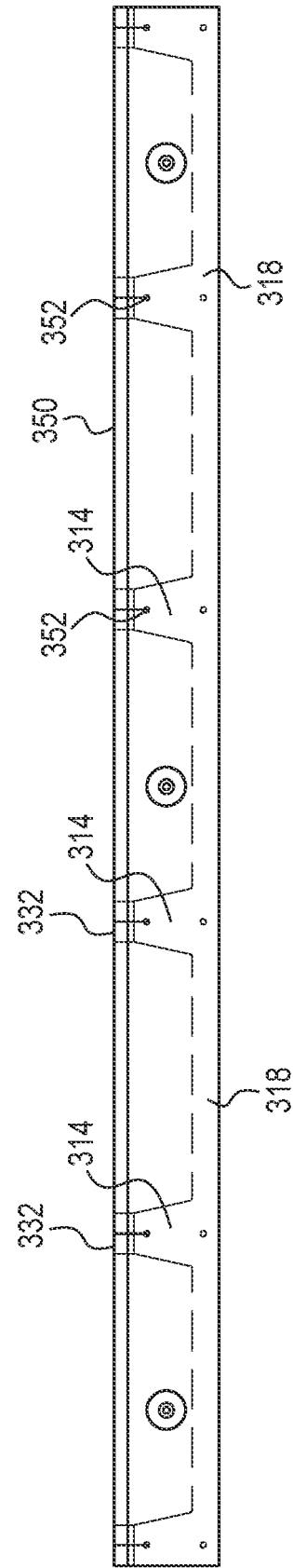
FIG. 36 depicts a top view of the uninsulated precast concrete wall structure represented in FIG. 30.

In accordance with several features of the present general inventive concept, an uninsulated precast concrete wall structure 300 is disclosed herein and in the accompanying FIGS. 30-36. The uninsulated precast concrete wall structure 300 is provided using the method for manufacturing a precast concrete wall structure previously described. FIG. 30 depicts a perspective outside view of the uninsulated precast concrete wall structure 300. FIG. 31 depicts a perspective inside view of the uninsulated precast concrete wall structure 300. FIG. 32 depicts a vertical cross-section view of the uninsulated precast concrete wall structure 300. FIG. 33 depicts an inside elevation view of the uninsulated precast concrete wall structure 300. FIG. 34 depicts an end view of the uninsulated precast concrete wall structure 300. FIG. 35 depicts a horizontal cross-section view of the uninsulated precast concrete wall structure 300. FIG. 36 depicts a top view of the uninsulated precast concrete wall structure 300.

With reference to FIGS. 30-36, an uninsulated wall structure 310 is provided which includes an outer concrete face 312 defining an outer surface 336 forming an exterior surface of the uninsulated wall structure 310, and an inner surface 318 defining a plurality of inwardly-facing ribs 314.

Each of the ribs 314 is of a substantially rectangular cross-section and extends substantially vertically along the inner surface 318 of the concrete face 312 in substantially parallel-planar, spaced apart relation to the other ribs. The concrete face 312 defines elongated top beam 338 and toe 340 portions extending inwardly from the inner surface 318 along respective upper 342 and lower 344 ends of the concrete face 312, in an orientation substantially perpendicular to the ribs 314. Thermal breaks 350 align with the top beam 338 and toe portions 340. The thermal breaks 350 may be expanded polystyrene (EPS), extruded polystyrene (XPS), a combination, or like material. A plurality of studs 332 may be positioned and attached by ring shank nails 352, along and adjacent to the ribs 314. The ring shank nails 352 maybe screws or other attachment devices.

As previously discussed, the concrete face 312 is fabricated from a reinforced concrete material, of the type having a plurality of reinforcing members embedded in a cement-based concrete material. For example, a plurality of elongated steel reinforcing members is provided within the concrete face 312, extending substantially parallel to the inner and outer surfaces 318, 336 thereof. More specifically, a plurality of elongated steel members is provided, each member extending within and along a respective rib 314 of the concrete face 312, thereby strengthening the concrete face 312 and resisting flexure of the concrete face 312. Additional reinforcement in the form of wire mesh or fiber materials may be provided within and along the concrete face 312. As previously discussed, the reinforcing members may be provided at other locations within the concrete face 312 without departing from the spirit and scope of the present general inventive concept.

Figure 37:
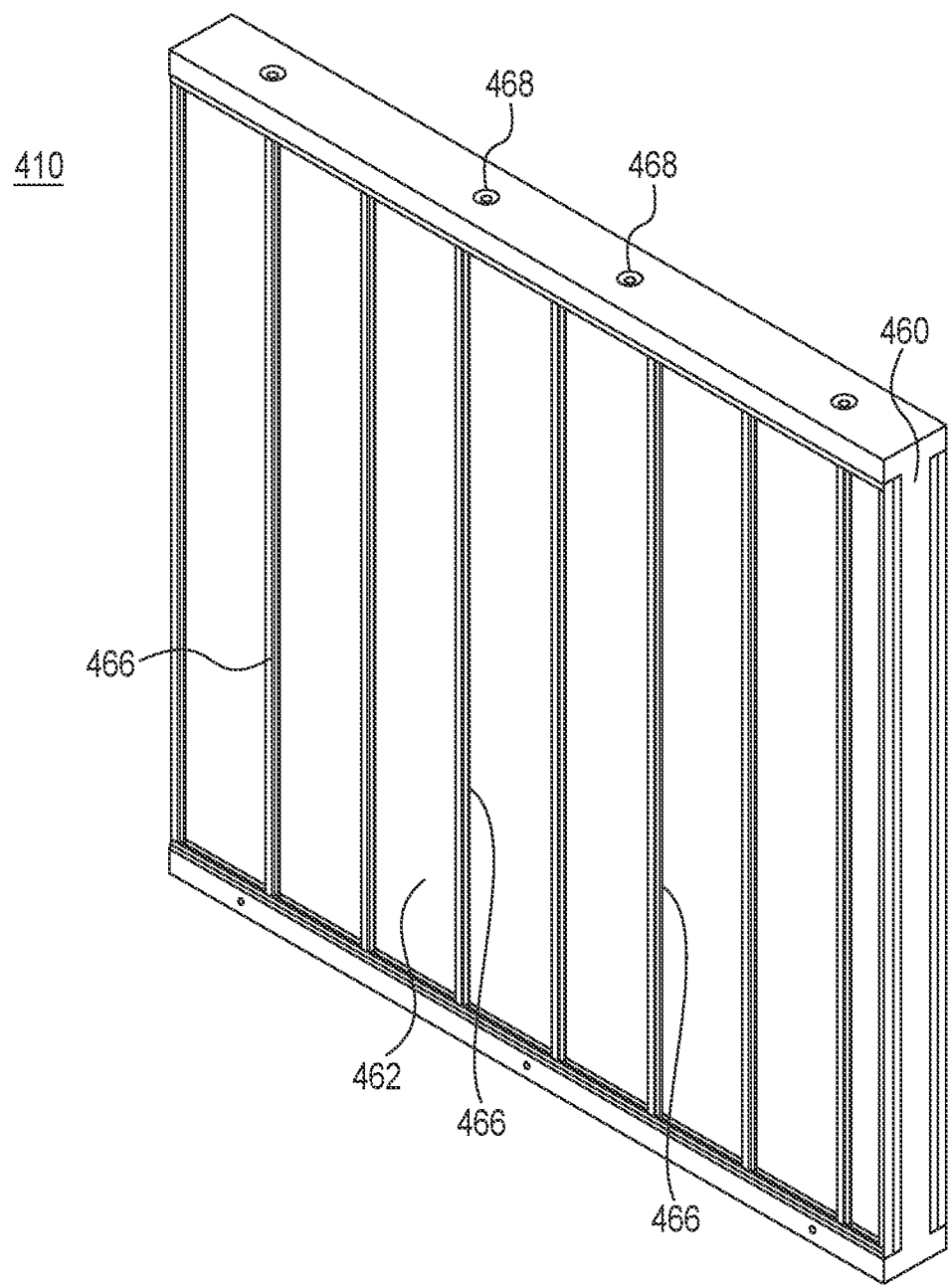
FIG. 37 depicts a perspective view of the double sided precast concrete wall structure in accordance with several features of the present general inventive concept.
Figure 38:
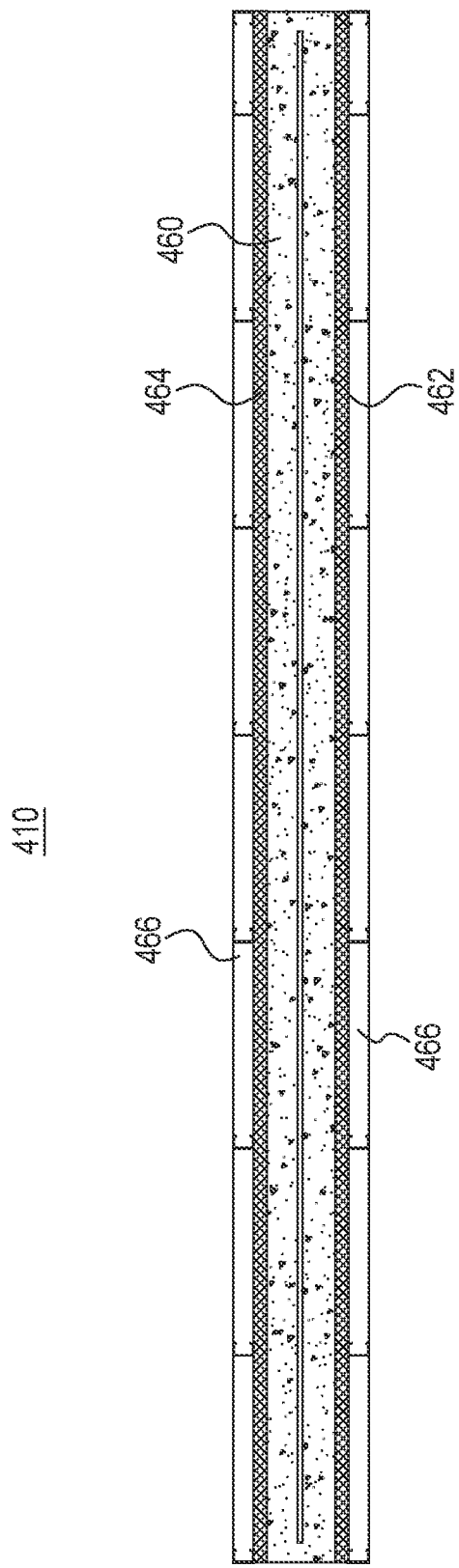
FIG. 38 depicts a horizontal cross-section view of the double sided precast concrete wall structure represented in FIG. 37.
Figure 39:
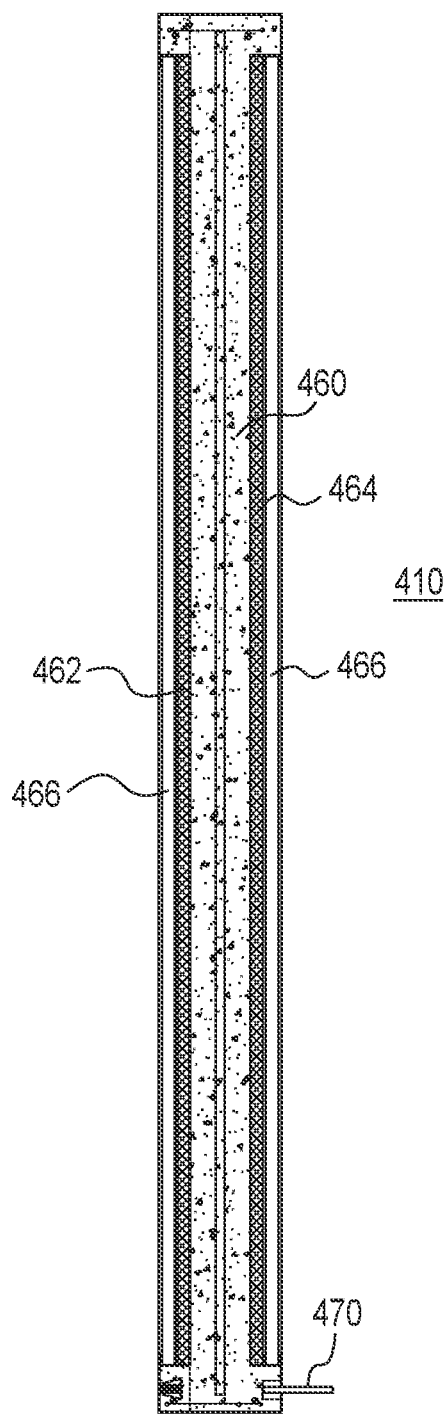
FIG. 39 depicts a vertical cross-section view of the double sided precast concrete wall structure represented in FIG. 37.

In accordance with several features of the present general inventive concept, a double sided precast concrete wall structure 400 is disclosed herein and in the accompanying FIGS. 37-39. The double sided precast concrete wall structure 400 is provided using the method for manufacturing a precast concrete wall structure previously described. FIG. 37 depicts a perspective view of the double sided precast concrete wall structure 400. FIG. 38 depicts a horizontal cross-section view of the double sided precast concrete wall structure 400. FIG. 39 depicts a vertical cross-section view of the double sided precast concrete wall structure 400.

With reference to FIGS. 37-39, a double sided wall structure 410 is provided which includes a concrete core 460 disposed between an inside face 462 and an outside face 464. The inside and outside faces 462 and 464 may be made with expanded polystyrene (EPS), extruded polystyrene (XPS), or like material. Studs 466 are attached to the concrete core 460 through on the inside face 462 and the outside face 464. The studs 466 preferably are drywall studs, but other stud applications may be used. The concrete core may define lifting inserts 468, which may have a "dog bone" or other shape. A slab 470 connector protrudes from one end of the concrete core 460.

The concrete core 460 is fabricated from a reinforced concrete material of the type having a plurality of reinforcing members embedded in a cement-based concrete material. For example, a plurality of elongated steel reinforcing members is provided within the concrete core 460, extending substantially parallel to the inside and outside faces 462 and 464. A truss type reinforcement also may be provided at one or both ends of the concreter core 460. Additional reinforcement in the form of wire mesh or fiber materials may be provided within and along the concrete core 460.

As previously discussed, the uninsulated precast concrete wall structure 300 and the double sided precast concrete wall structure 400 may use a concrete formulation having a "slump" measurement of between eleven and twelve inches, as defined in the American Society for Testing and Materials ("ASTM") "C94" standards publication. Concrete which is "self-leveling", subject to vibration, and concrete formulations having a relatively long cure time may be used.

From the foregoing description, it will be recognized that a prefabricated composite wall structure and a method of manufacturing a prefabricated composite wall structure have been provided which provide numerous advantages over the known prior art. It is noted that the simplified diagrams and drawings included in the present application do not illustrate all the various connections and assemblies of the various components, however, those skilled in the art will understand how to implement such connections and assemblies, based on the illustrated components, figures, and descriptions provided herein. Numerous variations, modification, and additional embodiments are possible, and, accordingly, all such variations, modifications, and embodiments are to be regarded as being within the spirit and scope of the present general inventive concept. Furthermore, while the present invention has been illustrated by description of several embodiments and while the illustrative embodiments have been described in detail, it is not the intention of the applicant to restrict or in any way limit the scope of the appended claims to such detail. Additional modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

The invention claimed is:

1. A method of forming a wall structure, the method comprising:

providing a casting bed having a plurality of upright surfaces defining a generally rectangular interior area and a lower surface defining a plurality of shapes corresponding to a three-dimensional outer surface of a wall structure;

placing a first layer of uncured concrete within the casting bed and allowing the first layer of concrete to conform to the shapes defined by the lower surface;

positioning a forming member in overlying relation above the lower surface, the forming member comprising a one-piece layer of insulating material sized to extend fully along a width dimension of the casting bed, the forming member defining a plurality of integrally-formed rectangular protrusions, each said integrally-formed rectangular protrusion having a length dimension extending fully along a length dimension of the forming member in a parallel and spaced-apart relationship to one another to define a plurality of rectangular-shaped channels therebetween;

positioning a frame within the casting bed along the forming member opposite the first layer of uncured concrete, the frame comprising first and second spaced apart members extending fully along the width dimension of the casting bed and a plurality of studs interconnecting the first and second spaced apart members, the studs each extending fully along a length dimension of the frame, wherein the frame and the forming member are placed within the casting bed to provide a first space between the forming member and the frame first member and a first upright surface of the casting bed and to provide a second space between the forming member and the frame second member and an opposite second upright surface of the casting bed;

placing a second layer of uncured concrete within the casting bed and allowing the second layer of concrete to conform to the rectangular-shaped channels between the rectangular protrusions;

placing a third layer of uncured concrete within the casting bed and allowing the third layer of concrete to fill at least one space between the frame and the upright surfaces of the casting bed; and allowing the concrete to cure.

2. The method of claim 1, wherein the forming member is positioned with the rectangular protrusions facing toward the first layer of uncured concrete.

3. The method of claim 1, further comprising placing at least one connector within the at least one space between the frame and the upright surfaces of the casting bed.

4. The method of claim 3, the at least one connector comprising an elongated member at least partially protruding from at least one of the layers of uncured concrete in the casting bed.

5. The method of claim 4, the at least one connector comprising a socket for receiving a pin.

6. The method of claim 1, the forming member being composed of insulating material.

7. The method of claim 6, the insulating material being expanded polystyrene.

8. The method of claim 1, wherein the lower surface defines a first area conforming to a first wall texture and a second area comprising to a second wall texture.

9. The method of claim 8, the first and second wall textures being selected from the group consisting of brick texture, stone texture, lap siding texture, and board and batten texture.

10. The method of claim 1, wherein at least two opposite upright surfaces of the casting bed define structures shaped to allow the concrete to form matingly-shaped portions of a joint along opposite sides of the wall structure.

11. The method of claim 10, a first of the at least two opposite upright surfaces of the casting bed defining a ridge extending along a length thereof, and the second of the at least two opposite upright surfaces of the casting bed defining a matingly-shaped groove extending along a length thereof.

12. The method of claim 1, further comprising positioning a plurality of reinforcing members within the casting bed prior to placing the second layer of uncured concrete within the casting bed.

13. The method of claim 12, wherein the positioning of a plurality of reinforcing members further comprises placing at least one reinforcing member along each of the rectangular-shaped channels between the rectangular protrusions of the forming member.

14. The method of claim 1, further comprising forming at least one of the plurality of shapes in the lower surface of the casting bed.

15. A method of forming a wall structure, the method comprising:

providing a casting bed having a plurality of upright surfaces defining a generally rectangular interior area and a lower surface defining a plurality of shapes corresponding to a three-dimensional outer surface of a wall structure;

positioning one or more elements along the lower surface of the casting bed;

placing a first layer of uncured concrete within the casting bed and allowing the first layer of concrete to conform to the shapes defined by the lower surface, wherein the elements are configured to be anchored to the concrete;

positioning a forming member in overlying relation above the lower surface, the forming member comprising a one-piece layer of insulating material sized to extend fully along a width dimension of the casting bed, the forming member defining a plurality of integrally-formed rectangular protrusions, each said integrally-formed rectangular protrusion having a length dimension extending fully along a length dimension of the forming member in a parallel and spaced-apart relationship to one another to define a plurality of rectangular-shaped channels therebetween;

positioning a frame within the casting bed along the forming member opposite the first layer of uncured concrete, the frame comprising first and second spaced apart members extending fully along the width dimension of the casting bed and a plurality of studs interconnecting the first and second spaced apart members, the studs each extending fully along a length dimension of the frame;

placing a second layer of uncured concrete within the casting bed and allowing the second layer of concrete to conform to the rectangular-shaped channels between the rectangular protrusions; and allowing the concrete to cure.

16. A method of forming a wall structure, the method comprising:

providing a casting bed having a plurality of upright surfaces defining a generally rectangular interior area and a lower surface defining a plurality of shapes corresponding to a three-dimensional outer surface of a wall structure;

positioning one or more pattern stamps along the lower surface of the casting bed;

placing a first layer of uncured concrete within the casting bed and allowing the first layer of concrete to conform to the shapes defined by the lower surface, wherein the elements are configured to be anchored to the concrete;

positioning a forming member in overlying relation above the lower surface, the forming member comprising a one-piece layer of insulating material sized to extend fully along a width dimension of the casting bed, the forming member defining a plurality of integrally-formed rectangular protrusions, each said integrally-formed rectangular protrusion having a length dimension extending fully along a length dimension of the forming member in a parallel and spaced-apart relationship to one another to define a plurality of rectangular-shaped channels therebetween;

positioning a frame within the casting bed along the forming member opposite the first layer of uncured concrete, the frame comprising first and second spaced apart members extending fully along the width dimension of the casting bed and a plurality of studs interconnecting the first and second spaced apart members, the studs each extending fully along a length dimension of the frame;

placing a second layer of uncured concrete within the casting bed and allowing the second layer of concrete to conform to the rectangular-shaped channels between the rectangular protrusions; and allowing the concrete to cure.

17. The method of claim 16, further comprising:
removing the wall structure from the casting bed after the concrete has cured; and
removing the one or more pattern stamps from the wall structure.

18. The method of claim 17, further comprising applying a color to the wall structure prior to removing the one or more pattern stamps.

* * * * *